US012608094B2

(12) United States Patent
Horie et al.

(10) Patent No.: US 12,608,094 B2
(45) Date of Patent: *Apr. 21, 2026

(54) EXAMINATION SYSTEM AND TERMINAL APPARATUS

(71) Applicant: Wacom Co., Ltd., Saitama (JP)

(72) Inventors: Toshihiko Horie, Saitama (JP);
Masamitsu Ito, Saitama (JP);
Katsuhito Obi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/946,678

(22) Filed: Nov. 13, 2024

(65) Prior Publication Data

US 2025/0068266 A1 Feb. 27, 2025

Related U.S. Application Data

(63) Continuation of application No. 18/474,059, filed on Sep. 25, 2023, now Pat. No. 12,169,602, which is a
(Continued)

(30) Foreign Application Priority Data

Mar. 26, 2021 (JP) ................................. 2021-052523

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
CPC .......... G06F 1/1626; G06F 2200/1632; G06F 3/03545; G06F 3/038; G06F 3/041;
(Continued)

(56) References Cited

U.S. PATENT DOCUMENTS

| | | | |
|---|---|---|---|
| 10,977,955 B2 | 4/2021 | Horie | |
| 11,200,371 B2 | 12/2021 | Takesue | |

(Continued)

FOREIGN PATENT DOCUMENTS

| | | |
|---|---|---|
| JP | 2003156996 A | 5/2003 |
| JP | 2005122475 A | 5/2005 |

(Continued)

OTHER PUBLICATIONS

International Search Report, mailed May 31, 2022, for International Patent Application No. PCT/JP2022/008120. (7 pages) (with English Translation).

*Primary Examiner* — Hong Zhou

(74) *Attorney, Agent, or Firm* — Seed Intellectual Property Law Group LLP

(57) ABSTRACT

An examination system includes a server apparatus, and a terminal apparatus connected to the server apparatus and capable of communicating with the server apparatus. The terminal apparatus is configured to transmit, to the server apparatus, response information, which is responsive to provided information and which is generated according to a position indication input performed by a user of the terminal apparatus. The terminal apparatus includes a position detection sensor that detects the position indication input, a determination unit that distinguishingly determines the position indication input in a response information area corresponding to an input field for the response information and the position indication input in an area outside the response information area, in a position detection area of the position detection sensor, and a transmission control unit that transmits, to the server apparatus, the position indication input in the response information area.

20 Claims, 30 Drawing Sheets

Related U.S. Application Data continuation of application No. PCT/JP2022/008120, filed on Feb. 28, 2022.

(58) Field of Classification Search
CPC ..... G06F 3/04883; G06F 40/174; G09B 5/02; G09B 7/00; H04L 67/02
See application file for complete search history.

(56) References Cited

U.S. PATENT DOCUMENTS

| | | | |
|---|---|---|---|
| 2015/0104778 A1 | 4/2015 | Liu et al. | |
| 2015/0125844 A1* | 5/2015 | Cho ......................... | G09B 7/02 |
| | | | 434/353 |
| 2019/0272766 A1 | 9/2019 | Horie | |
| 2020/0160739 A1 | 5/2020 | Smith et al. | |
| 2020/0356254 A1* | 11/2020 | Missig ................ | G06F 3/04842 |
| 2022/0392367 A1* | 12/2022 | Ono ......................... | G09B 7/00 |

FOREIGN PATENT DOCUMENTS

| | | | |
|---|---|---|---|
| JP | 2016004405 | A | 1/2016 |
| JP | 2016029519 | A | 3/2016 |
| JP | 2018037033 | A | 3/2018 |
| JP | 2020016871 | A | 1/2020 |
| WO | WO 2018092555 | A1 | 5/2018 |

* cited by examiner

F I G . 1
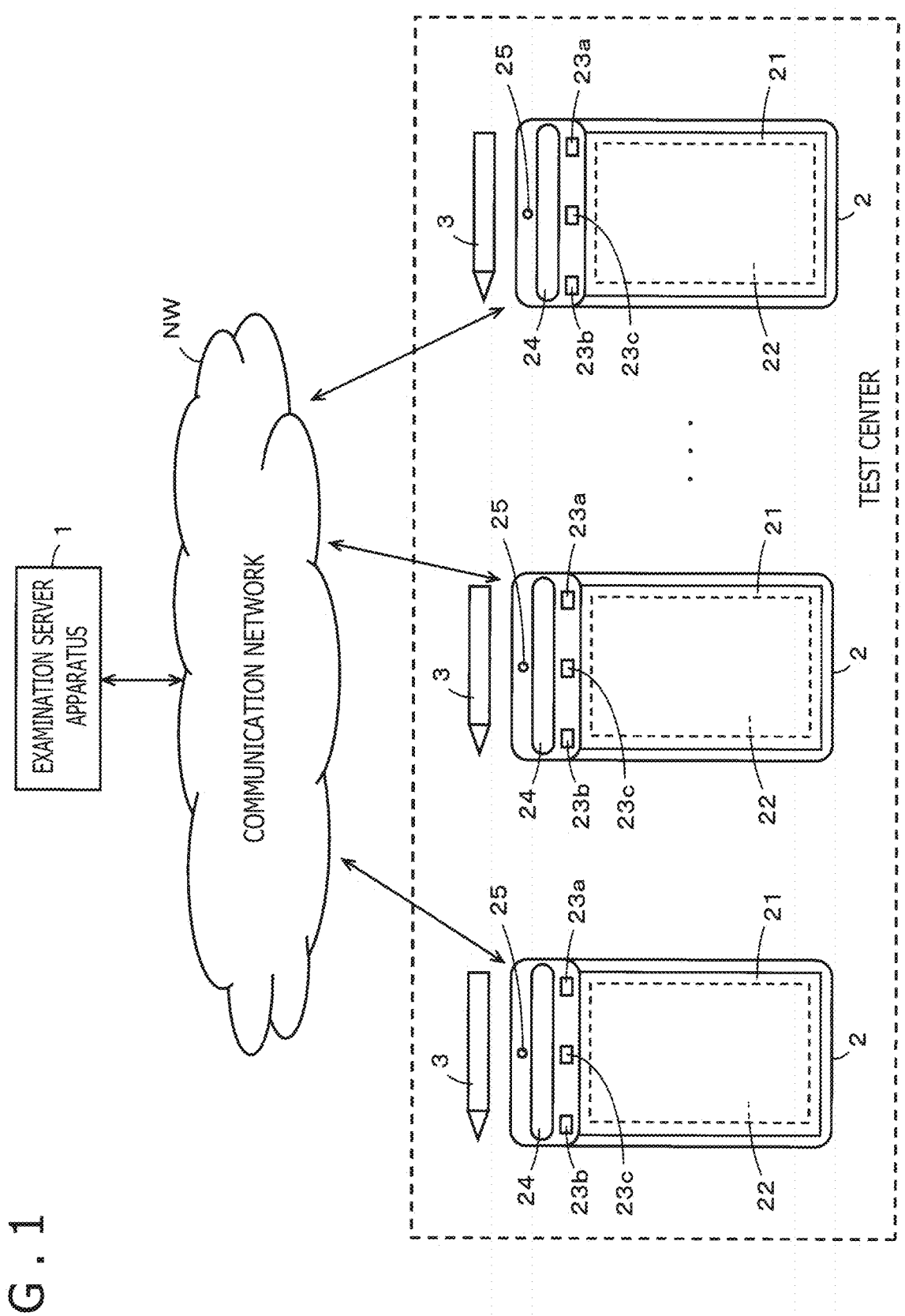

<u>1</u>

FIG.3A
COVER PAGE (PAGE NUMBER 0)
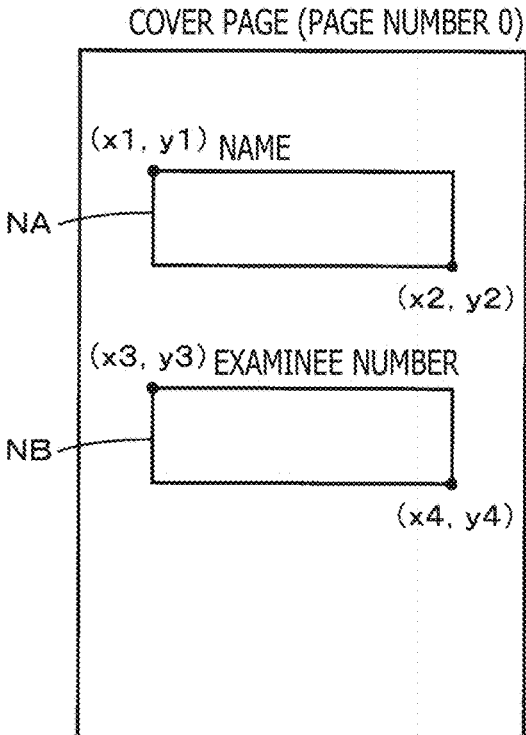
(x1, y1) NAME
NA
(x2, y2)
(x3, y3) EXAMINEE NUMBER
NB
(x4, y4)
FIG.3B
QUESTION PAGE (PAGE NUMBER 1)
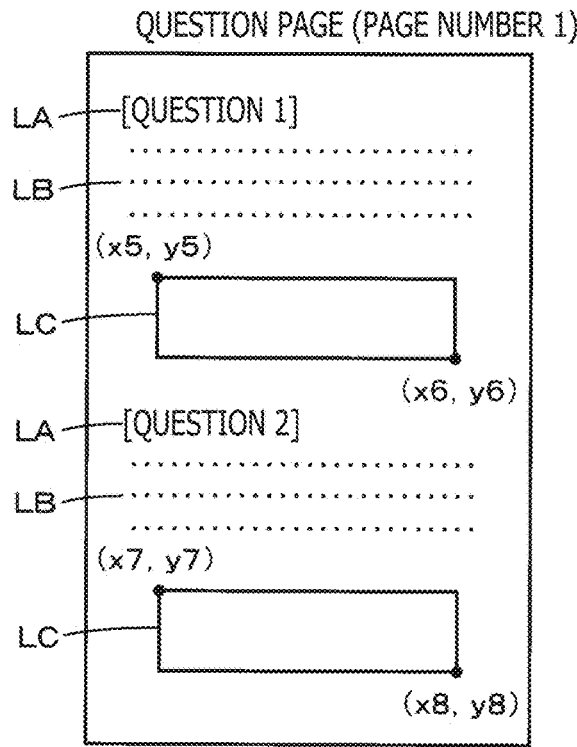
LA — [QUESTION 1]
LB
(x5, y5)
LC
(x6, y6)
LA — [QUESTION 2]
LB
(x7, y7)
LC
(x8, y8)
FIG.4
| | PAGE NUMBER | FIELD NAME | POSITION RANGE |
|---|---|---|---|
| COVER PAGE | 0 | EXAMINEE NAME FIELD | (x1, y1), (x2, y2) |
| | | EXAMINEE NUMBER FIELD | (x3, y3), (x4, y4) |
| QUESTION PAGE | 1 | QUESTION 1 ANSWER FIELD | (x5, y5), (x6, y6) |
| | | QUESTION 2 ANSWER FIELD | (x7, y7), (x8, y8) |
| | 2 | QUESTION 3 ANSWER FIELD | (x9, y9), (x10, y10) |
| | | QUESTION 4 ANSWER FIELD | (x11, y11), (x12, y12) |
| | ⋮ | ⋮ | ⋮ |

F I G . 5
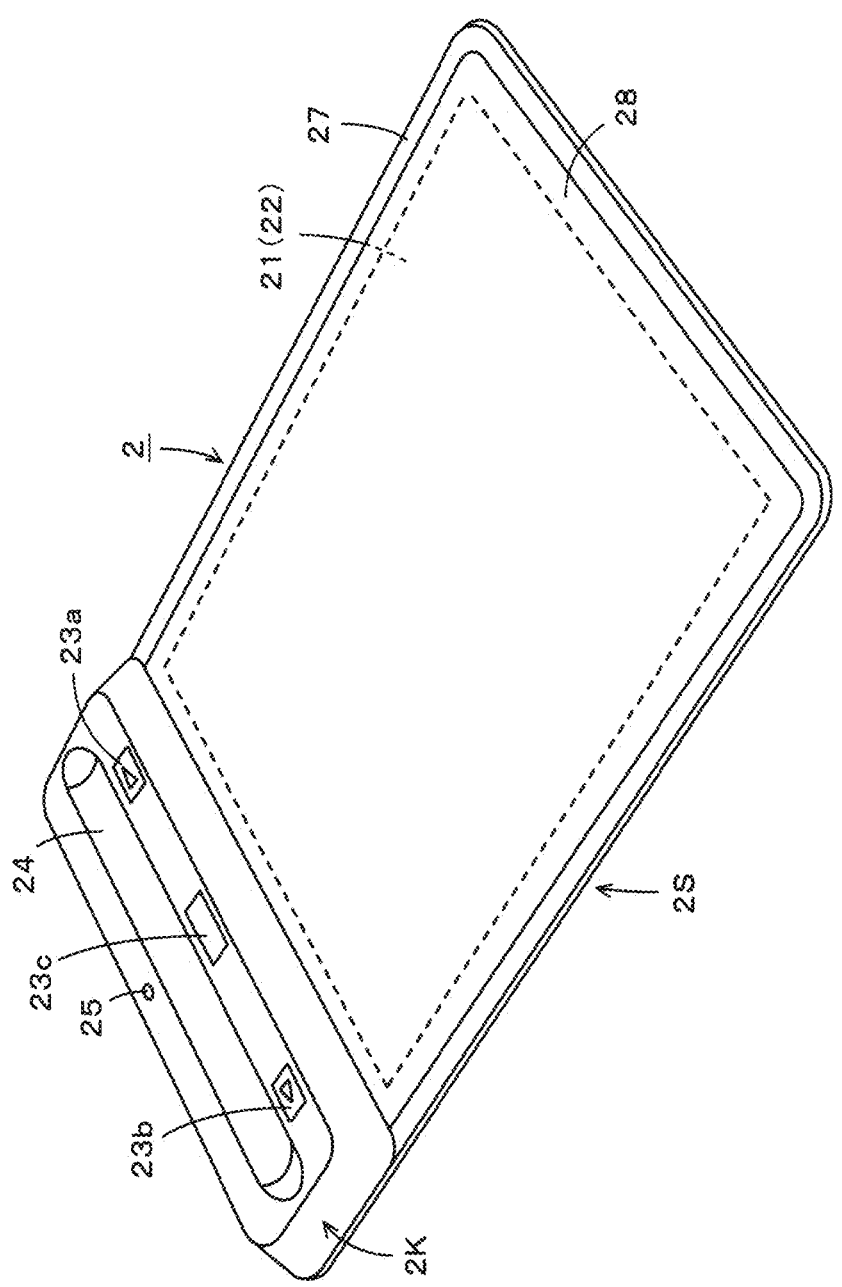

FIG.6A
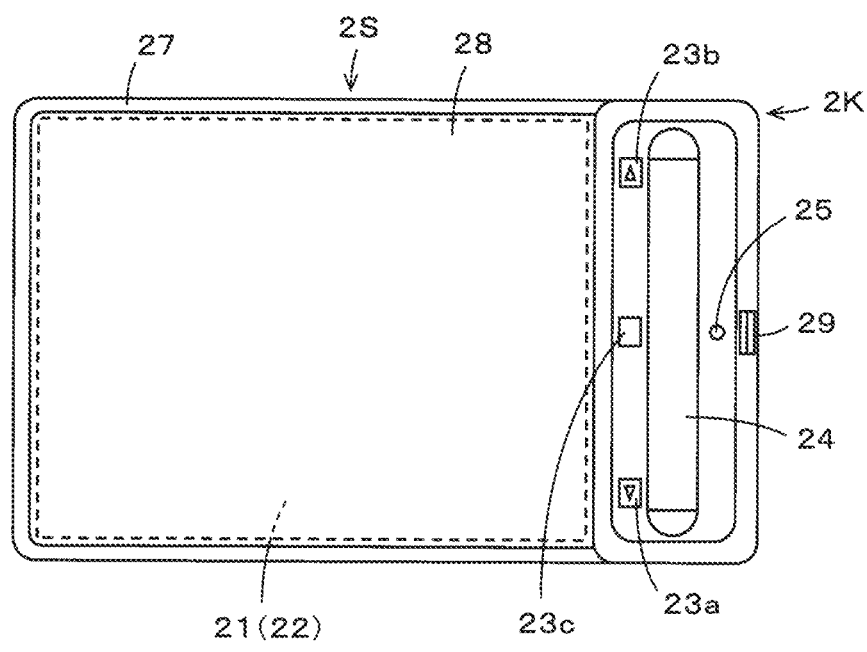
FIG.6B
FIG.6C
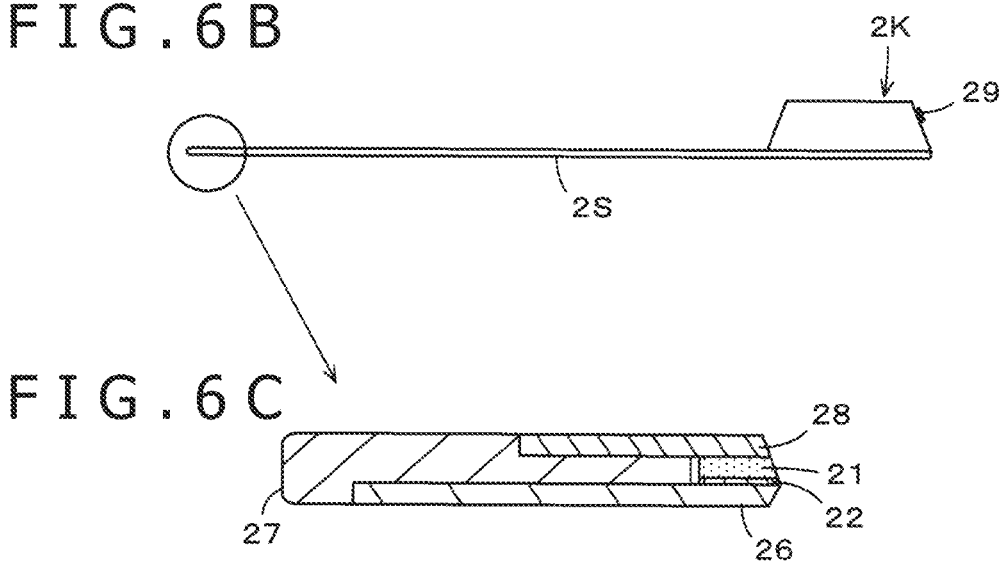

F I G . 7
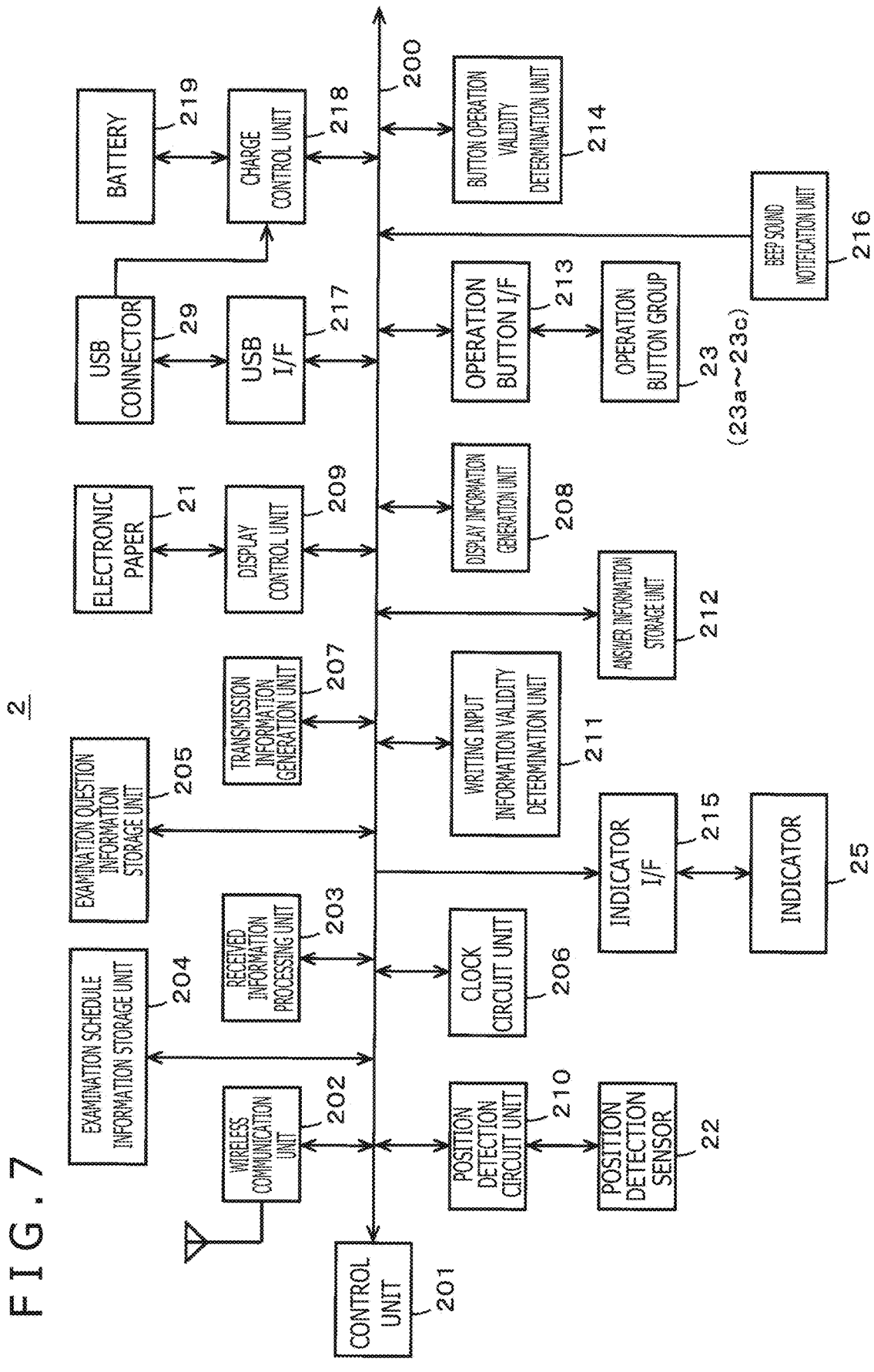

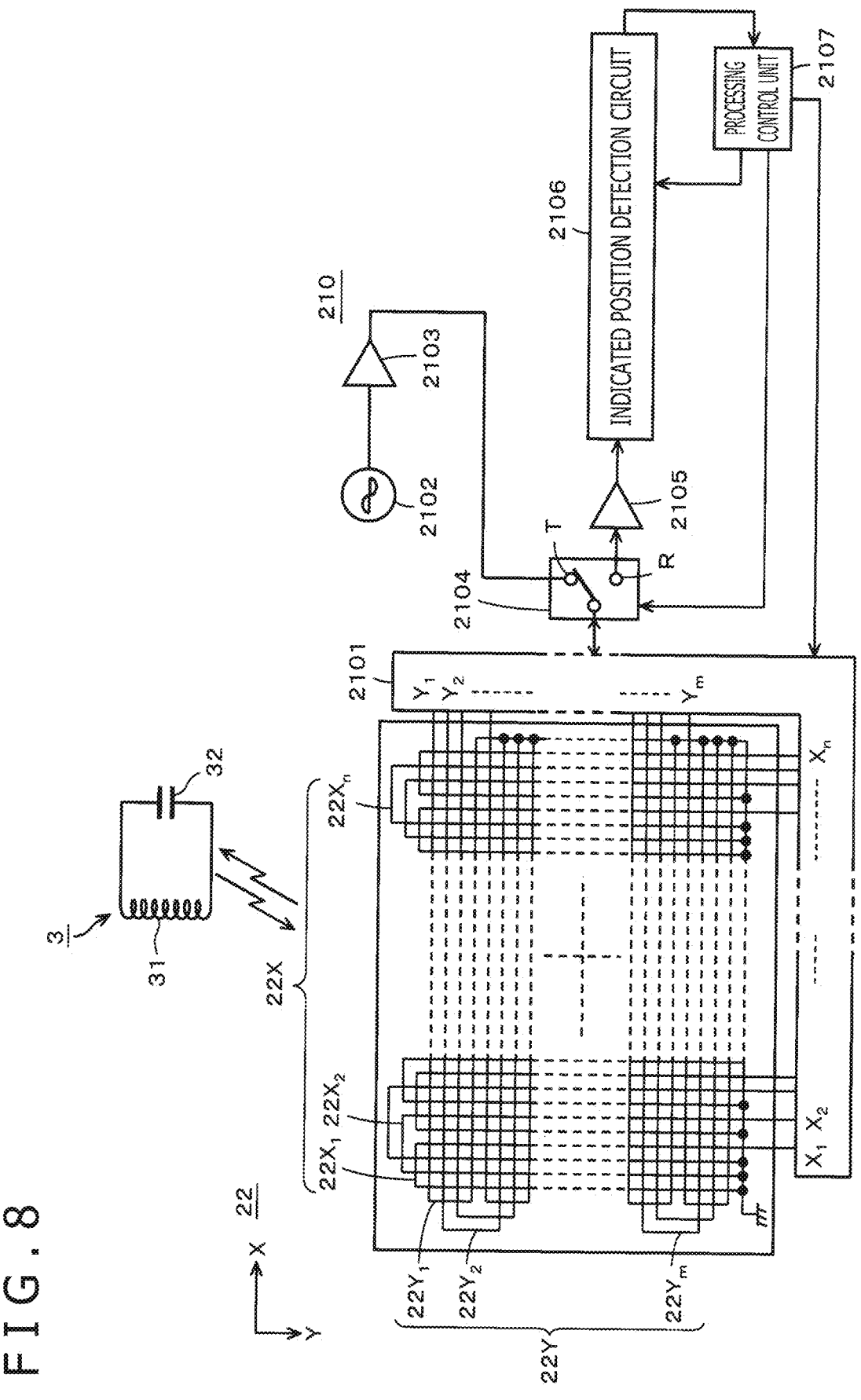
F I G . 8

F I G . 1 4
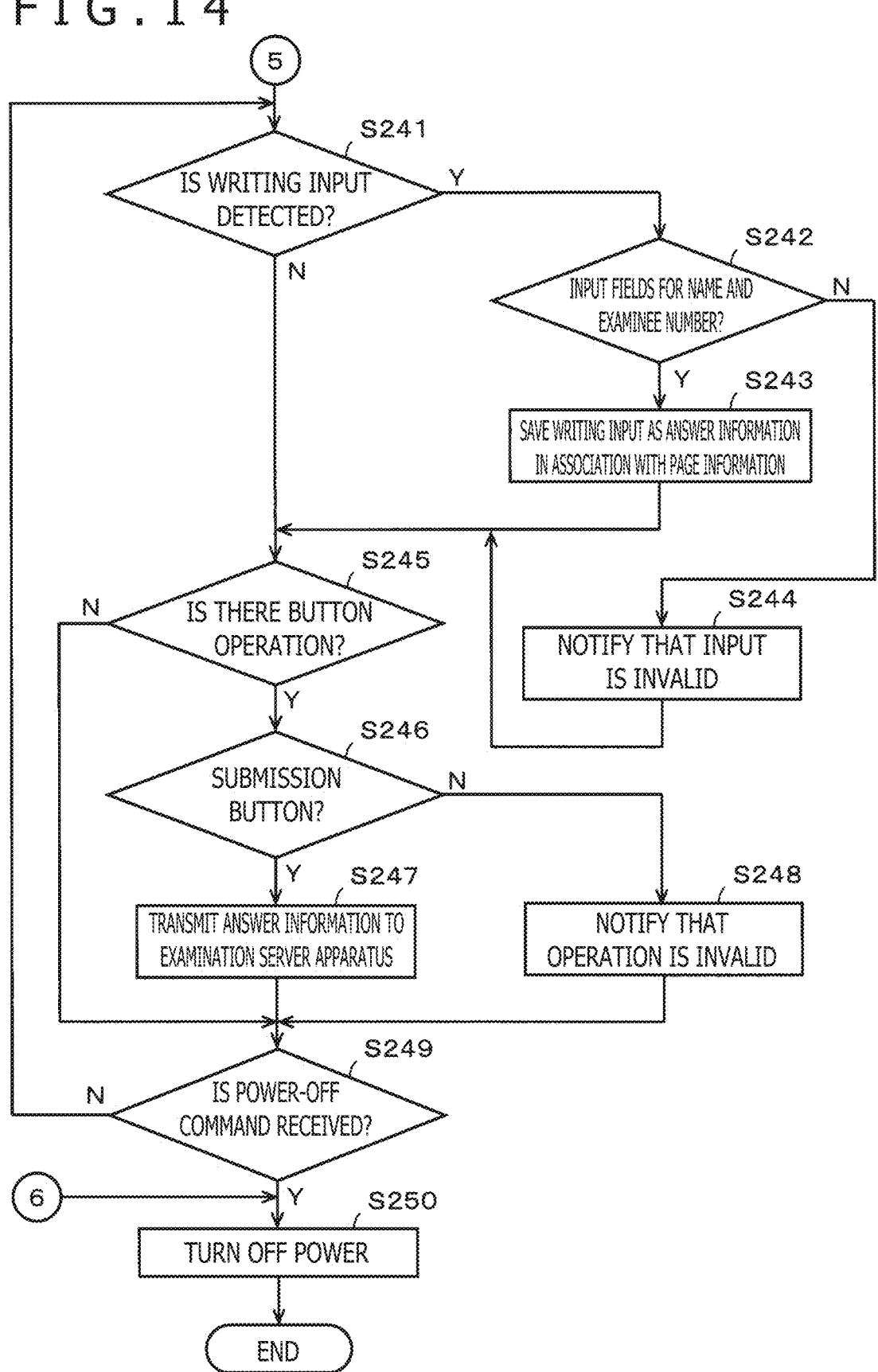

F I G . 1 7

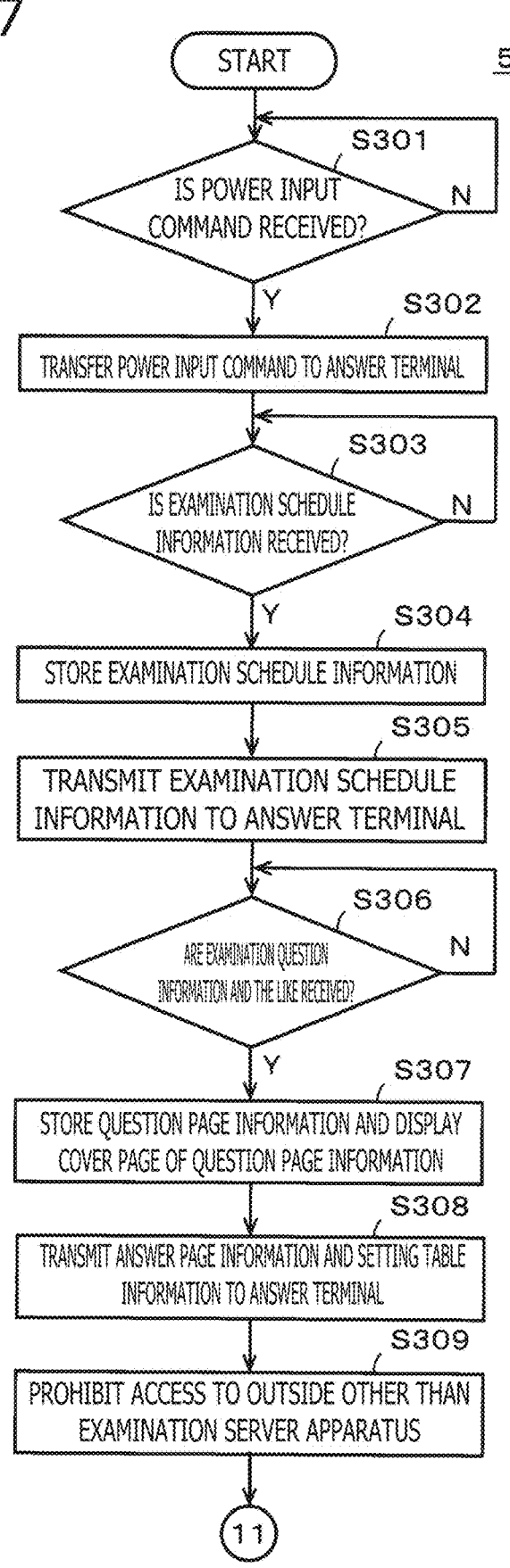

5

START

S301
IS POWER INPUT COMMAND RECEIVED?     N

Y

S302
TRANSFER POWER INPUT COMMAND TO ANSWER TERMINAL

S303
IS EXAMINATION SCHEDULE INFORMATION RECEIVED?     N

Y

S304
STORE EXAMINATION SCHEDULE INFORMATION

S305
TRANSMIT EXAMINATION SCHEDULE INFORMATION TO ANSWER TERMINAL

S306
ARE EXAMINATION QUESTION INFORMATION AND THE LIKE RECEIVED?     N

Y

S307
STORE QUESTION PAGE INFORMATION AND DISPLAY COVER PAGE OF QUESTION PAGE INFORMATION

S308
TRANSMIT ANSWER PAGE INFORMATION AND SETTING TABLE INFORMATION TO ANSWER TERMINAL

S309
PROHIBIT ACCESS TO OUTSIDE OTHER THAN EXAMINATION SERVER APPARATUS

11

F I G . 2 2
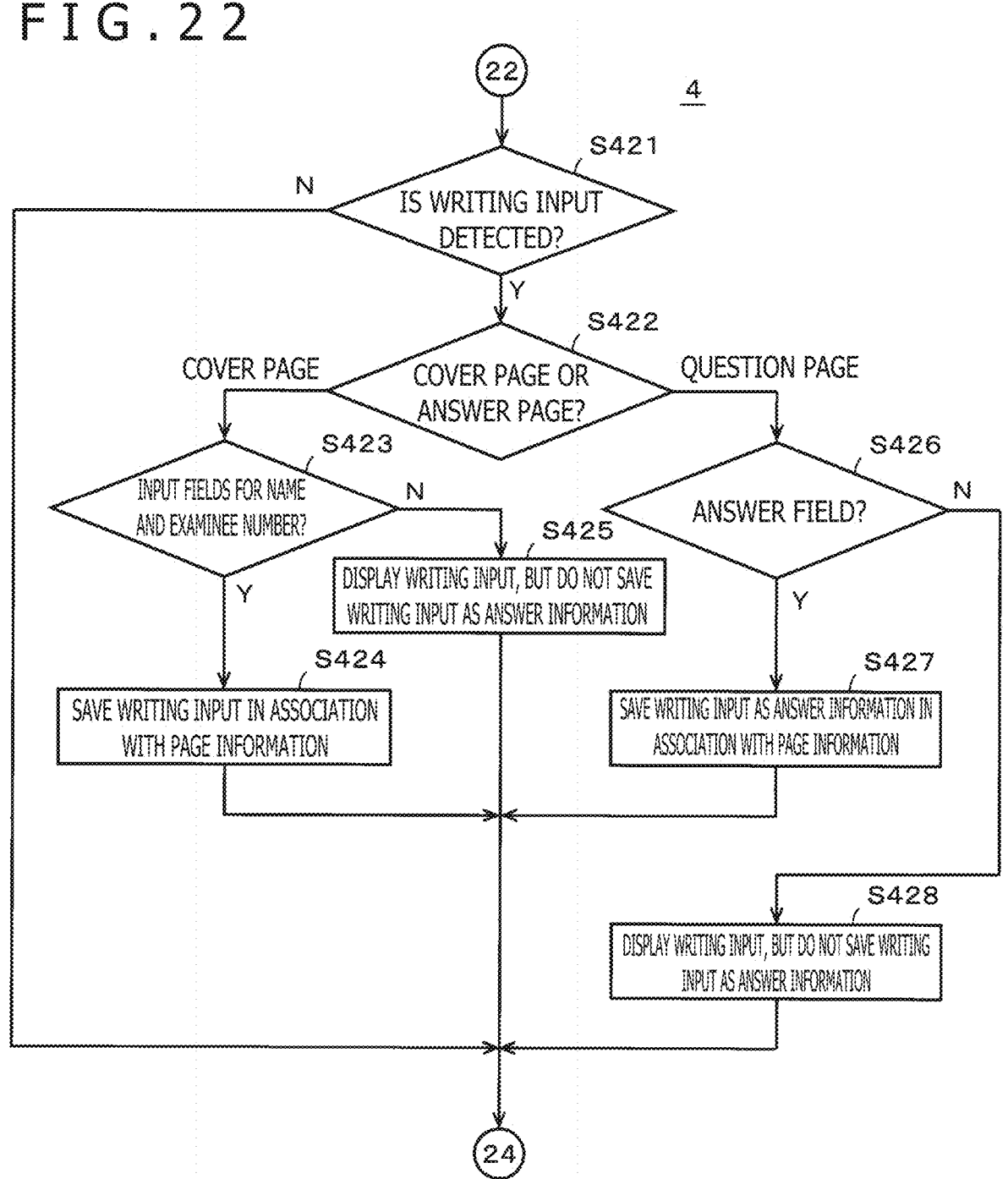

F I G . 2 4
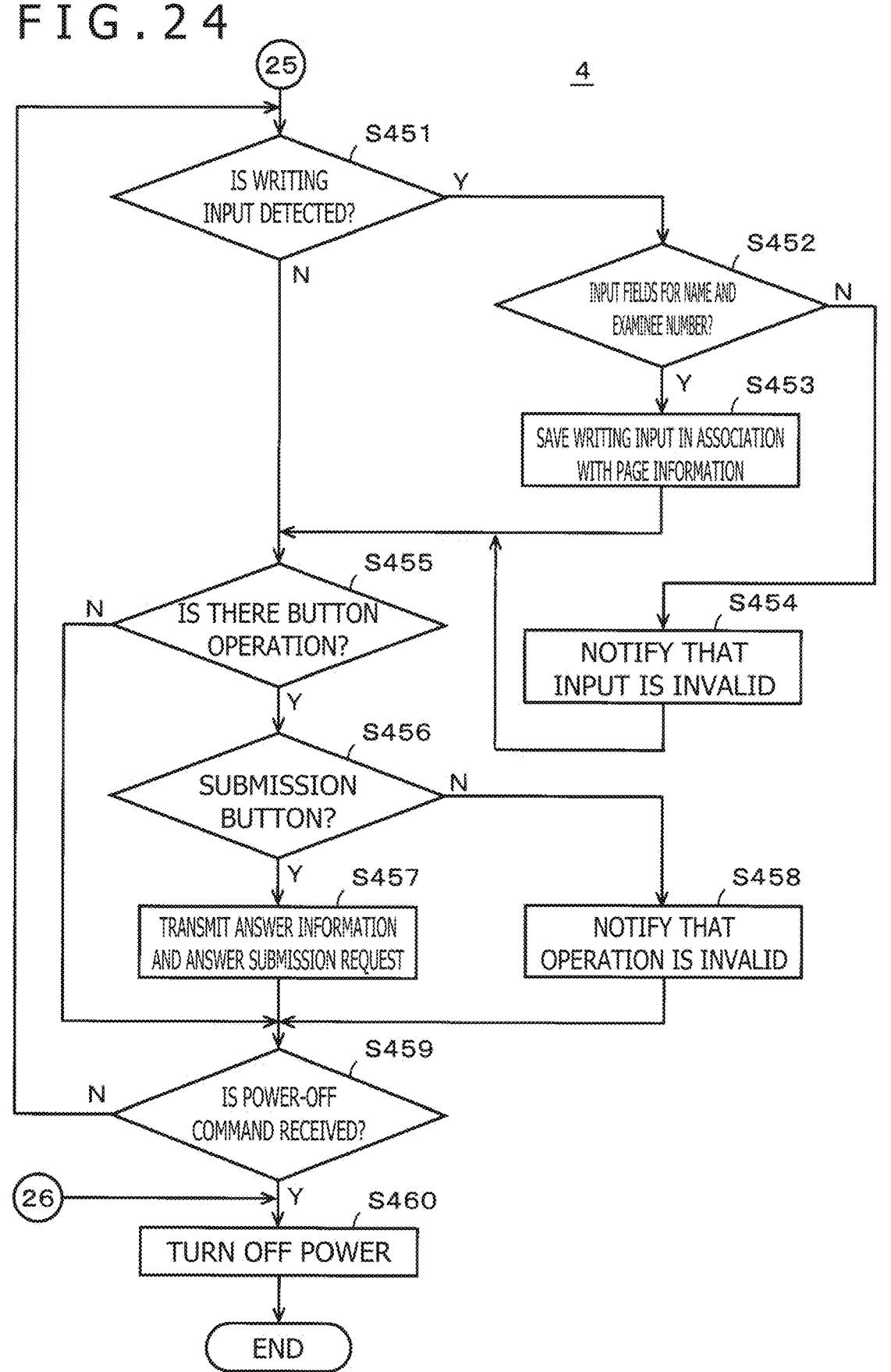

F I G . 2 7
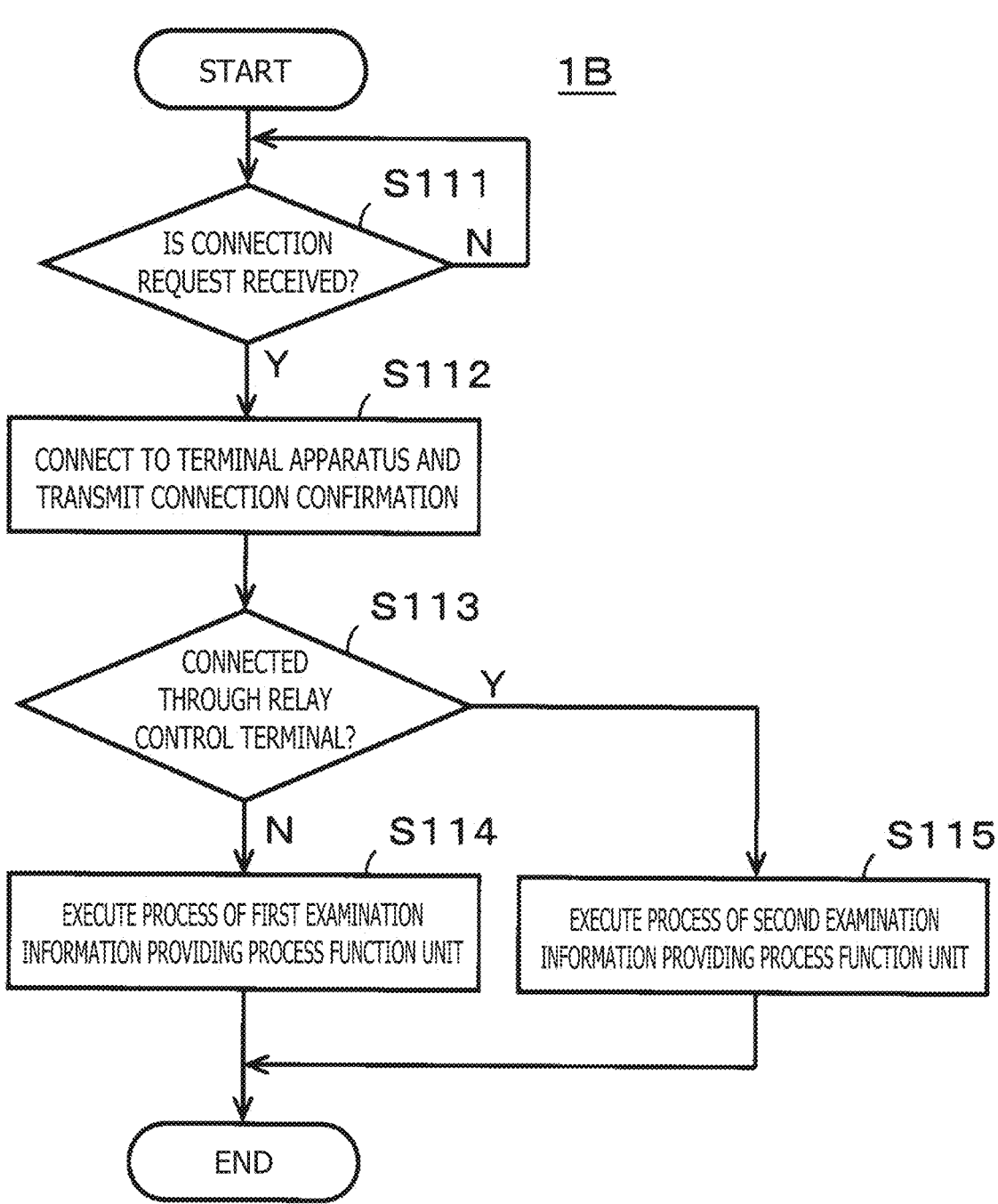

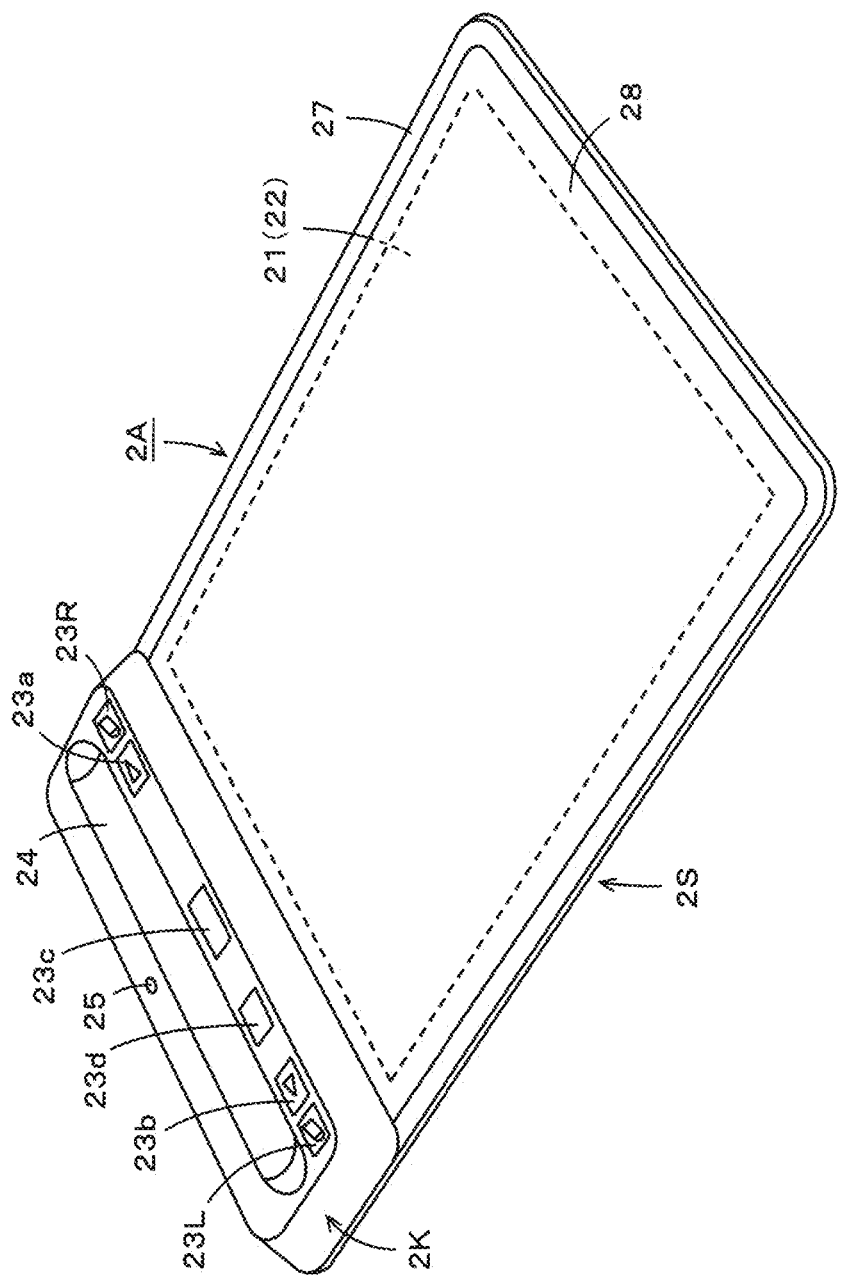
F I G . 2 8

FIG.29
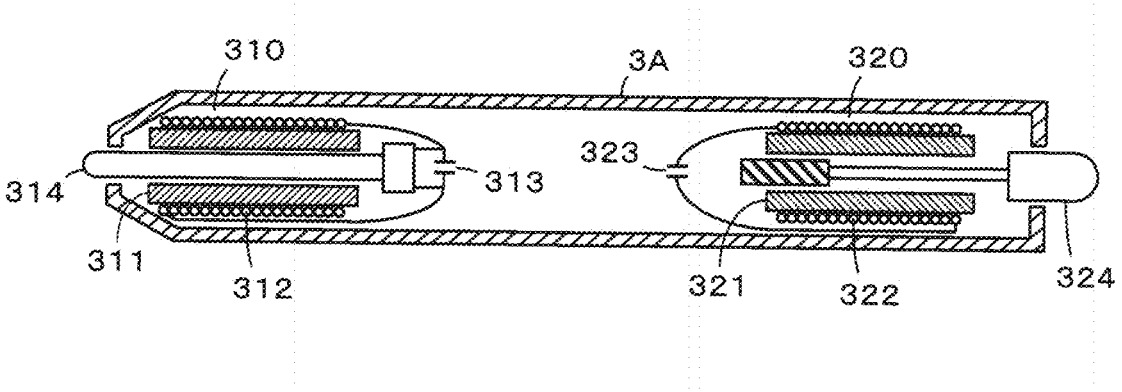
FIG.30A
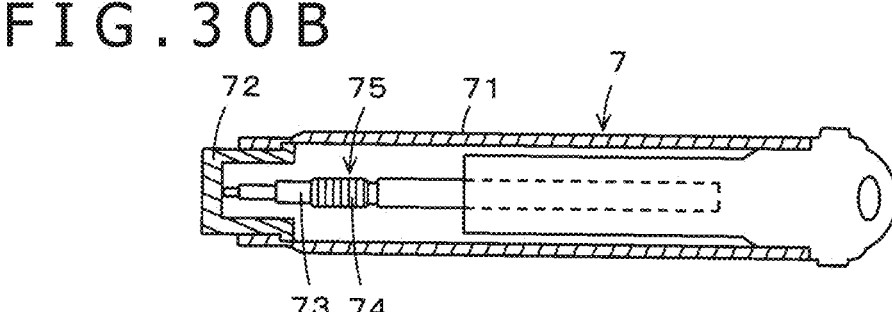
FIG.30B

F I G . 3 1
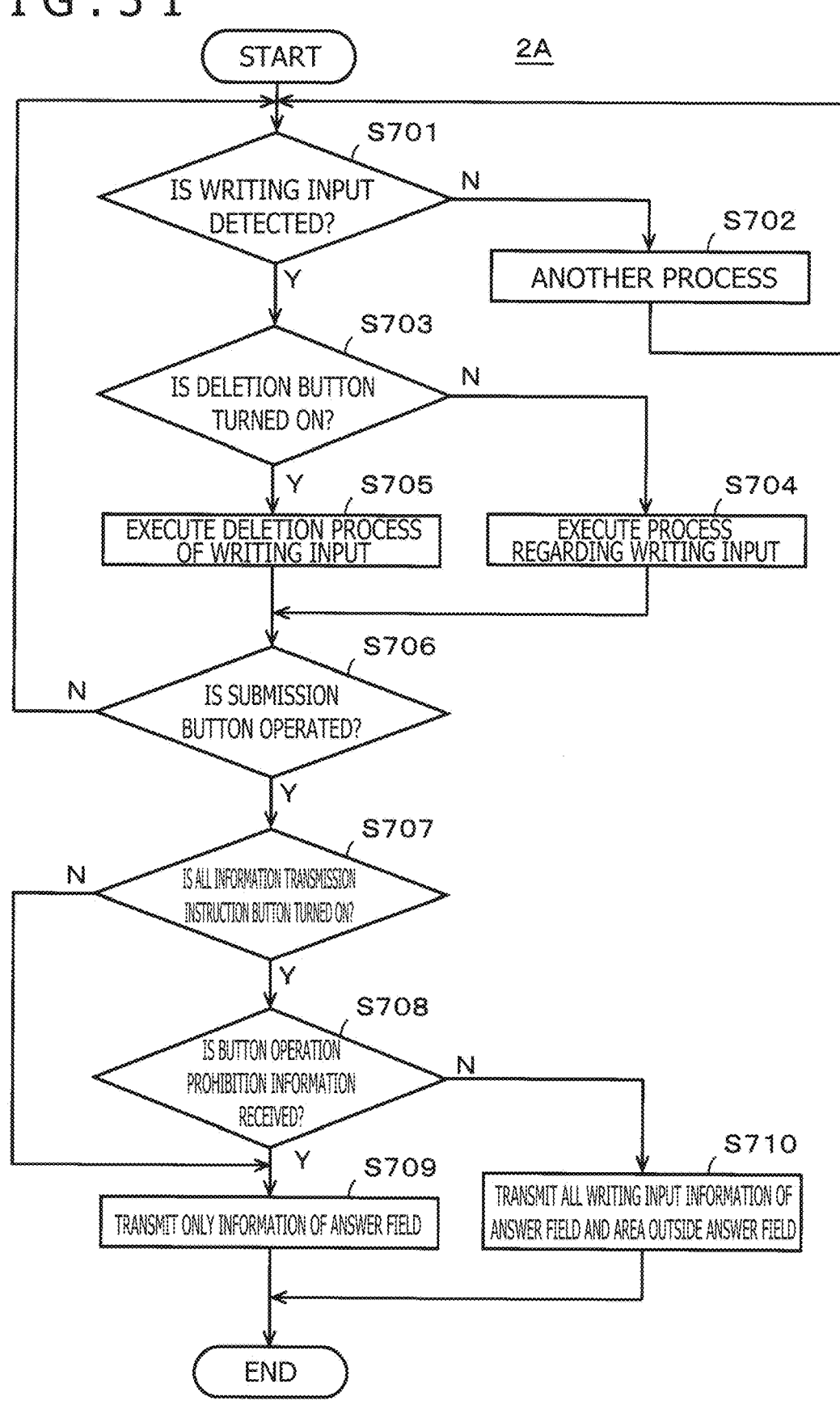

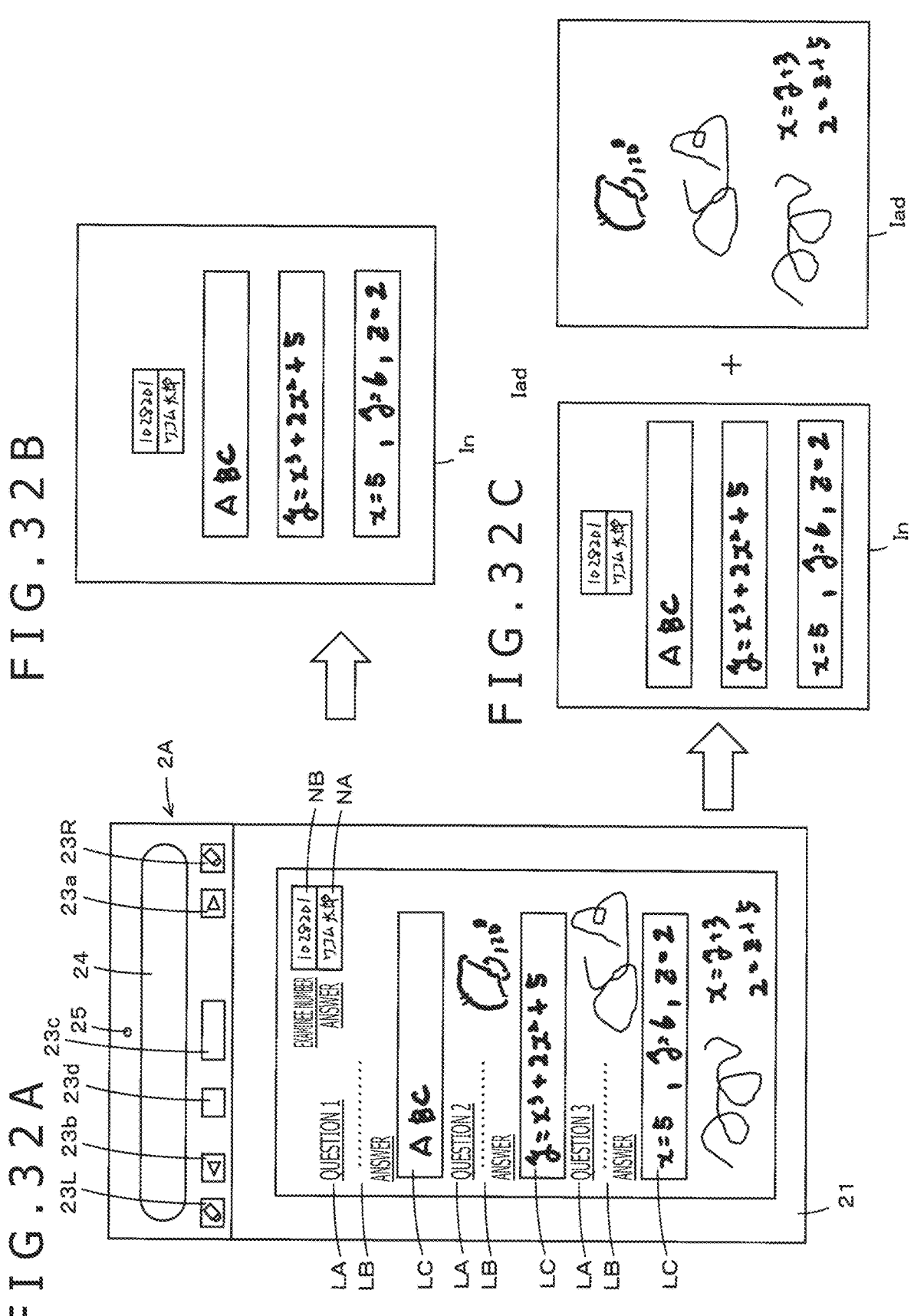

EXAMINATION SYSTEM AND TERMINAL APPARATUS

BACKGROUND

Technical Field

The disclosure relates to a communication system that transmits electronic data from a terminal apparatus to a server apparatus, the electronic data including response information which is responsive to provided information, such as answer (examination answer) information responsive to examination questions, and which is generated based on a position indication input by a user of the terminal apparatus, and further relates to the terminal apparatus.

Description of the Related Art

In a conventional method of conducting an entrance examination, a certification examination, or the like, paper including question sets and answer sheets are handed out to examinees gathered in a test center, and the answer sheets are collected and graded. The method requires collecting and grading the answer sheets, which increases the labor cost of administering the examination, and handling of the answer sheets is time-consuming.

Examples of an examination method based on an online system are proposed in Japanese Patent Laid-Open No. 2003-156996, Japanese Patent Laid-Open No. 2005-122475, and other documents. In the online system, a server apparatus of a provider of examination questions and a terminal apparatus as a client apparatus of an examinee taking an examination are connected through a communication network.

According to the method based on the online system, answer information is sent as electronic data from the terminal apparatus to the server apparatus, and the server apparatus manages the electronic data. Therefore, the time and effort in collecting the answer sheets are not necessary, and the administration is also easy.

Conventionally, multiple-choice questions are provided for efficient grading of the answers. However, it is increasingly considered important to evaluate the analytical skills and the writing skills of the test-taker. To construct an online system which meets the recent demand, a terminal apparatus that can detect a handwritten input of a test-taker and that can acquire the handwritten input as electronic data is necessary. This type of terminal apparatus includes a position detection sensor that detects a writing input based on a position indication input made by an electronic pen. The terminal apparatus can display, on a display screen, the writing input based on the position indication input detected by the position detection sensor, and acquire the writing input based on the position indication input as electronic data (see, for example, Japanese Patent Laid-Open No. 2016-029519).

In taking an examination, the test-taker may take a note or prepare a draft in the course of preparing an answer to be written in the answer field. When only paper is used as in a conventional examination, the test-taker uses the back side or a margin of the answer sheet to take a note or make a draft. However, paper is not necessary when the question information and the answer information are transmitted as electronic data as described above, and paper for taking a note or making a draft may not be provided.

When the test-taker uses the terminal apparatus described in Japanese Patent Laid-Open No. 2016-029519, the test-taker may use a blank space outside the answer field on an electronic page for inputting an answer on the display screen to take a note or make a draft.

In this case, if all of the electronic data based on indicated positions input by the user on the electronic answer page displayed on the display screen is transmitted as answer information to the server apparatus, the answer information needs to be separated into input information of the answer field and input information of the blank space outside the answer field, in order to grade the answer on the basis of the answer information collected by the server apparatus. This is time-consuming.

To avoid this problem, the examinee may be asked to delete the input in the blank space. However, this is time-consuming for the examinee, which is problematic in view of the time restriction that the examiner is under to answer the questions.

Besides the case of the examination, there are cases requiring transmitting response information responsive to predetermined provided information. A similar problem may arise if necessary response information and information other than the necessary information are returned to the server apparatus.

BRIEF SUMMARY

A communication system is provided which includes a server apparatus, and a terminal apparatus connected to the server apparatus and capable of communicating with the server apparatus. The terminal apparatus is configured to transmit, to the server apparatus, response information responsive to provided information, wherein the response information is generated according to a position indication input performed by a user of the terminal apparatus. The terminal apparatus includes a position detection sensor that detects the position indication input, a determination unit that distinguishingly determines the position indication input, in a response information area corresponding to an input field for the response information, and the position indication input in an area outside the response information area, in a position detection area of the position detection sensor. The terminal apparatus also includes a transmission control unit that transmits, to the server apparatus, the position indication input in the response information area determined by the determination unit.

In the communication system with the configuration, the provided information includes an examination question, and the response information includes answer information for the examination question, for example. In this case, only the answer information as the position indication input in an answer field, which is the input field for the response information, can be transmitted to the server apparatus.

BRIEF DESCRIPTION OF THE SEVERAL VIEWS OF THE DRAWINGS

FIG. 1 is a diagram used for describing an overview of a first embodiment of a communication system according to the disclosure;

FIGS. 3A and 3B are diagrams used for describing the communication system of the first embodiment;

FIG. 4 is a diagram used for describing the communication system of the first embodiment;

3

Figure 9:
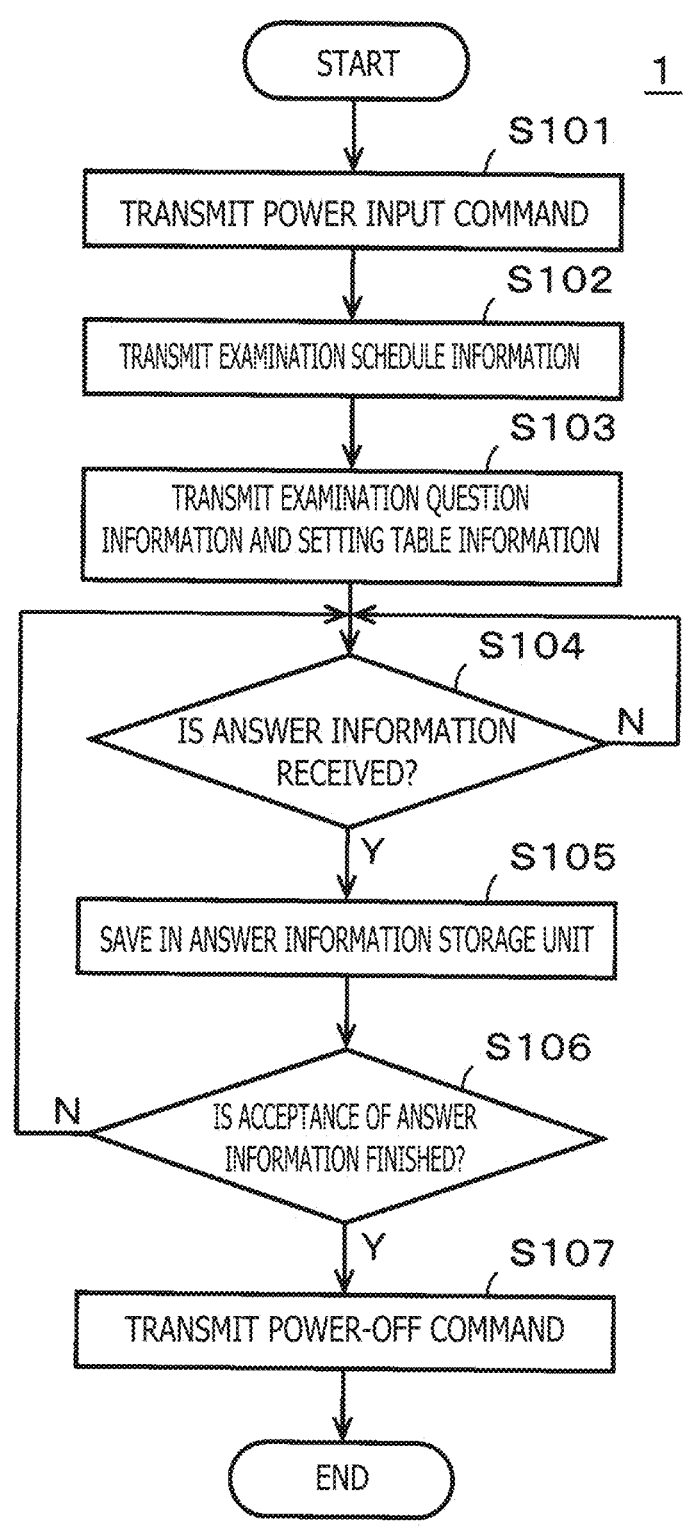
Figure 10:
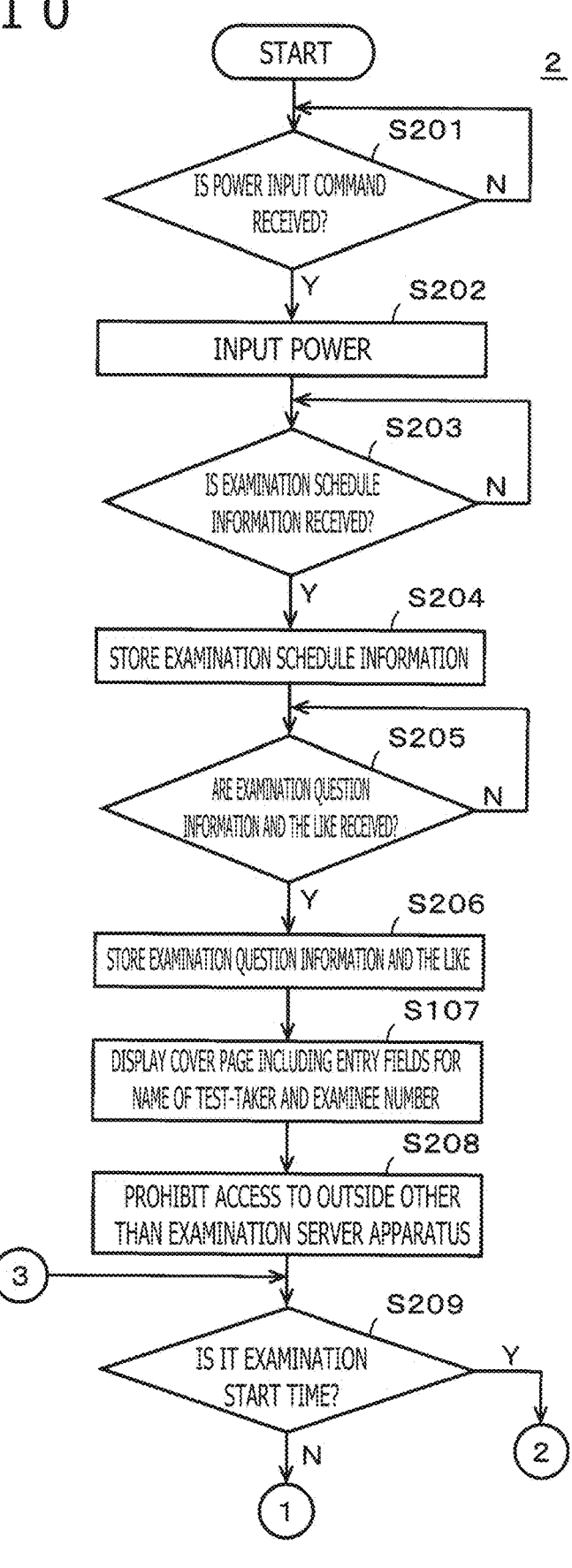
Figure 11:
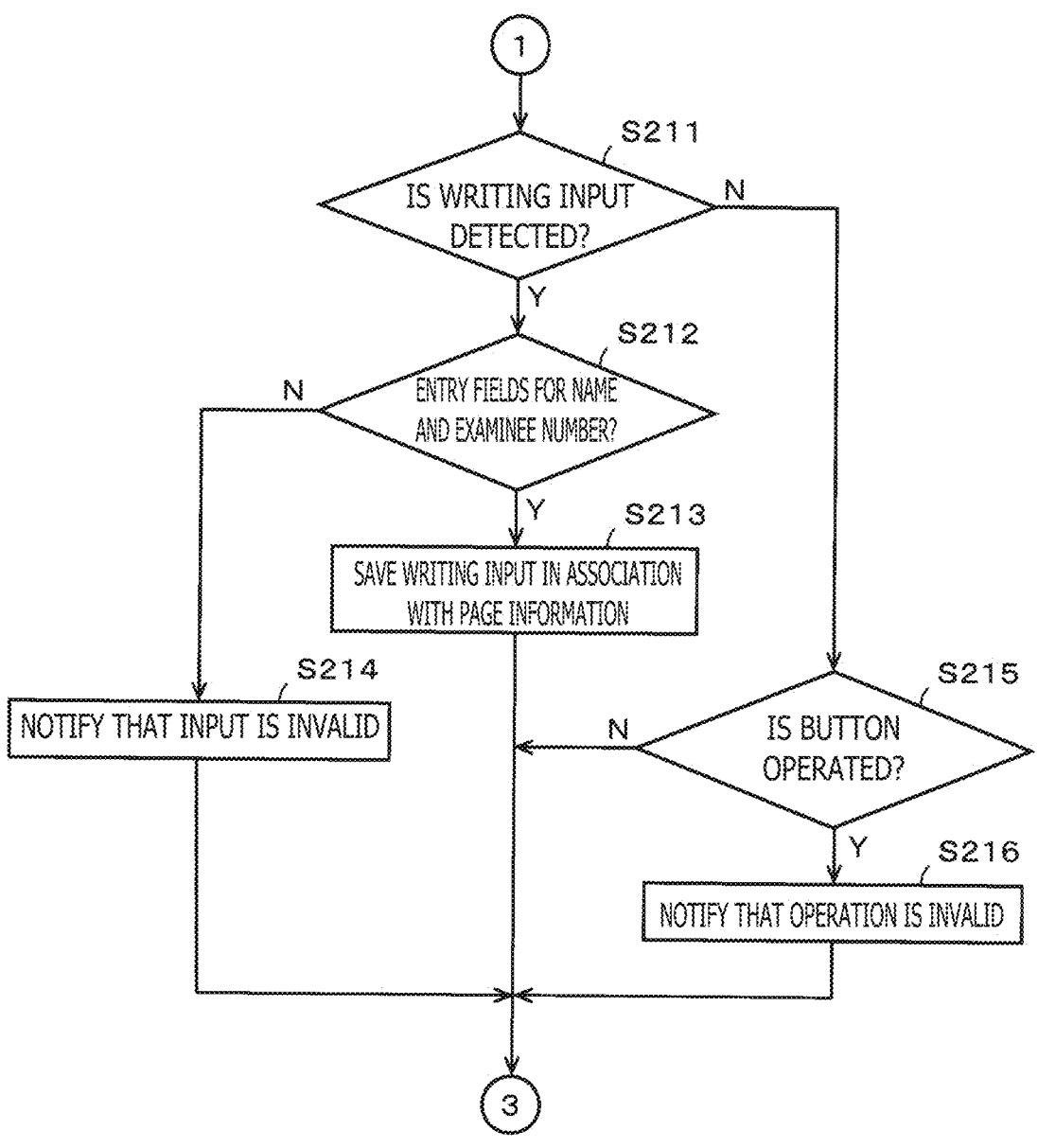
Figure 12:
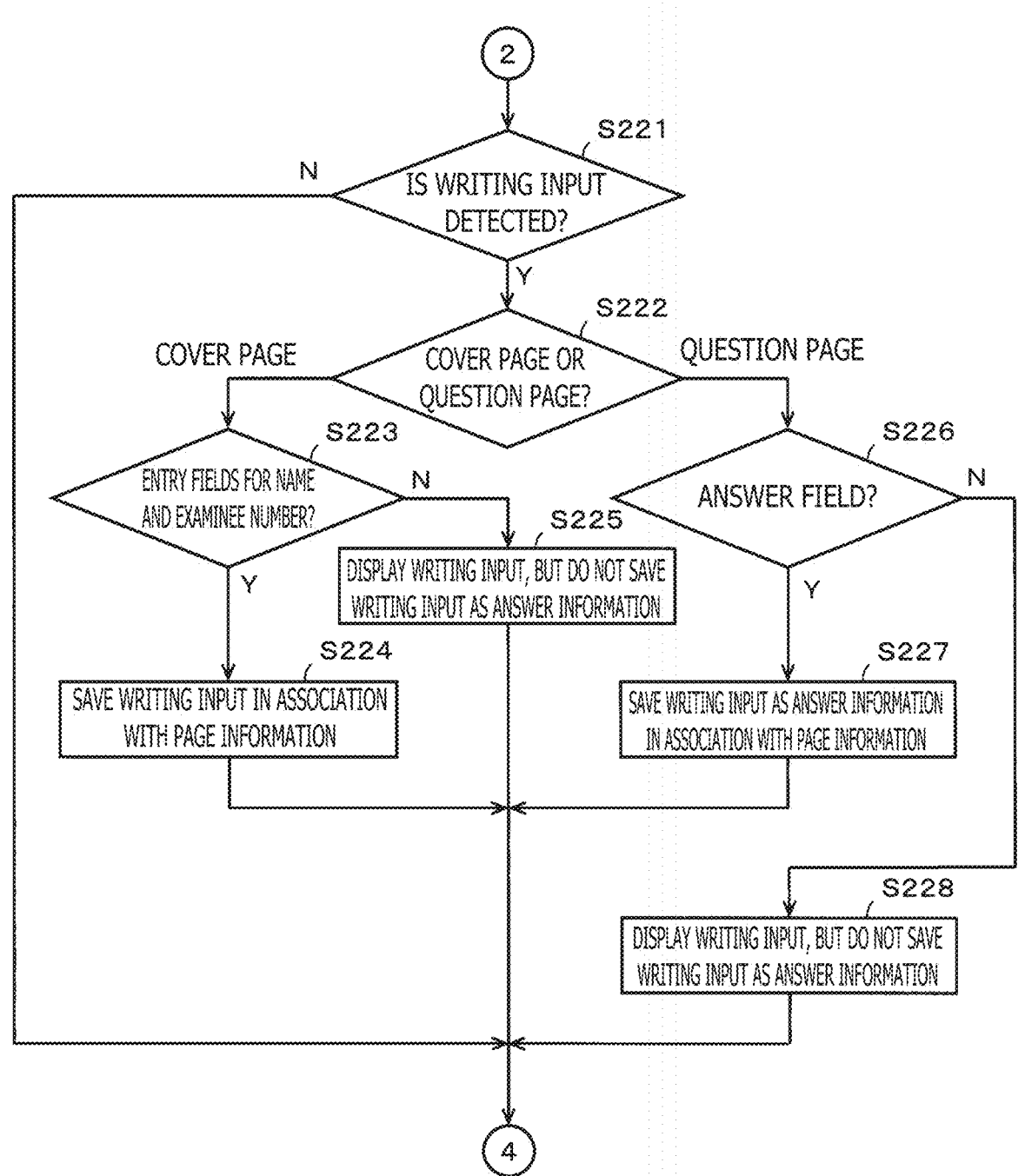
Figure 13:
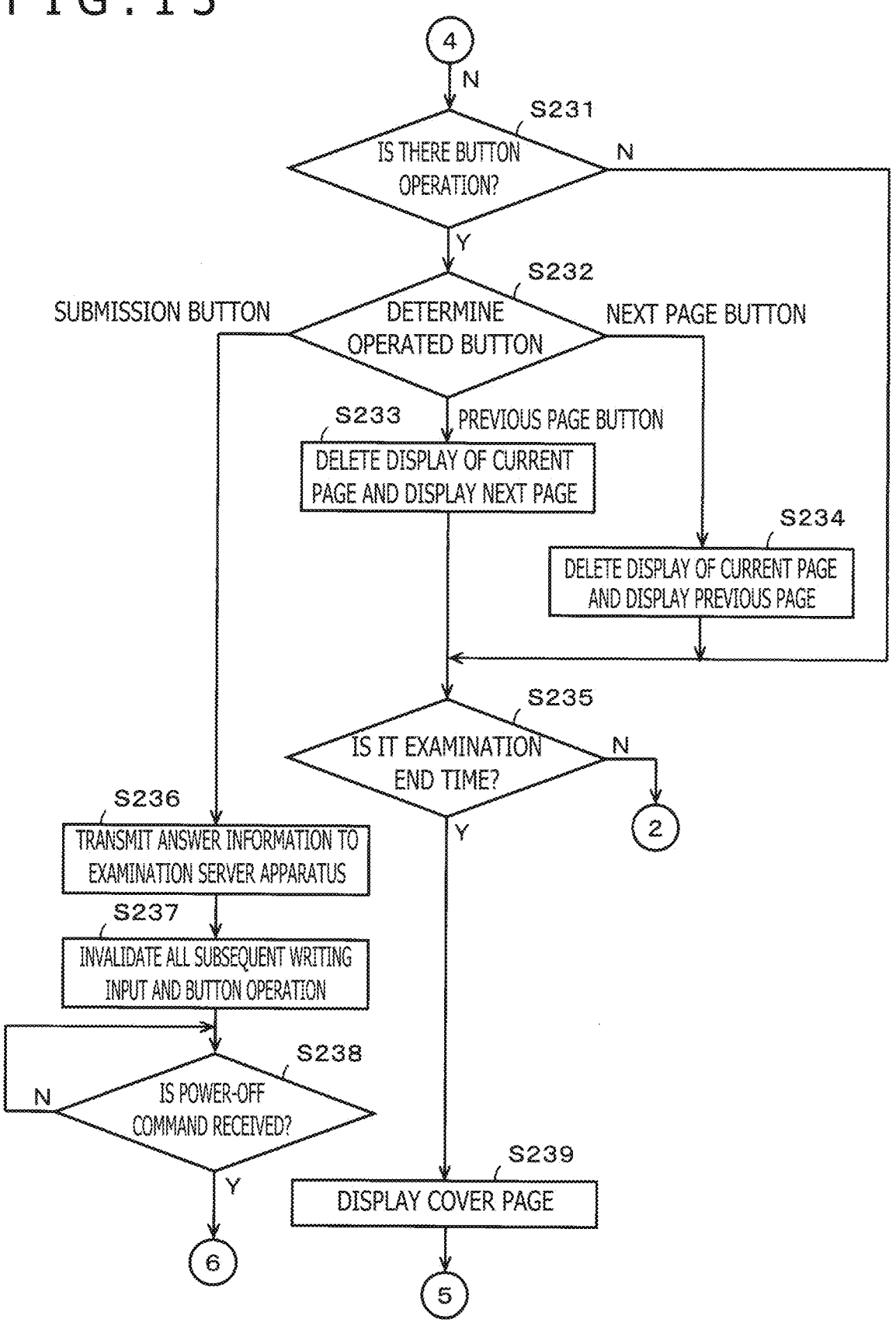
Figure 15:
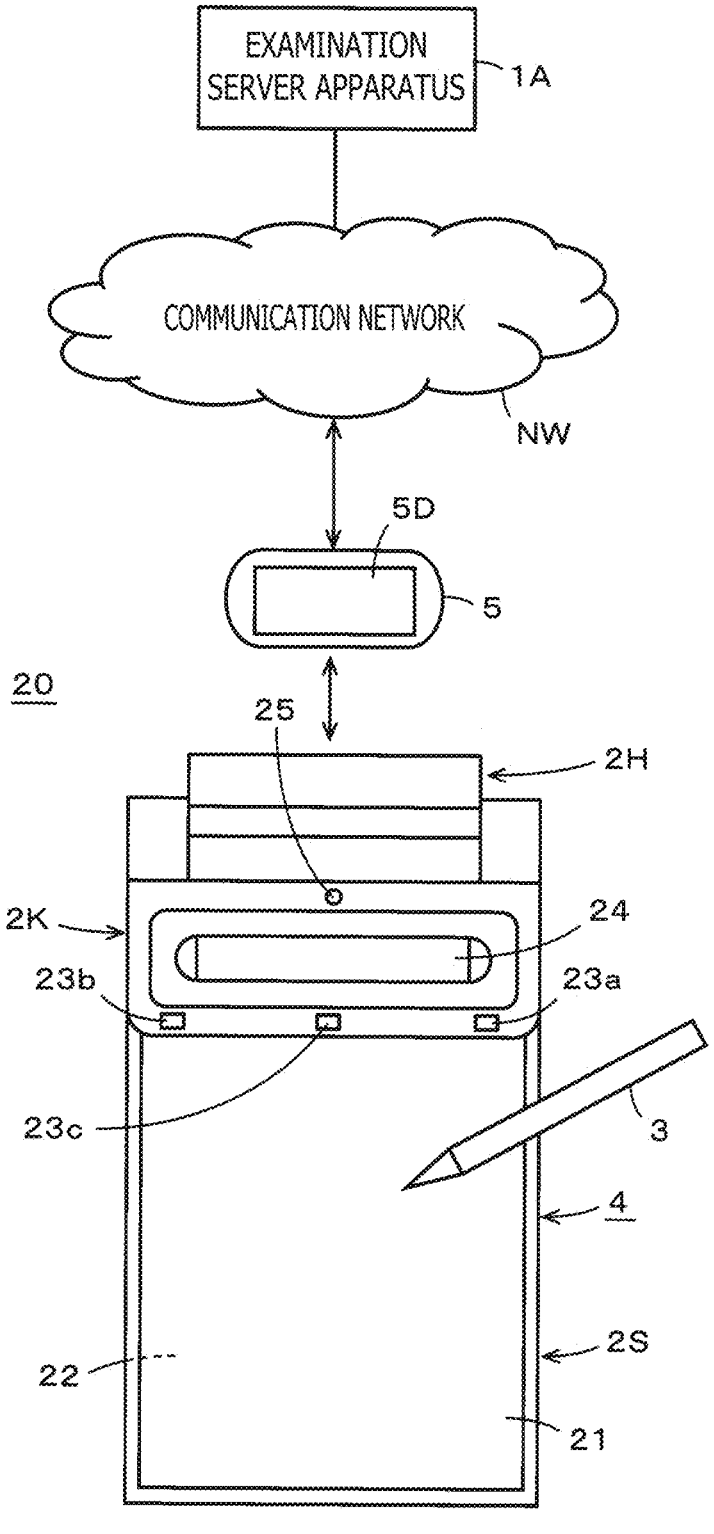
Figure 16A:
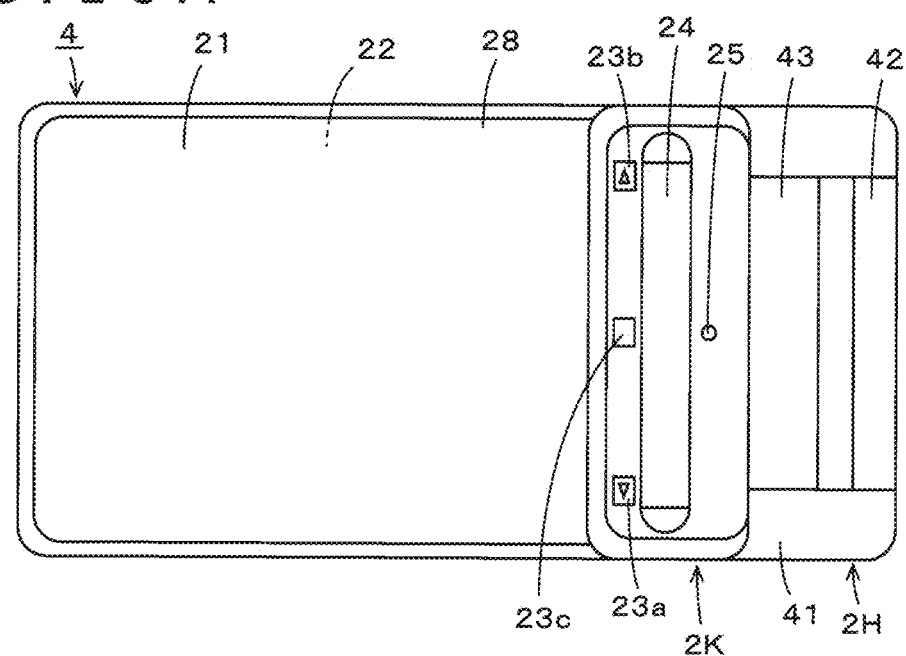
Figure 16B:
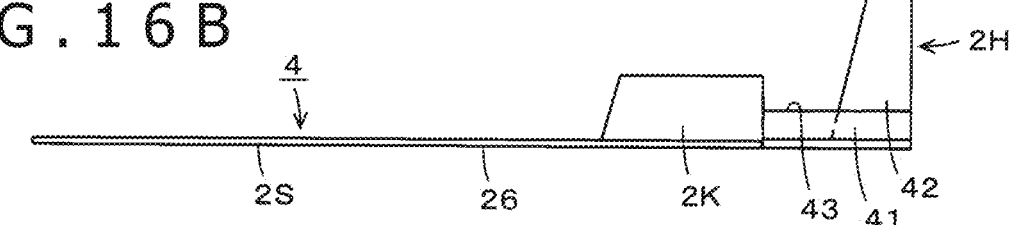
Figure 16C:
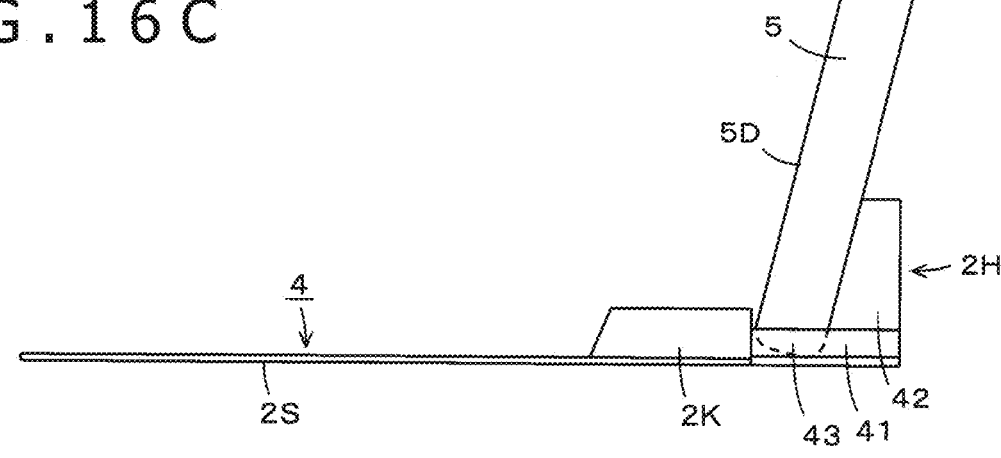
Figure 18:
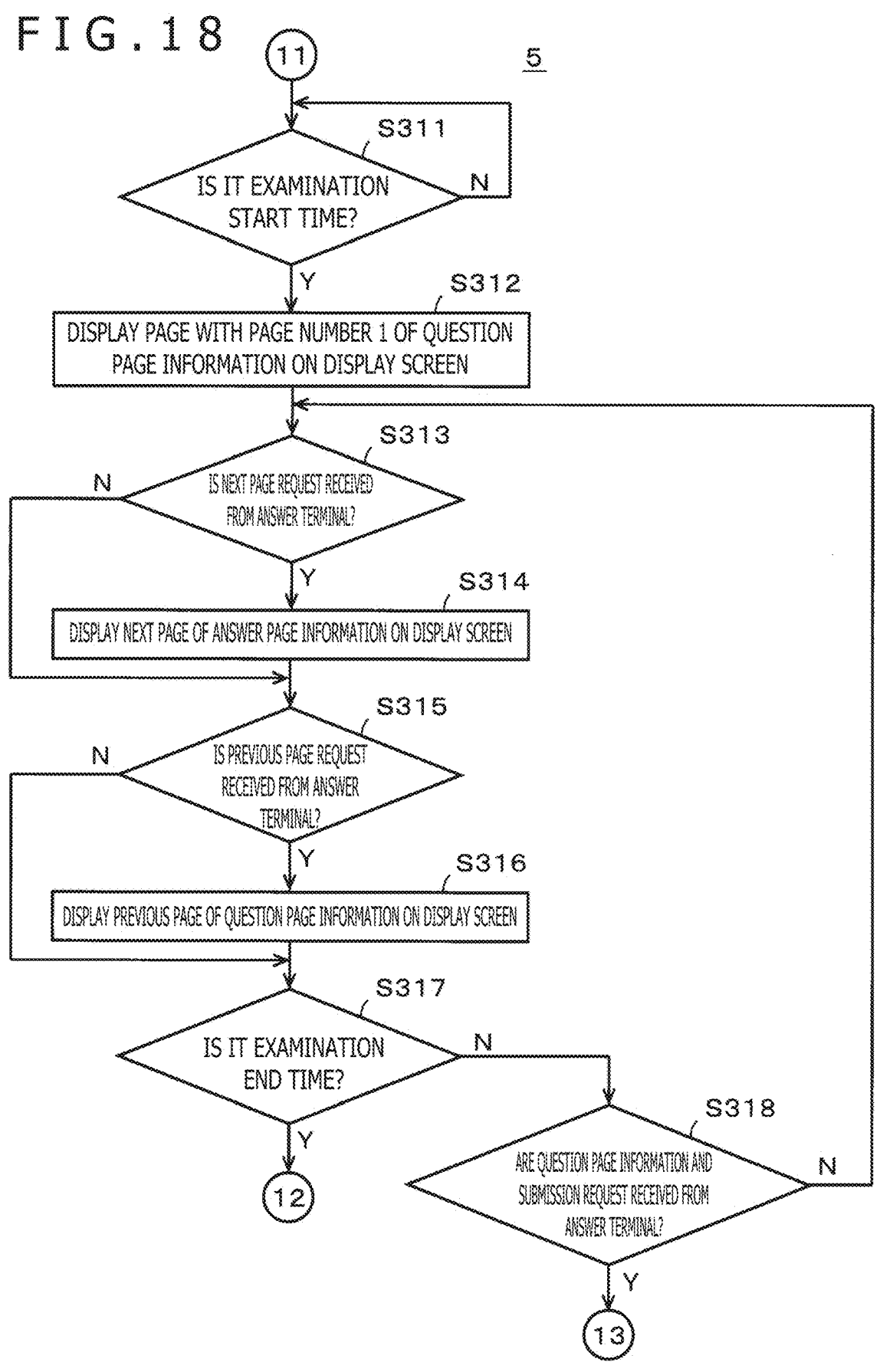
Figure 19:
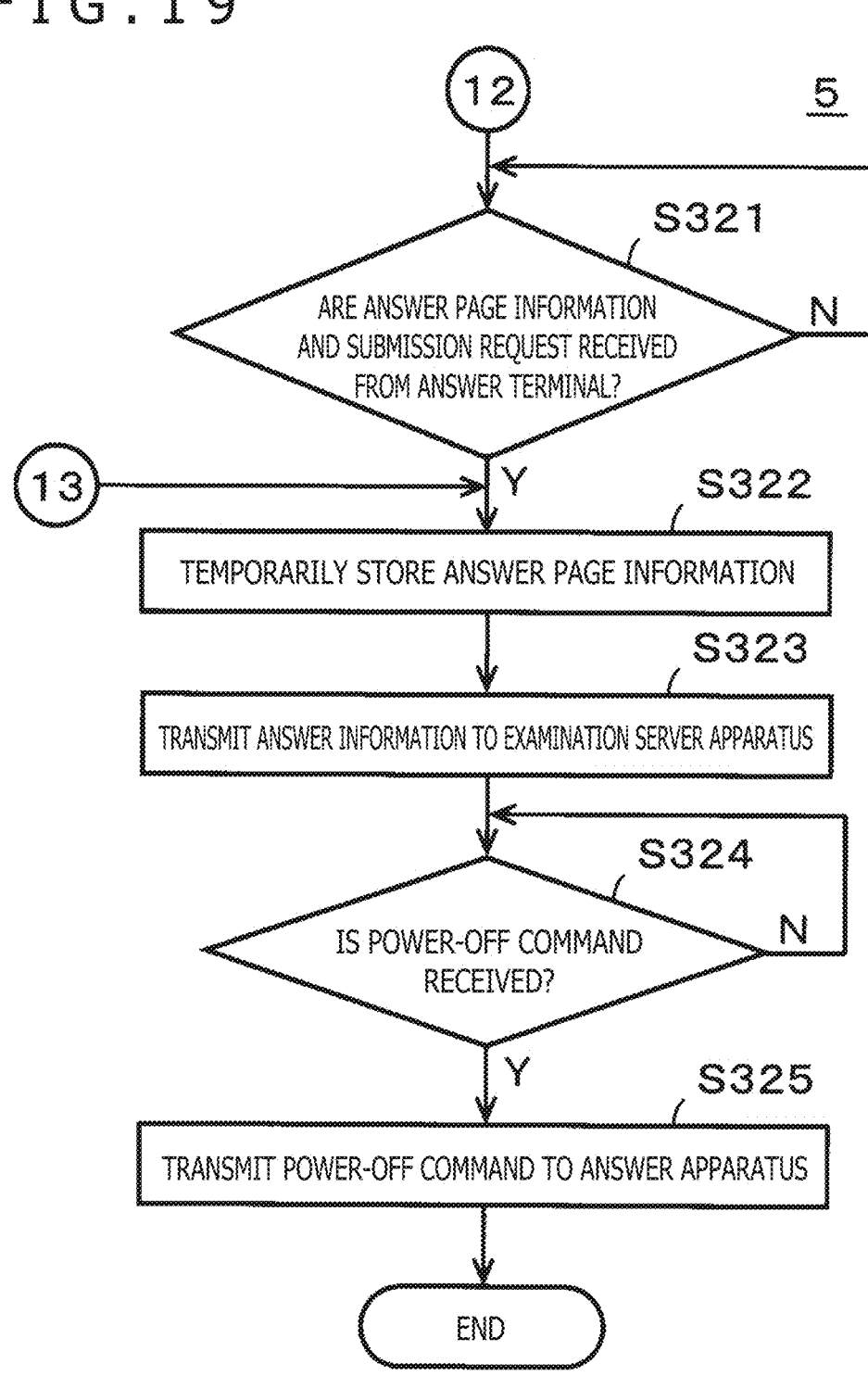
Figure 20:
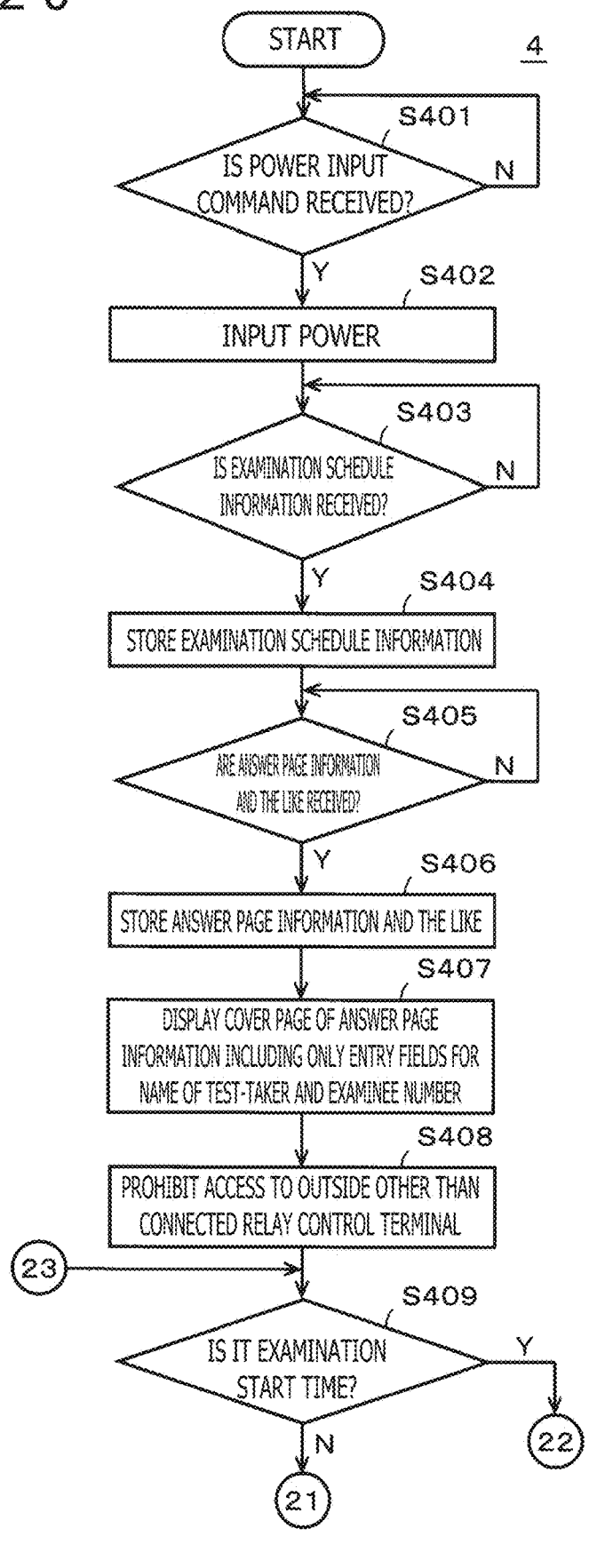
Figure 21:
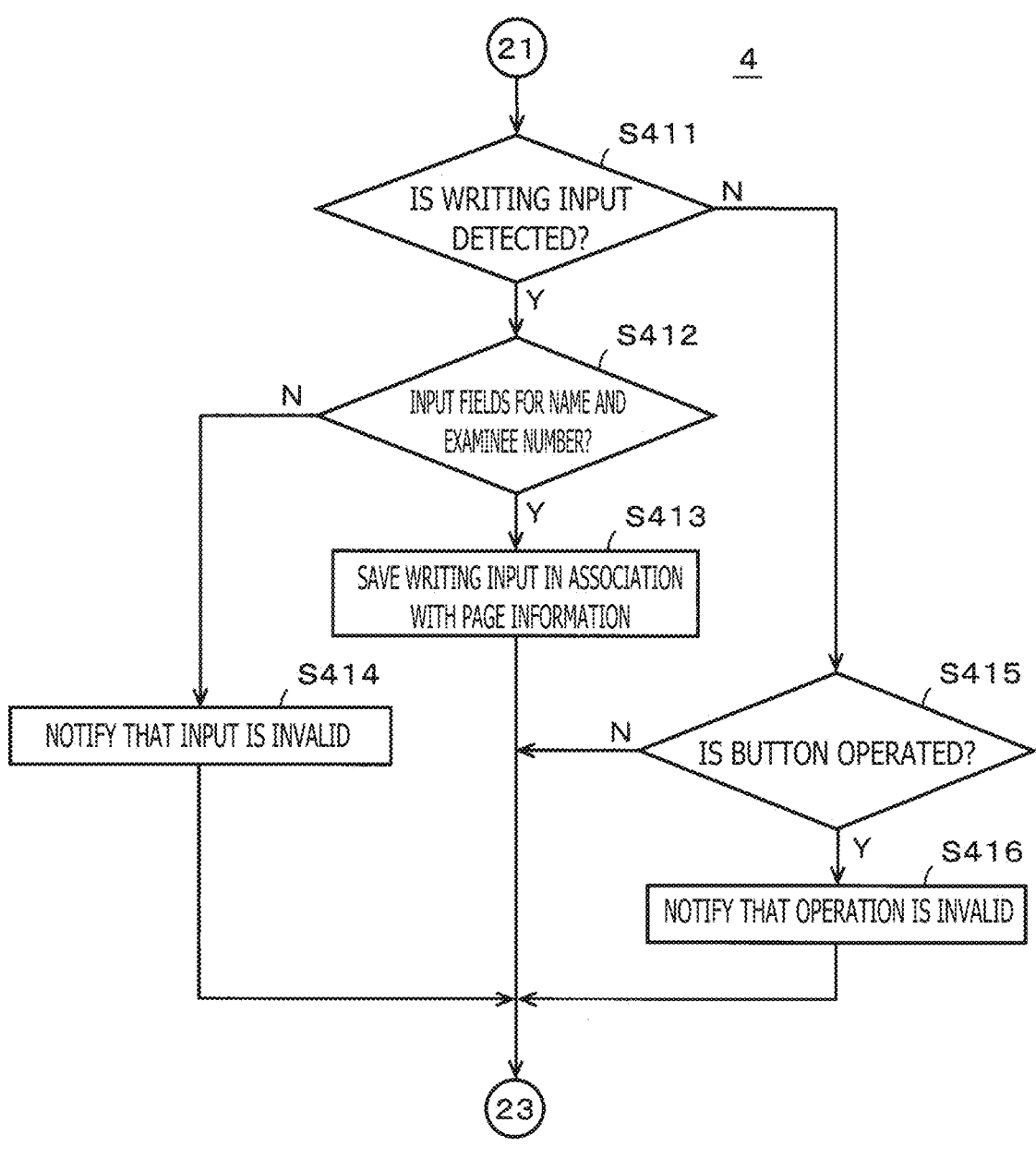

FIG. 5 depicts an external configuration example of a terminal apparatus included in the communication system of the first embodiment;

FIGS. 6A to 6C are diagrams used for describing a hardware configuration example of the terminal apparatus included in the communication system of the first embodiment;

FIG. 7 is a diagram used for describing an electrical configuration example of the terminal apparatus included in the communication system of the first embodiment;

FIG. 8 is a diagram used for describing an example of a position detection sensor and a position detection circuit unit of the terminal apparatus included in the communication system of the first embodiment;

FIG. 9 is a flow chart used for describing an example of a flow of the action of the examination server apparatus included in the communication system of the first embodiment;

FIG. 10 is a flow chart used for describing part of the example of the flow of the action of the terminal apparatus included in the communication system of the first embodiment;

FIG. 11 is a flow chart used for describing part of the example of the flow of the action of the terminal apparatus included in the communication system of the first embodiment;

FIG. 12 is a flow chart used for describing part of the example of the flow of the action of the terminal apparatus included in the communication system of the first embodiment;

FIG. 13 is a flow chart used for describing part of the example of the flow of the action of the terminal apparatus included in the communication system of the first embodiment;

FIG. 14 is a flow chart used for describing part of the example of the flow of the action of the terminal apparatus included in the communication system of the first embodiment;

FIG. 15 is a diagram used for describing an overview of a second embodiment of the communication system according to the disclosure;

FIGS. 16A to 16C are diagrams used for describing a hardware configuration example of an answer terminal included in the terminal apparatus in the communication system of the second embodiment;

FIG. 17 is a flow chart used for describing part of an example of a flow of the action of a relay control terminal included in the terminal apparatus in the communication system of the second embodiment;

FIG. 18 is a flow chart used for describing part of the example of the flow of the action of the relay control terminal included in the terminal apparatus in the communication system of the second embodiment;

FIG. 19 is a flow chart used for describing part of the example of the flow of the action of the relay control terminal included in the terminal apparatus in the communication system of the second embodiment;

FIG. 20 is a flow chart used for describing part of the example of the flow of the action of the answer terminal included in the terminal apparatus in the communication system of the second embodiment;

FIG. 21 is a flow chart used for describing part of the example of the flow of the action of the answer terminal included in the terminal apparatus in the communication system of the second embodiment;

FIG. 22 is a flow chart used for describing part of the example of the flow of the action of the answer terminal

Figure 23:
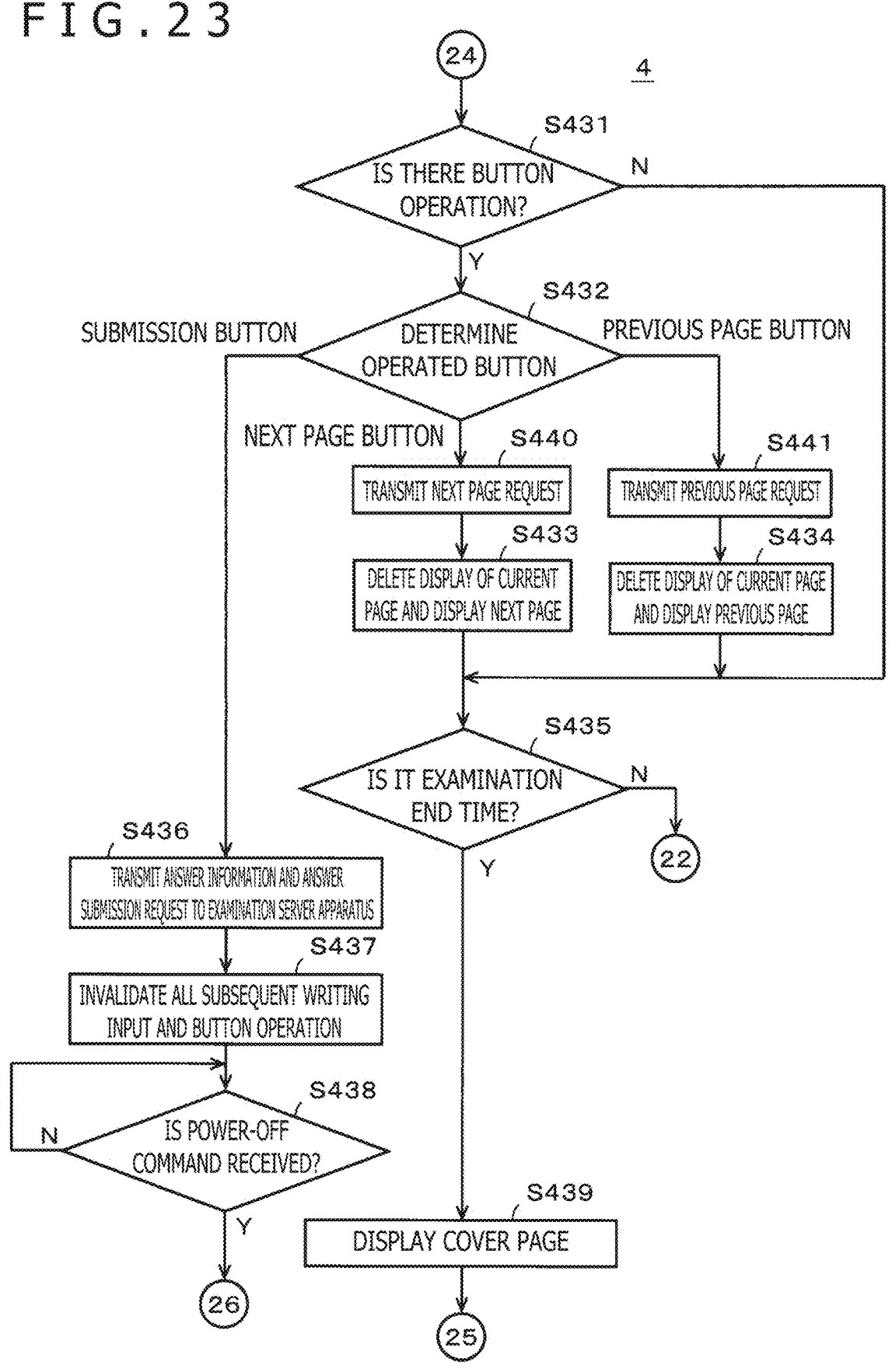
Figure 25:
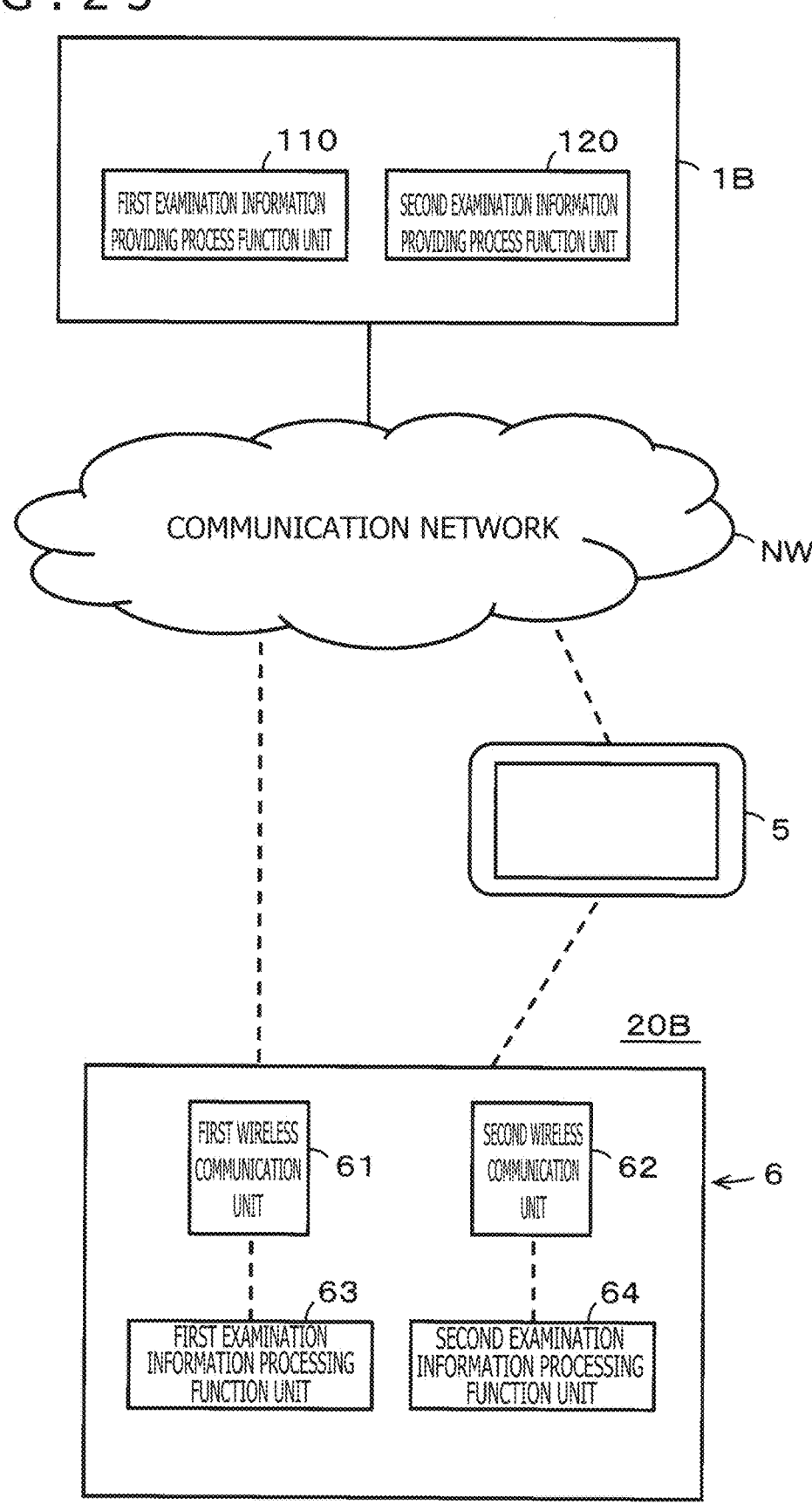
Figure 26:
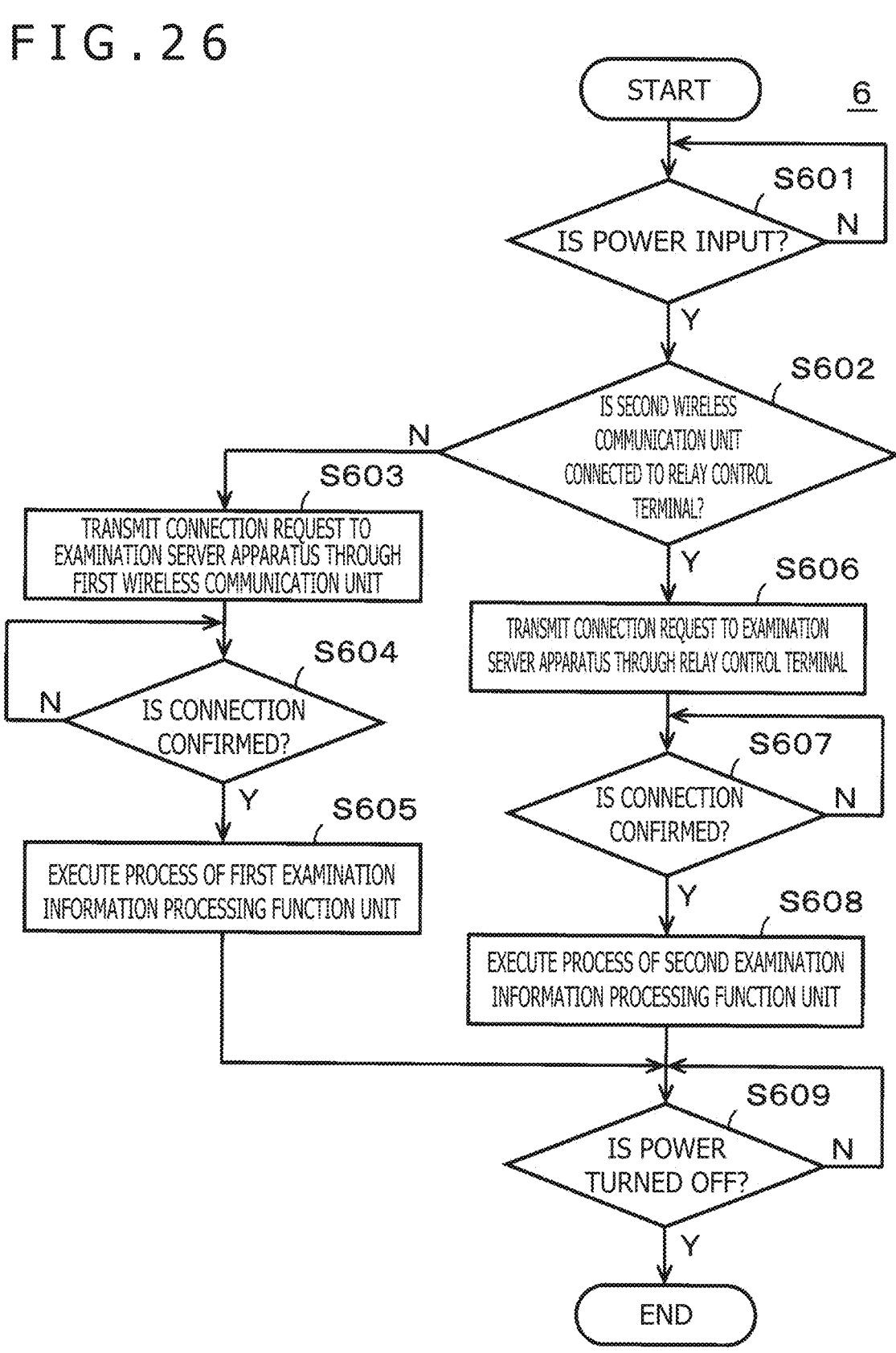

4 included in the terminal apparatus in the communication system of the second embodiment;

FIG. 23 is a flow chart used for describing part of the example of the flow of the action of the answer terminal included in the terminal apparatus in the communication system of the second embodiment;

FIG. 24 is a flow chart used for describing part of the example of the flow of the action of the answer terminal included in the terminal apparatus in the communication system of the second embodiment;

FIG. 25 is a diagram used for describing an overview of a third embodiment of the communication system according to the disclosure;

FIG. 26 is a flow chart used for describing an example of a flow of the action of the answer terminal included in the terminal apparatus in the communication system of the third embodiment;

FIG. 27 is a flow chart used for describing an example of a flow of the action of the examination server apparatus included in the communication system of the first embodiment;

FIG. 28 is a diagram used for describing an example of the terminal apparatus in another embodiment of the communication system according to the disclosure;

FIG. 29 is a diagram used for describing an example of an electronic pen used in another embodiment of the communication system according to the disclosure;

FIGS. 30A and 30B are diagrams used for describing an example of a deletion unit used in another embodiment of the communication system according to the disclosure;

FIG. 31 is a flow chart for describing the action of a fourth embodiment of the communication system according to the disclosure; and FIGS. 32A to 32C are diagrams for describing the action of the fourth embodiment of the communication system according to the disclosure.

DETAILED DESCRIPTION

Embodiments of a communication system and a terminal apparatus according to the disclosure will now be described with reference to the drawings. The communication system of the embodiments described below includes a server apparatus and a plurality of terminal apparatuses as client terminals connected through a communication network, and the system is for conducting a simultaneous examination, such as a college entrance examination, in the example.

In the example, the server apparatus is an examination server apparatus, and the terminal apparatus is an apparatus used by each test-taker to input answers and transmit the answers to the examination server apparatus. Predetermined information provided to the terminal apparatus in the example includes examination schedule information and multiple pages of examination question information including answer fields. Response information responsive to provided information (hereinafter interchangeably referred to as "response information" for short) includes handwritten answer information responsive to examination questions, including identification information of each examinee (test-taker) including the handwritten name of the examinee and the examinee number.

First Embodiment

FIG. 1 depicts an overview of a configuration in a first embodiment of the communication system according to the disclosure, and the communication system includes an examination server apparatus 1 and a plurality of terminal apparatuses 2 connected thereto through a communication network NW. The terminal apparatus 2 is a single apparatus in the first embodiment, and the terminal apparatus 2 is, for example, lent to each user (examinee) in a test center where the examinees gather. As described later, the examination question information in the example of the first embodiment includes cover page information on a cover page including entry fields for the name of each examinee and the examinee number, and question information on one or a plurality of question pages following the cover page. In the first embodiment, the question pages include questions and answer fields for the questions.

The examination server apparatus 1 may be formed of a personal computer.

The terminal apparatus 2 in the example includes electronic paper 21 as an example of a display unit that displays each page of the examination question information and includes a position detection sensor 22 on the back side of the electronic paper 21 that detects a position indication input of an electronic pen 3 serving as an example of a position indicator. An image of a written and input writing trace as an example of the position indication input of the electronic pen 3 is also displayed on the electronic paper 21.

In the embodiment, the size of a position detection area of the position detection sensor 22 is substantially the same as the size of a display area of the electronic paper 21, and the position detection area of the position detection sensor 22 and the display area of the electronic paper 21 are arranged to accurately overlap with each other. In the embodiment, the position detection sensor 22 is a position detection sensor of electromagnetic induction type that transmits and receives signals to and from the electronic pen 3 through magnetic inductive coupling to thereby detect the position indicated by the electronic pen 3.

In the first embodiment, the communication network NW includes a Wi-Fi (registered trademark) network, and the examination server apparatus 1 and the plurality of terminal apparatuses 2 wirelessly communicate with each other through an access point arranged in the test center or near the test center.

The terminal apparatus 2 in the embodiment further includes a communication unit that communicates with the examination server apparatus 1 through the communication network NW and includes a plurality of operation buttons, such as a next page button 23*a* for turning the page of the examination question information to the next page, a previous page button 23*b* for returning to the previous page, and a submission button 23*c*. The submission button 23*c* is a button for submitting the answer information, and once the submission button 23*c* is operated, the answer information including the identification information of the examinee (the name of examinee and the examinee number) is transmitted to the examination server apparatus 1 through the communication network NW.

Note that a recess portion 24 is formed on the terminal apparatus 2 in the example to place the electronic pen 3 therein. The terminal apparatus 2 is also provided with an indicator 25 including, for example, a light emitting diode (LED) for notifying the user of the state of on/off of power or for notifying that the terminal apparatus is communicating with the examination server apparatus 1.

Overview of Action in Communication System of the Example

In the first embodiment, the examination server apparatus 1 sends a power input command to all of the plurality of terminal apparatuses 2 through the communication network NW before the start of the examination to cause each terminal apparatus 2 to shift from a standby state to a power input state.

The examination server apparatus 1 then broadcasts examination schedule information including examination start time and examination end time to all of the plurality of terminal apparatuses 2 through the communication network NW. Each of the plurality of terminal apparatuses 2 stores the received examination schedule information in a storage unit.

The examination server apparatus 1 in the embodiment broadcasts the information of the examination questions including the answer fields to all of the plurality of terminal apparatuses 2 through the communication network NW before the examination start time. Each of the plurality of terminal apparatuses 2 stores the received examination question information in the storage unit at least by the examination end time.

In the embodiment, each terminal apparatus 2 that has received the examination schedule information and the examination question information performs control for ensuring fairness among the plurality of examinees in terms of time limits, such as the examination start time and the examination end time included in the examination schedule information.

In the embodiment, the terminal apparatus 2 performs, for example, the following control for ensuring fairness.

Control the area for detecting the writing input of the electronic pen 3 in the position detection area of the position detection sensor according to time limits. For example, permit the writing input to only the fields of the name of the test-taker and the examinee number before the examination start time and after the examination end time, and permit the writing input to the answer fields between the examination start time and the examination end time. Prohibit the communication with an external apparatus other than the examination server apparatus 1 through the communication network NW before the examination start time and between the examination start time and the examination end time.

Invalidate all button operations before the start of the examination and permit only the operation of the submission button after the examination end time.

If the submission button 23*c* is operated between the examination start time and the examination end time, invalidate any writing input after the submission button 23*c* is operated, and prohibit (ban) all button operations after submission button 23*c* is operated.

Allow the operation of the next page button 23*a* or the previous page button 23*b* only between the examination start time and the examination end time.

The terminal apparatus 2 transmits the answer information to the examination server apparatus 1 through the communication network NW when the submission button 23*c* is operated. In this case, the answer information to be transmitted to the examination server apparatus 1 may include all of the information of the writing input of the answers input to the answer fields, which are provided by the examination server apparatus 1, combined with the pages of the examination question information including the answer fields. However, this increases the communication traffic, which is not preferable in terms of communication load. Therefore, the answer information in the embodiment may include information of each page (page number information) and information of the writing input of the answers on that page (that is, time-series information of coordinate position information in the position detection area of the position detection sensor 22), without including the examination question information.

Because the position range of the answer field of each question number included in each page of the examination questions is set for each page, the examination server apparatus 1 can recognize the question number of each answer as long as the examination server apparatus 1 can recognize the page number and the coordinate position information of the answer information which is input by writing.

In the embodiment, the examination server apparatus 1 sends a power-off command to the terminal apparatus 2 through the communication network NW after the examination end time and after a certain period of time to allow the examinee to leave the test center, and the terminal apparatus 2 turns off the power in response to the power-off command.

In this way, an examination system that eliminates unfairness among the examinees who use the terminal apparatuses 2 can be constructed according to the communication system including the examination server apparatus 1 and the terminal apparatuses 2 of the embodiment.

Detailed configuration examples and action examples of the examination server apparatus 1 and the terminal apparatus 2 included in the communication system of the embodiment will be described.

Electrical Configuration Example of Examination Server Apparatus

Figure 2:
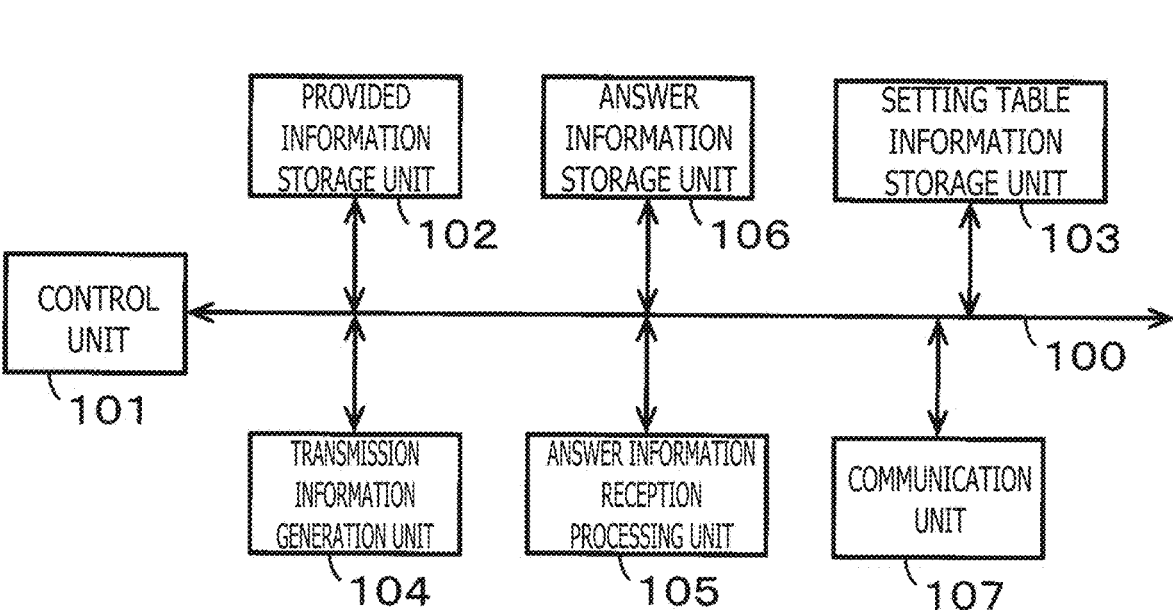
FIG. 2 is a block diagram illustrating a configuration example of an examination server apparatus included in the communication system of the first embodiment.

FIG. 2 is a block diagram illustrating an electrical configuration example of the examination server apparatus 1. As illustrated in FIG. 2, the examination server apparatus 1 includes a control unit 101, a provided information storage unit 102, a setting table information storage unit 103, a transmission information generation unit 104, an answer information reception processing unit 105, an answer information storage unit 106, and a communication unit 107 that are all connected to a system bus 100.

The control unit 101 includes, for example, a processor, and controls the action of the examination server apparatus 1. The communication unit 107 in the example includes a Wi-Fi (registered trademark) wireless communication unit, as described above.

The provided information storage unit 102 stores a power input command, a power-off command, examination schedule information, examination question information including answer fields, and the like.

In the embodiment, the examination question information includes a plurality of pages including one cover page and one or a plurality of question pages. Each page is provided with a page number of the page. The cover page is provided with, for example, an entry field NA for the name of the examinee and an entry field NB for the examinee number, as illustrated in FIG. 3A. Each question page of the examination question information includes one or a plurality of questions as illustrated in FIG. 3B, and each question includes a question number LA of the question, a question sentence (text) LB, and an answer field LC for the question sentence LB. The terminal apparatus 2 receives the examination question information and displays the entry field NA for the name of the examinee, the entry field NB for the examinee number, the question number LA, the question sentence LB, and the answer field LC on the electronic paper 21, as illustrated in FIG. 3B.

The size of the cover page and each question page of the examination question information is substantially equal to the size of the display area of the electronic paper 21. Therefore, the size of each page of the examination question information is also equal to the size of the position detection area of the position detection sensor 22. Thus, the position ranges of the entry field NA for the name of the examinee and the entry field NB for the examinee number on the cover page and the position ranges of the answer fields for the questions on each question page can be configured to correspond to coordinate ranges in the position detection area of the position detection sensor 22.

For example, when the entry field NA for the name of the examinee and the entry field NB for the examinee number on the cover page and the answer fields LC on the question pages are rectangular areas as illustrated in FIGS. 3A and 3B, the position range of each rectangular area can be specified by, for example, the coordinates of the upper left corner and the coordinates of the lower right corner of the corresponding rectangular area in the position detection area of the position detection sensor 22.

In this case, the setting table information storage unit 103 stores, as illustrated in FIG. 4, the setting table information that stores the correspondence among each of the cover page number and the question page numbers, the field names included in each page, and the position ranges for the field names (i.e., the position ranges in the position detection area of the position detection sensor). In the example of FIG. 4, the page number of the cover page is "0," and the page numbers of the question pages are "1," "2," etc.

As illustrated in FIG. 4, in the setting table information, the examinee name field and the examinee number field on the cover page are respectively associated with the information of the position ranges in the position detection area of the position detection sensor 22, and the answer fields of the question numbers on each question page are respectively associated with the information of the position ranges in the position detection area of the position detection sensor 22. The setting table information is information which specifies entry fields for the response information responsive to provided information, such as the examinee name field, the examinee number field, and the answer fields.

The transmission information generation unit 104 reads the power input command, the power-off command, the examination schedule information, and the examination question information including the answer fields from the provided information storage unit 102 and reads the setting table information from the setting table information storage unit 103 to generate transmission information under the control of the control unit 101. The transmission information generation unit 104 broadcasts the transmission information to the plurality of terminal apparatuses 2 through the communication unit 107 and the communication network NW.

The answer information reception processing unit 105 stores, in the answer information storage unit 106, the answer information from the terminal apparatus 2 received through the communication unit 107. For each piece of the answer information stored in the answer information storage unit 106, the answer information reception processing unit 105 executes a process of using the setting table information of the setting table information storage unit 103 to acquire the identification information of the answer information including the information of the examinee name field and the information of the examinee number field on the cover page and associating each question number on each question page with the information of the answer field for the question of each question number.

In this way, the answer information collected by the examination server apparatus 1 in the embodiment is stored for each examinee as information including the question numbers and the information of the answers. Therefore, the examination server apparatus 1 side can easily determine, for each examinee, the correspondence between the question numbers and the answers of the question numbers, which advantageously allows for easy grading of the answers of each examinee.

When the answer to a question of the question number is a singularly set (defined) answer instead of a written descriptive answer, answer information of the correct answer for the question of the question number may be prepared, and the examination server apparatus 1 may electronically grade the answer for the question of the question number without involvement of the examiner, for example.

In the block diagram of FIG. 2, the processing units such as the transmission information generation unit 104 and the answer information reception processing unit 105 may be function processing units executed by the control unit 101 with use of software programs.

External Configuration Example of Terminal Apparatus 2

FIG. 5 is an external perspective view of the terminal apparatus 2 according to the embodiment. FIG. 6A is a plan view of the terminal apparatus 2 in the first embodiment. FIG. 6B is a side view of the terminal apparatus 2. FIG. 6C is a partial cross-sectional view of the part surrounded by a circle in FIG. 6B.

As illustrated in FIGS. 5 and 6A, the terminal apparatus 2 has a rectangular plate-shaped body and includes a sheet-shaped portion 2S and an electronic component housing portion 2K. In the terminal apparatus 2 of the embodiment, the electronic component housing portion 2K is formed on one end side in the long side direction of the rectangular sheet-shaped portion 2S.

As illustrated in FIGS. 5, 6A, and 6B, the sheet-shaped portion 2S has an ultra-thin thickness of, for example, three millimeters and has a sheet shape of, for example, A4 paper size. As illustrated in FIG. 6C, the electronic paper 21 and the position detection sensor 22 are arranged on the sheet-shaped portion 2S.

More specifically, as illustrated in the cross-sectional view of FIG. 6C, a thin base member 26 made of, for example, a resin is arranged on the bottom surface side of the terminal apparatus 2, and a frame case 27 made of, for example, a resin is arranged to surround the circumference of the base member 26. The position detection sensor 22 including a plurality of loop coils formed on, for example, a flexible board is arranged on a recess portion formed on the base member 26 surrounded by the frame case 27, and the electronic paper 21 is arranged on the position detection sensor 22.

The electronic paper 21 in the example includes a micro-capsule electrophoretic module (electrophoretic display (EPD)). In the example, the upper surface of the electronic paper 21 is covered and protected by a transparent protection layer 28, as illustrated in FIG. 6C.

In this case, the size of the position detection area of the position detection sensor 22 and the size of the display area of the electronic paper 21 are substantially the same, and the electronic paper 12 and the position detection sensor 22 are arranged such that the areas accurately overlap with each other. In the example, the size of the position detection area of the position detection sensor 22 and the display area of the electronic paper 21 covers substantially the entire surface of the sheet-shaped portion 2S as indicated by dotted lines in FIGS. 5 and 6A.

Therefore, the user can view an image of the question sentence displayed on the electronic paper 21 of the sheet-shaped portion 2S and use the electronic pen 3 to write and input an answer at the position of the answer field indicated in the display image. The writing input of the answer written in the answer field is read through the position detection sensor and converted into electronic data.

As illustrated in FIGS. 5 and 6B, the electronic component housing portion 2K has a trapezoidal shape with a predetermined height, such as a height of 15 millimeters, from the bottom surface of the terminal apparatus 2. Circuit components, such as a position detection circuit connected to the position detection sensor 22 and a display control circuit of the electronic paper 21, are housed in the electronic component housing portion 2K. In the example, the horizontal length of the electronic component housing portion 2K is substantially equal to the length in the horizontal direction of the terminal apparatus 2, and the vertical length of the electronic component housing portion 2K is a length that allows the electronic components to be house therein, the length being approximately 60 to 70 millimeters in the example.

As illustrated in FIGS. 5 and 6A, the next page button 23a, the previous page button 23b, and the submission button 23c are provided on and exposed from the electronic component housing portion 2K to allow for operation of the buttons. The recess portion 24 in which the electronic pen 3 is placed is formed on the electronic component housing portion 2K, and the indicator 25 is provided on the electronic component housing portion 2K.

In the embodiment, a terminal, which is a universal serial bus (USB) connector 29 in the example, for charging a rechargeable battery included in the terminal apparatus 2 or for exchanging data with electronic circuits inside the electronic component housing portion 2K is provided on the side surface of the electronic component housing portion 2K.

Electrical Configuration Example of Terminal Apparatus 2

FIG. 7 is a block diagram illustrating an electrical configuration example of the terminal apparatus 2. As illustrated in FIG. 7, the terminal apparatus 2 includes a control unit 201, a wireless communication unit 202, a received information processing unit 203, an examination schedule information storage unit 204, an examination question information storage unit 205, a clock circuit unit 206, a transmission information generation unit 207, a display information generation unit 208, a display control unit 209, a position detection circuit unit 210, a writing input information validity determination unit 211, an answer information storage unit 212, an operation button interface (interface is referred to as I/F in FIG. 7, the same applies hereinafter) 213, a button operation validity determination unit 214, an indicator interface 215, a beep sound notification unit 216, a USB interface 217, and a charge control unit 218 that are all connected to a system bus 200.

The control unit 201 includes, for example, a processor, and controls the terminal apparatus 2. Before the input of power based on the power input command from the examination server apparatus 1, the terminal apparatus 2 of the embodiment is in the standby state in which the power voltage is supplied to the control unit 201 and the wireless communication unit 202.

The wireless communication unit 202 includes a Wi-Fi (registered trademark) wireless communication unit in the embodiment, and the wireless communication unit 202 is used for communicating with the examination server apparatus 1 through the communication network NW.

The received information processing unit 203 determines the information received through the wireless communication unit 202 under the control of the control unit 201. The received information processing unit 203 stores the examination schedule information received from the examination server apparatus 1 in the examination schedule information storage unit 204 and stores the examination question information and the setting table information in the examination question information storage unit 205.

When the received information processing unit 203 determines that a power input command from the examination server apparatus 1 is received, the control unit 201 controls a battery 219 to supply the power supply voltage to each unit. When the received information processing unit 203 determines that a power-off command from the examination server apparatus 1 is received, the control unit 201 controls the battery 219 to cut off the supply of the power supply voltage to each unit.

The clock circuit unit 206 provides time information of hour, minute, and second. As described later, the clock circuit unit 206 is used to, for example, control the writing input of the electronic pen 3 through the position detection sensor 22, control the reception of the operation of the operation buttons 23a, 23b, and 23c, and control the display of the electronic paper 21 on the basis of the examination start time and the examination end time included in the examination schedule information.

The clock circuit unit 206 adjusts the time (is synchronized) in advance for all of the terminal apparatuses 2 installed in the test center. A time adjustment (synchronization) command from the examination server apparatus 1 may be used to adjust the time, or another apparatus may be used to adjust the time. The clock circuit unit 206 may include a radio clock to autonomously keep the accurate time all the time.

The transmission information generation unit 207 generates information to be transmitted from the terminal apparatus 2 through the wireless communication unit 202, that is, the transmission information of the answer information.

As described later, the received information processing unit 203 in the embodiment is controlled to handle only the information from the examination server apparatus 1 as received information. The transmission information generation unit 207 is controlled to generate only the transmission information for the examination server apparatus 1, and the wireless communication unit 202 is controlled to communicate with only the examination server apparatus 1.

The display information generation unit 208 generates display image information to be displayed on the electronic paper 21 and sends the display image information to the display control unit 209. The electronic paper 21 is connected to the display control unit 209, and the display control unit 209 controls the electronic paper 21 to display a display image based on the display image information generated by the display information generation unit 208.

Under the control of the control unit 201, the display information generation unit 208 in the embodiment controls the display image information to be displayed on the electronic paper 21 on the basis of the examination schedule information stored in the examination schedule information storage unit 204.

More specifically, the display information generation unit 208 can read only the information of the cover page of the examination question information from the examination question information storage unit 205 before the examination start time. The display information generation unit 208 generates display image information of the cover page that displays the fields for entering only the name of the test-taker and the examinee number and displays the display image information on the electronic paper 21 through the display control unit 209. Between the examination start time and the examination end time, the display information generation unit 208 can read the information of the cover page and all of the question pages in the examination question information from the examination question information storage unit 205. The display information generation unit 208 can generate display image information of the page of the examination question information indicated (specified) by the examinee and display the display image information on the electronic paper 21 through the display control unit 209. After the examination end time, the display information generation unit 208 can read only the information of the cover page of the examination question information from the examination question information storage unit 205. The display information generation unit 208 generates display image information of the cover page that displays the fields for entering only the name of the test-taker and the examinee number and displays the display image information on the electronic paper 21 through the display control unit 209.

The position detection sensor 22 is connected to the position detection circuit unit 210. The position detection circuit unit 210 detects the position indicated by the electronic pen 3 in the position detection area of the position detection sensor 22. The position detection circuit unit 210 acquires information of the writing trace (writing input information) as time-series information of the detection result of the indicated position and transmits the writing input information to the system bus 200. FIG. 8 illustrates a detailed configuration example of the position detection circuit unit 210 and the position detection sensor 22.

As illustrated in FIG. 8, the electronic pen 3 that transmits and receives signals to and from the position detection sensor 22 of the embodiment includes a resonant circuit including a coil 31 and a capacitor 32 connected in parallel to the coil 31.

In the example of FIG. 8, the position detection sensor 22 includes X-axis direction loop coils 22X including n (n is an integer equal to or greater than 2) rectangular loop coils 22X$_1$ to 22X$_n$ arrayed in an X-axis direction and a Y-axis direction loop coils 22Y including m (m is an integer equal to or greater than 2) loop coils 22Y$_1$ to 22Y$_m$ arrayed in a Y-axis direction, where the X-axis direction is the vertical direction of the sheet-shaped portion 2S and the Y-axis direction is the horizontal direction.

In the example of FIG. 8, the position detection circuit unit 210 includes a selection circuit 2101, an oscillator 2102, a current driver 2103, a transmission reception switch circuit 2104, a reception amplifier 2105, an indicated position detection circuit 2106, and a processing control unit 2107.

The selection circuit 2101 sequentially selects each of the plurality of X-axis direction loop coils 22X and the plurality of Y-axis direction loop coils 22Y and causes the selected loop coil to transmit a signal to the electronic pen 3 and receive a signal fed back from the electronic pen 3.

The transmission reception switch circuit 2104 controlled and switched by the processing control unit 2107 is connected to the selection circuit 2101. When the transmission reception switch circuit 2104 is connected to a transmission side terminal T, an alternate current signal is supplied from the oscillator 2102 to the selection circuit 2101. When the transmission reception switch circuit 2104 is connected to a reception side terminal R, a signal from the selection circuit 2101 is supplied to the indicated position detection circuit 2106 through the reception amplifier 2105.

The indicated position detection circuit 2106 detects an induced voltage, that is, a received signal, generated in the loop coil of the position detection sensor 22. The indicated position detection circuit 2106 converts the detection output signal into a digital signal and outputs the digital signal to the processing control unit 2107. The processing control unit 2107 calculates the coordinate values of the position in the X-axis direction and the Y-axis direction indicated by the electronic pen 3 based on the digital signal from the indicated position detection circuit 2106, that is, the level of the voltage value of the induced voltage generated in each loop coil. The processing control unit 2107 sends writing input information including time-series data of the calculated coordinate values to the system bus 200.

The writing input information validity determination unit 211 determines the validity of the writing input information from the position detection circuit unit 210 on the basis of the time set in the examination schedule information stored in the examination schedule information storage unit 204. In the embodiment, the writing input information validity determination unit 211 determines that, before the examination start time and after the examination end time, the writing input information on the cover page of the examination questions displaying the fields for entering the name of the test-taker and the examinee number is valid and the writing input information on the pages other than the cover page is invalid. The writing input information validity determination unit 211 determines that the writing input information on all pages of the examination questions is valid between the examination start time and the examination end time.

Note that the display information generation unit 208 generates the display image information from the writing input information determined to be valid, and the display control unit 209 displays the display image at the position of the electronic paper 21 where the writing input information is indicated and input by the electronic pen 3.

The writing input information determined to be valid by the writing input information validity determination unit 211 is stored as answer information in the answer information storage unit 212. In this case, the writing input information of the name of the examinee and the examinee number on the cover page of examination questions is stored as identification information of the examinee associated with the answer information.

An operation button group 23 including the next page button 23a, the previous page button 23b, and the submission button 23c is connected to the operation button interface 213. The operation button interface 213 detects the operated one of the next page button 23a, the previous page button 23b, and the submission button 23c of the operation button group 23 and transmits the information of the detected operation button to the system bus 200.

The button operation validity determination unit 214 determines the validity of the information of the operation button detected by the operation button interface 213 on the basis of the time set in the examination schedule information stored in the examination schedule information storage unit 204. In the embodiment, the button operation validity determination unit 214 determines that the operation of all operation buttons of the operation button group 23 is invalid before the examination start time. After the examination end time, the button operation validity determination unit 214 determines that only the operation of the submission button 23c is valid and determines that the operation of the other operation buttons is invalid. The button operation validity determination unit 214 determines that the operation of all operation buttons of the operation button group 23 is valid between the examination start time and the examination end time.

The control unit 201 executes a process corresponding to the operation of the operation button determined to be valid by the button operation validity determination unit 214. More specifically, when the operation button determined to be valid is the next page button 23a, the control unit 201 reads the examination question information on the next page of the page displayed on the electronic paper 21 from the examination question information storage unit 205 and controls the electronic paper 21 to display the examination question information of the relevant page. When the operation button determined to be valid is the previous page button 23b, the control unit 201 reads the examination question information of the previous page of the page displayed on the electronic paper 21 from the examination question information storage unit 205 and controls the electronic paper 21 to display the examination question information of the relevant page. When the operation button determined to be valid is the submission button 23c, the control unit 201 controls the wireless communication unit 202 to transmit the answer information stored in the answer information storage unit 212 to the examination server apparatus 1 through the transmission information generation unit 207.

The indicator 25 is connected to the indicator interface 215. The indicator interface 215 turns on or off an LED included in the indicator 25 to notify the user of on/off of power under the control of the control unit 201 or flashes the LED included in the indicator 25 to notify the user of the fact that the writing input of the electronic pen 3 is determined to be invalid or the fact that the operation of the operation button of the operation button group 23 is determined to be invalid.

The beep sound notification unit 216 emits a beep sound to notify the user of the invalidity of the writing input information of the electronic pen 3 or the invalidity of the operation of the operation button group 23.

The USB connector 29 is connected to the USB interface 217. When an external apparatus is connected to the USB connector 29 through a USB cable, the USB interface 217 sends a notification of the connection to the control unit 201. The control unit 201 activates the charge control unit 218 in response to the connection notification. The charge control unit 218 is connected to the USB connector 29 and connected to the battery 219. The charge control unit 218 uses the charge current sent through the USB connector 29 to charge the battery 219.

In the block diagram illustrated in FIG. 7, the received information processing unit 203, the transmission information generation unit 207, the display information generation unit 208, the display control unit 209, the writing input information validity determination unit 211, and the button operation validity determination unit 214 may be function processing units executed by the control unit 201 with use of software programs.

Example of Flow of Action of Communication System in First Embodiment

A flow of the action of the examination server apparatus 1 and the terminal apparatus 2 in administering a simultaneous examination with use of the first embodiment of the communication system configured as described above will be described.

Example of Flow of Action of Examination Server Apparatus 1

FIG. 9 is a flow chart illustrating an example of a flow of the action of the examination server apparatus 1 in administering a simultaneous examination with use of the first embodiment of the communication system configured as described above. In the following description, the processing units such as the transmission information generation unit 104 and the answer information reception processing unit 105 are function processing units executed by the control unit 101 of the examination server apparatus 1 using software programs.

The control unit 101 reads the power input command from the provided information storage unit 102 and broadcasts the power input command to the plurality of terminal apparatuses 2 through the communication network NW (step S101). The control unit 101 reads the examination schedule information from the provided information storage unit 102 and similarly broadcasts the examination schedule information to the plurality of terminal apparatuses 2 through the communication network NW (step S102). The control unit 101 similarly broadcasts the examination question information read from the provided information storage unit 102 and the setting table information read from the setting table information storage unit 103 to the plurality of terminal apparatuses 2 through the communication network NW (step S103).

The control unit 101 monitors the reception of the answer information from the terminal apparatus 2 (step S104). If the control unit 101 determines that the answer information is received, the control unit 101 stores the received answer information in the answer information storage unit 106 (step S105).

The control unit 101 determines, for example, whether predetermined time has passed after the examination end time to determine whether acceptance (receipt) of the answer information is finished (step S106). If the control unit 101 determines that the acceptance of the answer information is not finished, the control unit 101 returns the process to step S104 and repeats the process from step S104. If the control unit 101 determines that the acceptance of the answer information is finished in step S106, the control unit 101 reads the power-off command from the provided information storage unit 102 and broadcasts the power-off command to the plurality of terminal apparatuses 2 through the communication network NW (step S107). The control unit 101 ends the processing routine.

Example of Flow of Action of Terminal Apparatus 2

FIGS. 10 to 14 are flow charts illustrating an example of a flow of the action of the terminal apparatus 2 in conducting a simultaneous examination with use of the first embodiment of the communication system configured as described above. In the following description, the processing units including the received information processing unit 203, the transmission information generation unit 207, the display information generation unit 208, the display control unit 209, the writing input information validity determination unit 211, and the button operation validity determination unit 214 are function processing units executed by the control unit 201 of the terminal apparatus 2 with use of software programs.

The control unit 201 of the terminal apparatus 2 in the standby state monitors the reception of the power input command from the examination server apparatus 1 through the communication network NW and waits for the reception of the power input command (step S201 of FIG. 10). If the control unit 201 determines that the power input command is received in step S201, the control unit 201 supplies the power supply voltage from the battery 219 to each component to input power to the terminal apparatus 2 (step S202).

The control unit 201 monitors the reception of the examination schedule information from the examination server apparatus 1 through the communication network NW and waits for the reception of the examination schedule information (step S203). If the control unit 201 determines that the examination schedule information is received in step S203, the control unit 201 stores the received examination schedule information in the examination schedule information storage unit 204 (step S204).

The control unit 201 monitors the reception of the examination question information and the setting table information from the examination server apparatus 1 through the communication network NW and waits for the reception of the examination question information and the setting table information (step S205). If the control unit 201 determines that the examination question information and the setting table information are received in step S205, the control unit 201 stores the received examination question information and setting table information in the examination question information storage unit 205 (step S206).

The control unit 201 reads the cover page including the entry fields for the name of the test-taker and the examinee number in the stored examination question information and displays the cover page on the electronic paper 21 (step S207). The control unit 201 prohibits the terminal apparatus 2 from accessing the outside other than the examination server apparatus 1 through the wireless communication unit 202 (step S208).

The control unit 201 refers to the examination schedule information of the examination schedule information storage unit 204 and determines whether it is the examination start time (step S209). If the control unit 201 determines that it is not the examination start time yet in step S209, the control unit 201 determines whether the position detection circuit unit 210 has detected the writing input of the electronic pen 3 through the position detection sensor 22 (step S211 of FIG. 11).

If the control unit 201 determines that the writing input is detected in step S211, the control unit 201 refers to the setting table information (see FIG. 4) stored in the examination question information storage unit 205 to determine whether the writing input is a writing input to the entry fields for the name of the test-taker and the examinee number on the cover page (step S212).

If the control unit 201 determines that the writing input is a writing input to the entry fields for the name of the test-taker and the examinee number on the cover page in step S212, the control unit 201 uses the function of the writing input information validity determination unit 211 to determine that the writing input is valid. The control unit 201 displays the information of the writing input detected by the position detection circuit unit 210 on the electronic paper 21 and stores the information in the answer information storage unit 212 in association with the page information (the page number "0" of the cover page) (step S213). After step S213, the control unit 201 returns the process to step S209 and repeats the process from step S209.

If the control unit 201 determines that the writing input is a writing input outside the entry fields for the name of the test-taker and the examinee number on the cover page in step S212, the control unit 201 uses the function of the writing input information validity determination unit 211 to determine that the writing input is invalid and does not display the writing input on the electronic paper 21. The control unit 201 flashes the notification indicator 25 and emits the beep sound to notify the user that the writing input is invalid (step S214). After step S214, the control unit 201 returns the process to step S209 and repeats the process from step S209.

If the control unit 201 determines that the writing input is not detected in step S211, the control unit 201 determines whether one of the operation buttons of the operation button group 23 is operated (step S215).

If the control unit 201 determines that any one of the operation buttons of the operation button group 23 is operated in step S215, the control unit 201 uses the function of the button operation validity determination unit 214 to determine that the operation of all operation buttons is prohibited and invalid because it is before the examination start time. The control unit 201 flashes the notification indicator 25 and emits the beep sound to notify the user that the button operation is invalid (step S216). After step S218, the control unit 201 returns the process to step S209 and repeats the process from step S209.

If the control unit 201 determines that any one of the operation buttons of the operation button group 23 is not operated in step S215, the control unit 201 returns the process to step S209 and repeats the process from step S209.

If the control unit 201 determines that it is the examination start time in step S209, the control unit 201 determines whether the position detection circuit unit 210 has detected the writing input of the electronic pen 3 through the position detection sensor 22 (step S221 of FIG. 12).

If the control unit 201 determines that the writing input is detected in step S221, the control unit 201 determines whether the writing input is a writing input on the cover page or writing input on the question page (step S222). If the control unit 201 determines that the writing input is a writing input on the cover page in step S222, the control unit 201 refers to the setting table information (see FIG. 4) stored in the examination question information storage unit 205 to determine whether the writing input is a writing input to the entry fields for the name of the test-taker and the examinee number (S223).

If the control unit 201 determines that the writing input is a writing input to the entry fields for the name of the test-taker and the examinee number on the cover page in step S223, the control unit 201 uses the function of the writing input information validity determination unit 211 to determine that the writing input is valid. The control unit 201 displays the information of the writing input detected by the position detection circuit unit 210 on the electronic paper 21 and stores the information in the answer information storage unit 212 in association with the page information (the page number "0" of the cover page) (step S224).

If the control unit 201 determines that the writing input is a writing input outside the entry fields for the name of the test-taker and the examinee number on the cover page in step S223, the control unit 201 in the example uses the function of the writing input information validity determination unit 211 to determine that the writing input is invalid as identification information for the answer information, but displays the writing input on the electronic paper 21 (step S225). The process of step S225 is executed to display the writing input on the electronic paper 21 between the examination start time and the examination end time for the convenience of the examinee as a memo or a note, although the writing input outside the entry fields for the name of the test-taker and the examinee number on the cover page is invalid as the identification information for the answer information.

If the control unit 201 determines that the writing input is a writing input on the question page in step S222, the control unit 201 refers to the setting table information (see FIG. 4) stored in the examination question information storage unit 205 to determine whether the writing input is a writing input to the answer field (step S226).

If the control unit 201 determines that the writing input is a writing input to the answer field on the question page in step S226, the control unit 201 uses the function of the writing input information validity determination unit 211 to determine that the writing input is valid. The control unit 201 displays the information of the writing input detected by the position detection circuit unit 210 on the electronic paper 21 and stores the information in the answer information storage unit 212 in association with the page information of the question page (step S227).

If the control unit 201 determines that the writing input is a writing input outside the answer field on the question page in step S226, the control unit 201 in the example uses the function of the writing input information validity determination unit 211 to determine that the writing input is invalid as answer information, but displays the writing input on the electronic paper 21 (step S228). The process of step S228 is executed to also display the writing input as a memo or a note of the examinee on the electronic paper 21 for the convenience of the examinee.

After steps S224, S225, S227, and S228 or when the control unit 201 determines that the writing input is not detected in step S221, the control unit 201 determines whether any one of the operation buttons of the operation button group 23 is operated (step S231 of FIG. 13).

If the control unit 201 determines that one of the operation buttons of the operation button group 23 is operated in step S231, the control unit 201 uses the function of the button operation validity determination unit 214 to determine that the operation of all operation buttons is valid because the time is between the examination start time and the examination end time. The control unit 201 determines which one of the operation buttons of the operation button group 23 is operated (step S232).

If the control unit 201 determines that the next page button 23a is operated in step S232, the control unit 201 deletes the display information of the page displayed at that time and displays the display information of the next page on the electronic paper 21 (step S233). If the control unit 201 determines that the previous page button 23b is operated in step S232, the control unit 201 deletes the display information of the page displayed at that time and displays the display information of the previous page on the electronic paper 21 (step S234). Note that, when the name of the examinee, the examinee number, or the like is already input by writing on the cover page or the question page or when the answer or the like is already input by writing on the question page, the writing input is also displayed on the page displayed on the display screen of the electronic paper 21.

After steps S233 and S234 or when the control unit 201 determines that any one of the operation buttons of the operation button group 23 is not operated in step S231, the control unit 201 determines whether it is the examination end time (step S235). If the control unit 201 determines that it is not the examination end time, the control unit 201 returns the process to step S221 of FIG. 12 and repeats the process from step S221.

If the control unit 201 determines that the submission button 23c is operated in step S232, the control unit 201 transmits the answer information including the information of the entry field for the name of the examinee and the entry field for the examinee number on the cover page and the information of the answer fields on the question pages to the examination server apparatus 1 through the wireless communication unit 202 and the communication network NW (step S236).

After step S236, the control unit 201 prohibits the writing input of the electronic pen 3 after the operation of the submission button 23c, prohibits the operation of the operation button group 23, and prohibits the communication through the wireless communication unit 202 (step S237).

After step S237, the control unit 201 monitors the reception of the power-off command from the examination server apparatus 1 through the wireless communication unit 202 and waits for the reception of the power-off command (step S238). If the control unit 201 determines that the power-off command is received in step S238, the control unit 201 advances the process to step S250 of FIG. 14. The control unit 201 stops the supply of the power supply voltage from the battery 219 to each unit to turn off the power of the terminal apparatus 2 and ends the processing routine.

If the control unit 201 determines that it is the examination end time in step S235, the control unit 201 reads the cover page of the examination question information from the examination question information storage unit 205 and controls the electronic paper 21 to display the cover page (step S239). Note that a message for prompting the test-taker to operate the submission button may also be displayed on the display surface of the electronic paper 21 in the cover page after the examination end time to make sure that the test-taker operates the submission button.

The control unit 201 determines whether the position detection circuit unit 210 has detected the writing input of the electronic pen 3 through the position detection sensor 22 (step S241 of FIG. 14). If the control unit 201 determines that the writing input is detected in step S241, the control unit 201 refers to the setting table information (see FIG. 4) stored in the examination question information storage unit 205 to determine whether the writing input is a writing input to the entry fields for the name of the test-taker and the examinee number (step S242).

If the control unit 201 determines that the writing input is the writing input to the entry fields for the name of the test-taker and the examinee number in step S242, the control unit 201 uses the function of the writing input information validity determination unit 211 to determine that the writing input is valid. The control unit 201 displays the information of the writing input detected by the position detection circuit unit 210 on the electronic paper 21 and stores the information in the answer information storage unit 212 in association with the page information (the page number "0" of the cover page) (step S243).

If the control unit 201 determines that the writing input is a writing input outside the entry fields for the name of the test-taker and the examinee number on the cover page in step S242, the control unit 201 uses the function of the writing input information validity determination unit 211 to determine that the writing input is invalid and does not display the writing input on the electronic paper 21. The control unit 201 flashes the notification indicator 25 and emits the beep sound to notify the user that the writing input is invalid (step S244).

After steps S243 and S244 or when the control unit 201 determines that the writing input is not detected in step S241, the control unit 201 determines whether any one of the operation buttons of the operation button group 23 is operated (step S245).

If the control unit 201 determines that any one of the operation buttons of the operation button group 23 is operated in step S245, the control unit 201 determines whether the submission button 23c is operated (step S246).

If the control unit 201 determines that the submission button 23c is operated in step S246, the control unit 201 uses the function of the button operation validity determination unit 214 to determine that the operation is valid. The control unit 201 transmits the answer information including the information of the entry field for the name of the examinee and the entry field for the examinee number on the cover page and the information of the answer fields on the question pages to the examination server apparatus 1 through the wireless communication unit 202 and the communication network NW (step S247).

If the control unit 201 determines that an operation button other than the submission button 23c is operated in step S246, the control unit 201 uses the function of the button operation validity determination unit 214 to determine that the operation is invalid because the operation of the operation button is prohibited. The control unit 201 flashes the notification indicator 25 and emits the beep sound to notify the user that the button operation is invalid (step S248).

After steps S247 and S248, the control unit 201 monitors the reception of the power-off command from the examination server apparatus 1 through the wireless communication unit 202 and waits for the reception of the power-off command (step S249). The control unit 201 also advances the process to step S249 and waits for the reception of the power-off command if the control unit 201 determines that the operation button is not operated in step S245.

If the control unit 201 determines that the power-off command is received in step S249, the control unit 201 stops the supply of the power supply voltage from the battery 219 to each unit to turn off the power of the terminal apparatus 2 (step S250) and ends the processing routine.

Advantageous Effects of First Embodiment

The terminal apparatus 2 in the communication system of the first embodiment configured as described above can robustly ensure fairness among the examinees by changing and controlling the areas for receiving the writing input of the electronic pen 3 in the position detection area of the position detection sensor according to each of the time period before the examination start time, the time period between the examination start time and the examination end time, and the time period after the examination end time.

More specifically, the writing input to only the entry fields for the name of the examinee and the examinee number on the cover page can be received before the examination start time and after the examination end time. The writing input to the answer fields for the questions on the question pages is prohibited or invalidated, and the writing input to the answer fields for the questions on the question pages can be received only between the examination start time and the examination end time. As a result, the answers cannot be input by writing in the time period after the examination end time, for example, and this can ensure fairness among the examinees.

The terminal apparatus 2 in the communication system of the first embodiment can further ensure fairness among the examinees by controlling the validation and the permission of the operation of the operation buttons in the operation button group 23 according to each of the time period before the examination start time, the time period between the examination start time and the examination end time, and the time period after the examination end time.

More specifically, the next page button in the operation button group for shifting the page of the examination question information to the next page and the previous page button for returning to the previous page can be operated only between the examination start time and the examination end time. This can prevent operating and viewing the pages of the examination questions before the start of the examination and can prevent returning to the question pages to write and input answers after the end of the examination time. This further ensures fairness among the examinees.

The terminal apparatus 2 in the communication system of the first embodiment described above can communicate with only the examination server apparatus and cannot communicate with other devices. This can prevent inappropriate behavior of communicating with other devices in the time period before the start of the examination and the time period between the examination start time and the examination end time.

The terminal apparatus 2 in the communication system of the first embodiment transmits only the information input by writing in the answer fields as the answer information to the examination server apparatus 1. Therefore, a process of extracting only the answer information from the response information is not necessary in the examination server apparatus 1, which is very convenient for evaluating the answer information.

Modifications of First Embodiment

Although the examination server apparatus 1 controls on/off of the power of the terminal apparatus 2 in the first embodiment, a power button may be provided on the terminal apparatus 2, and the user (examinee) may turn on and off the power. In the case of providing the power button on the terminal apparatus 2, the terminal apparatus 2, when the power is turned on, accesses the examination server apparatus 1 to request connection therewith. In this case, the examination server apparatus 1 transmits the examination question information and the schedule information to the terminal apparatus 2 when the examination server apparatus 1 confirms that the examination server apparatus 1 is connected to the terminal apparatus 2 through the communication network NW in response to the access for the connection request from the terminal apparatus 2.

Although the examination server apparatus 1 transmits the examination schedule information, the examination question information, and the setting table information to each terminal apparatus 2 before the start of the examination in the first embodiment described above, the terminal apparatus 2 storing the examination schedule information, the examination question information, and the setting table information may be prepared in advance, and the terminal apparatus 2 may be lent to each examinee. In that case, the examination server apparatus 1 does not have to transmit any information to the terminal apparatus 2, and the examination server apparatus 1 only needs to receive and store the answer information from the terminal apparatus 2.

Although the operation buttons 23a, 23b, and 23c are provided as mechanical components on the electronic component housing portion 2K, the operation buttons 23a, 23b, and 23c may be displayed as, for example, icon buttons at positions on the part of the electronic paper 21 toward the electronic component housing portion 2K side, and the operation of each icon button indicated by the electronic pen may be detected in the detection area corresponding to the icon button position in the position detection area of the position detection sensor 22. In that case, the operation input of the operation button is an example of the position indication input of the electronic pen 3.

Although the writing input is only displayed on the electronic paper 21 and is not saved and transmitted to the examination server apparatus 1 when the control unit 201 determines that the writing input is not the writing input to the entry field for the name of the examinee or the entry field for the examinee number on the cover page in step S223 of FIG. 12 or when the control unit 201 determines that the writing input is not the writing input to the answer field on the question page in step S226 in the first embodiment described above, the writing input may be saved and transmitted to the examination server apparatus 1 along with the answer information. In that case, the evaluator of the examination result can refer to the writing input information other than the answer information as data for assessing how the examinee arrived at the answer, as part of the evaluation process.

When the control unit 201 determines that the writing input is not the writing input to the entry field for the name of the examinee or the entry field for the examinee number on the cover page in step S223 of FIG. 12 or when the control unit 201 determines that the writing input is not the writing input to the answer field on the question page in step S226, the writing input may be invalidated and not displayed on the electronic paper 21. The indicator 25 or the beep sound may be used to notify the user that the writing input is invalid.

The examination server apparatus 1 remotely turns on and off the power of the terminal apparatus 2 in the embodiment described above. Instead, a power button may be provided on the terminal apparatus 2, and the user may operate the power button.

Although the name of the examinee and the examinee number can be written on the cover page before the examination start time and after the examination start time, the entry of the name and the examinee number may be prohibited after the examination start time. The examinee may be provided with an opportunity for checking and correcting the entry of the name of the examinee and the examinee number on the cover page after the end of the examination before the submission, although the examinee cannot write the name of the examinee and the examinee number during the examination.

Although the submission button 23c can be operated to transmit the answer information during the test period, the transmission may be limited to only after the end of the examination.

Second Embodiment

A second embodiment is a modification of the communication system of the first embodiment described above, and the second embodiment is also an example applied to a case of a simultaneous examination. In the first embodiment described above, the answer fields are included in the question pages, and the examination question information is provided to the terminal apparatus. On the other hand, the question pages include only the questions and do not include the answer fields in the second embodiment. The examination question information is separated into question page information and answer page information. In this case, the question pages and the answer pages both include a cover page (the page number 0) and multiple pages following the cover page, and the question pages and the answer pages correspond with each other. In the second embodiment, the question pages and the answer pages are displayed on different apparatuses, and the answers can be input to the apparatus that displays the answer pages.

FIG. 15 depicts an overview of a configuration of the communication system in the second embodiment. As illustrated in FIG. 15, the communication system of the second embodiment includes an examination server apparatus 1A with a configuration similar to the configuration in the first embodiment. A terminal apparatus 20 connected to the examination server apparatus 1A through the communication network NW includes an answer terminal apparatus 4 (hereinafter, referred to as an answer terminal) and a relay control terminal 5 provided between the answer terminal 4 and the communication network NW and configured to relay and control information between the examination server apparatus 1 and the answer terminal 4. Therefore, the terminal apparatus 20 includes two apparatuses including a first apparatus and a second apparatus.

The examination server apparatus 1A of the second embodiment has a configuration similar to the configuration of the examination server apparatus 1 of the first embodiment and performs an action similar to the action illustrated in FIGS. 6A to 6C. However, the examination question information is separated into the question page information and the answer page information in the second embodiment as described above. The page displaying the input field for the name of the examinee and the input field for the examinee number (see FIG. 3A) is the cover page (the page number 0) of the answer page information, and information to be read by the examinee before the start of the examination, such as cautions for the examinee in taking the examination, is described on the cover page (the page number 0) of the question page information, for example.

Each answer page following the cover page of the answer page information corresponds to each question page following the cover page of the question page information. For example, when two questions including question 1 and question 2 are provided on the first page of the question pages, areas for the answer field of question 1 and the answer field of question 2 are set and provided in the corresponding first page of the answer pages. Therefore, when the page number (the page number of the answer page in the second embodiment) can be recognized, the question associated with the information of the answer can also be determined as in the case of the first embodiment.

Thus, the setting table information in the second embodiment is formed to correspond to the answer page information. More specifically, the cover page in the setting table information illustrated in FIG. 4 is the cover page of the answer page information. The page number of the answer page is used instead of the page number of the question page in FIG. 4, and the position range is information of the position range of the answer field for the question in each answer page.

Only the examination question information and the setting table information provided to the terminal apparatus side are different in the examination server apparatus 1A of the second embodiment as described above, and the examination server apparatus 1A is similar to the examination server apparatus 1 of the first embodiment in other respects. Therefore, the details of the configuration example and the action of the examination server apparatus 1A of the second embodiment will not be described here.

The relay control terminal 5 includes, for example, a Wi-Fi (registered trademark) wireless communication unit for connection to the examination server apparatus 1A through the communication network NW and includes, in the example, a wireless communication unit of Bluetooth (registered trademark) standard for wireless connection to the answer terminal 4. The relay control terminal 5 further includes a display screen 5D that displays the question pages of the examination question information. Note that the drawing speed of the display image in the display screen 5D of the relay control terminal 5 is faster than the drawing speed of the display image in the electronic paper 12 of the answer terminal 4.

The relay control terminal 5 includes a high-performance mobile phone terminal called a smartphone in the example of the second embodiment, and the display screen 5D includes a liquid crystal display (LCD) in the example.

The function of the relay control terminal 5 in the second embodiment is installed in advance as a piece of application software executed by the smartphone. Note that the configuration of the smartphone is well-known, and the details of the configuration example of the relay control terminal 5 will not be described here.

The answer terminal 4 does not include the Wi-Fi (registered trademark) wireless communication unit 202 for direct connection to the examination server apparatus 1 through the communication network NW, but instead, includes a wireless communication unit of, for example, Bluetooth (registered trademark) standard for wireless connection to the relay control terminal 5. The answer terminal 4 does not display the question pages of the examination question information, and therefore, the answer page information in the examination question information and the setting table information are stored in the examination question information storage unit 205.

Except for the two differences, the electrical configuration of the answer terminal 4 is similar to the electrical configuration of the terminal apparatus 2 of the first embodiment illustrated in FIG. 7. Therefore, the detailed block diagram of the electrical configuration example of the answer terminal 4 is omitted. In the following description, the same reference signs will be used to describe the constituent parts of the answer terminal 4 similar to the constituent parts of the terminal apparatus 2 of the first embodiment.

It is only necessary that the examinee can use the electronic pen 3 to write and input the answers to the answer terminal 4 while viewing the display screen 5D of the relay control terminal 5 near the answer terminal 4. However, the relay control terminal 5 in the second embodiment can be set against and locked to the answer terminal 4 such that the examinee can easily write and input the answers while viewing the display screen 5D of the relay control terminal 5.

More specifically, the answer terminal 4 in the example includes a relay control terminal placement portion 2H for setting and locking the relay control terminal 5. FIG. 16A is a plan view of the answer terminal 4 of the second embodiment. FIG. 16B is a side view of the answer terminal 4. FIG. 16C depicts a state in which the relay control terminal 5 is set against and locked to the relay control terminal placement portion 2H of the answer terminal 4.

The relay control terminal placement portion 2H is formed to project toward the side opposite the sheet-shaped portion 2S of the electronic component housing portion 2K as illustrated in FIGS. 15, 16A, and 16B. More specifically, the relay control terminal placement portion 2H includes: an extension member 41 extending along the bottom direction of the answer terminal 4 from the electronic component housing portion 2K of the answer terminal 4; and an inclined wall portion 42 formed on the end side of the extension member 41 in the longitudinal direction of the answer terminal as illustrated in FIGS. 16A and 16B. A recess portion 43 that allows the end of the relay control terminal 5 to be inserted therein is formed on the extension member 41.

When the housing of the smartphone as an example of the relay control terminal 5 is horizontally placed and inserted into the recess portion 43 as illustrated for example in FIG. 16C, the side end of the housing of the smartphone comes into contact with the wall portion of the electronic component housing portion 2K in the recess portion 43, and this locks the smartphone to the relay control terminal placement portion 2H and prevents the smartphone from falling down.

Instead of using the relay control terminal placement portion 2H, the recess portion part of the recess portion 24 for placing the electronic pen 3 may be deepened to allow for setting the relay control terminal 5 against the recess portion 24.

The relay control terminal 5 may be placed against the relay control terminal placement portion 2H or the recess portion 24 not only horizontally but also vertically.

The examination questions may be provided by not only the still images, but also by moving images. When the examination questions are displayed on the relay control terminal separately from the answer pages as in the embodiment, the questions can easily be provided by moving images. Various questions can be set by allowing questions based on moving images. This may be convenient in a language examination, for example.

Example of Flow of Action of Communication System in Second Embodiment

Example of Flow of Action of Examination Server Apparatus 1A

The action of the examination server apparatus 1A of the communication system in the second embodiment is similar to the action of the examination server apparatus 1 of the communication system in the first embodiment illustrated in FIG. 9, and the description thereof will not be repeated here. However, the differences are that the examination question information includes the question page information and the answer page information and that the setting table information is related to the answer page information as described above.

Example of Flow of Action of Relay Control Terminal 5

FIGS. 17 to 19 are flow charts illustrating an example of a flow of the action of the relay control terminal 5 in the second embodiment. As described above, the flow charts are carried out by executing the application software of the relay control terminal function installed on the smartphone included in the relay control terminal 5.

The relay control terminal 5 monitors the reception of the power input command from the examination server apparatus 1A through the communication network NW and waits for the reception of the power input command (step S301 of FIG. 17). If the relay control terminal 5 determines that the power input command is received in step S301, the relay control terminal 5 transfers the received power input command to the answer terminal 4 (step S302).

The relay control terminal 5 monitors the reception of the examination schedule information from the examination server apparatus 1A through the communication network NW and waits for the reception of the examination schedule information (step S303). If the relay control terminal 5 determines that the examination schedule information is received in step S303, the relay control terminal 5 stores the received examination schedule information in the storage unit (step S304). The relay control terminal 5 also transfers the received examination schedule information to the answer terminal 4 (step S305).

The relay control terminal 5 monitors the reception of the examination question information and the setting table information from the examination server apparatus 1A through the communication network NW and waits for the reception of the examination question information and the setting table information (step S306). If the relay control terminal 5 determines that the examination question information and the setting table information are received in step S306, the relay control terminal 5 stores, in the storage unit, the question page information in the received examination question information and displays the cover page (the page number 0) of the question page information on the display screen 5D (step S307).

The relay control terminal 5 transmits the answer page information in the examination question information and the setting table information received from the examination server apparatus 1A to the answer terminal 4 (step S308).

The relay control terminal 5 prohibits access to the outside other than the examination server apparatus 1A (step S309).

The relay control terminal 5 refers to the examination schedule information stored in the storage unit to determine whether it is the examination start time and waits until the examination start time (step S311 of FIG. 18). If the relay control terminal 5 determines that it is the examination start time in step S311, the relay control terminal 5 displays the first page (page number 1) of the question pages in the question page information on the display screen 5D (step S312). As a result, the examinee can read the questions displayed on the display screen 5D and use the answer terminal 4 to input answers on the first page of the question pages.

The relay control terminal 5 determines whether the next page request for advancing the page to the next page is received from the answer terminal 4 (step S313). If the relay control terminal 5 determines that the next page request is received, the relay control terminal 5 displays, on the display screen 5D, the information of the questions on the next page following the currently displayed page of the question page information (step S314).

If the relay control terminal 5 determines that the next page request is not received in step S313 or after step S314, the relay control terminal 5 determines whether the previous page request for returning to the previous page is received from the answer terminal 4 (step S315). If the relay control terminal 5 determines that the previous page request is received, the relay control terminal 5 displays, on the display screen 5D, the information of the questions on the previous page of the currently displayed page of the question page information (step S316).

If the relay control terminal 5 determines that the previous page request is not received in step S315 or after step S316, the relay control terminal 5 determines whether it is the examination end time (step S317). If the relay control terminal 5 determines that it is not the examination end time in step S317, the relay control terminal 5 determines whether the answer page information and the submission request are received from the answer terminal 4 (step S318).

If the relay control terminal 5 determines that the answer page information and the submission request are not received from the answer terminal 4 in step S318, the relay control terminal 5 returns the process to step S313 and repeats the process from step S313.

If the relay control terminal 5 determines that it is the examination end time in step S317, the relay control terminal 5 also determines whether the answer page information and the submission request are received from the answer terminal 4 (step S321 of FIG. 19).

If the relay control terminal 5 determines that the answer page information and the submission request are received from the answer terminal 4 in steps S318 and S321, the relay control terminal 5 temporarily stores the received answer page information (step S322) and transmits the answer page information temporarily stored in the relay control terminal 5 to the examination server apparatus 1A through the communication network NW (step S323).

The relay control terminal 5 monitors the reception of the power-off command from the examination server apparatus 1A through the communication network NW and waits for the reception of the power-off command (step S324). If the relay control terminal 5 determines that the power-off command is received in step S324, the relay control terminal 5 transfers the received power-off command to the answer terminal 4 (step S325). The relay control terminal 5 ends the processing routine.

Example of Flow of Action of Answer Terminal 4

FIGS. 20 to 24 are flow charts illustrating an example of a flow of the action of the answer terminal 4 in conducting a simultaneous examination with use of the second embodiment of the communication system configured as described above.

The answer terminal 4 in the standby mode monitors the reception of the power input command transferred from the relay control terminal 5 and waits for the reception of the power input command (step S401 of FIG. 20). If the answer terminal 4 determines that the power input command is received in step S401, the answer terminal 4 supplies the power supply voltage to each unit to input power (step S402).

The answer terminal 4 monitors the reception of the examination schedule information from the examination server apparatus 1A transferred from the relay control terminal 5 and waits for the reception of the examination schedule information (step S403). If the answer terminal 4 determines that the examination schedule information is received in step S403, the answer terminal 4 stores the received examination schedule information in the examination schedule information storage unit 204 (step S404).

The answer terminal 4 monitors the reception of the answer page information and the setting table information transferred from the relay control terminal 5 and waits for the reception (step S405). If the answer terminal 4 determines that the answer page information and the setting table information are received in step S405, the answer terminal 4 stores the received answer page information and setting table information in the examination question information storage unit 205 (step S406).

The answer terminal 4 reads the cover page including the entry fields for the name of the test-taker and the examinee number in the stored answer page information and displays the cover page on the electronic paper 21 (step S407). The answer terminal 4 prohibits the answer terminal 4 from accessing the outside other than the relay control terminal 5 (step S408).

The answer terminal 4 refers to the examination schedule information of the examination schedule information storage unit 204 to determine whether it is the examination start time (step S409). If the answer terminal 4 determines that it is not the examination start time yet in step S409, the answer terminal 4 executes the process of the flow illustrated in FIG. 21. The process of steps S411 to S416 of FIG. 21 is a process corresponding and similar to the process of steps S211 to S216 before the examination start time illustrated in FIG. 11 executed by the terminal apparatus 2 of the first embodiment.

More specifically, the answer terminal 4 in the flow of the process of FIG. 21 accepts the writing input of the electronic pen 3 only when the writing is input to the entry field for the name of the test-taker or the entry field for the examinee number on the cover page of the answer page information before the examination start time and prohibits the writing input to other position ranges. If the writing is input to another position range, the answer terminal 4 uses the beep sound or the indicator 25 to notify the user that the writing input is invalid. The operation of all operation buttons of the operation button group 23 is prohibited in the answer terminal 4 before the examination start time, and when any one of the operation buttons is operated, the answer terminal 4 determines that the operation is invalid and uses the beep sound or the indicator 25 to notify the user that the operation is invalid.

If the answer terminal 4 determines that it is the examination start time in step S409, the answer terminal 4 executes the flow of the process illustrated in FIG. 22. The process of steps S421 to S428 in FIG. 22 is a process corresponding and substantially similar to steps S221 to S228 of the process for the writing input of the electronic pen 3 between the examination start time and the examination end time illustrated in FIG. 12 executed by the terminal apparatus 2 of the first embodiment.

However, in the flow of the process of FIG. 22 in the second embodiment, the process is not for each question page of the question page information including the answer fields of the case of the first embodiment, but is for the cover page and the answer page of the answer page information. Therefore, step S422 is a process of determining whether the page in which the writing input is detected is the cover page or the answer page of the answer page information.

If the determination result in step S422 indicates the cover page, the answer terminal 4 executes the process of steps S423 to S425. The answer terminal 4 saves the writing input to the entry field for the name of the examinee and the entry field for the examinee number as part of the answer information (which is the identification information). The answer terminal 4 displays the writing input to other areas on the electronic paper 21, but does not save the writing input as answer information. If the determination result in step S422 indicates the answer page, the answer terminal 4 executes the process of steps S426 to S428. The answer terminal 4 saves the writing input to the answer field as answer information. The answer terminal 4 displays the writing input to areas other than the answer field on the electronic paper 21, but does not save the writing input as answer information.

After steps S424, S425, S427, and S428 or if the answer terminal 4 determines that the writing input is not detected in step S421, the answer terminal 4 executes the process of the flow illustrated in FIG. 23. The process of steps S431 to S439 in FIG. 23 corresponds to steps S231 to S239 in the process regarding the operation buttons of the operation button group 23 between the examination start time and the examination end time illustrated in FIG. 13 executed by the terminal apparatus 2 of the first embodiment, and the processes are substantially similar to each other except for a part of the processes.

If any one of the operation buttons of the operation button group 23 is operated between the examination start time and the examination end time in the flow of the process of FIG. 23, the answer terminal 4 executes the process corresponding to the operated operation button as in the case of the first embodiment. However, the question page is displayed on the display screen 5D of the relay control terminal 5, and the answer information is transmitted to the examination server apparatus 1A through the relay control terminal 5 in the second embodiment. Therefore, the cooperation of the relay control terminal 5 and the answer terminal 4 needs to be taken into account to execute the process.

Therefore, in the flow of the process of FIG. 23, the process of step S436 is different from step S236 in the case of the first embodiment. Step S440 is added as preprocessing of step S433 corresponding to step S233 of the first embodiment, and step S441 is added as preprocessing of step S434 corresponding to step S234 of the first embodiment.

Only the differences between the first embodiment and the second embodiment in the flow of the process of FIG. 23 will be described. In step S436, the answer terminal 4 sends the answer information to the relay control terminal 5 according to the operation of the submission button 23c and sends, to the relay control terminal 5, an answer submission request for transmitting the answer information to the examination server apparatus 1A. When the next page button 23a is operated, the answer terminal 4 sends, to the relay control terminal 5, a next page request that is a request for shifting the question page to the next page in step S440. In step S433, the answer terminal 4 displays the next page of the answer page on the electronic paper 21. When the previous page button 23b is operated, the answer terminal 4 sends, to the relay control terminal 5, a previous page request that is a request for shifting the question page to the previous page in step S441. The answer terminal 4 displays the previous page of the answer page on the electronic paper 21 in step S434.

If the answer terminal 4 determines that it is the examination end time in step S435 in the flow of the process of FIG. 23, the answer terminal 4 reads the cover page of the answer page information from the examination question information storage unit 205 and controls the electronic paper 21 to display the cover page (step S439).

The answer terminal 4 then executes the flow of the process illustrated in FIG. 24. The process of steps S451 to S460 in FIG. 24 corresponds to steps S241 to S250 of the process regarding the writing input of the electronic pen 3 and the operation button group 23 after the examination end time illustrated in FIG. 14 executed by the terminal apparatus 2 of the first embodiment, and the processes are substantially similar to each other. However, the difference is that, in the flow of the process of FIG. 24 in the second embodiment, the answer terminal 4 transmits the answer information and the answer submission request to the relay control terminal 5 in step S457 corresponding to step S247 in the case of the first embodiment.

Advantageous Effects of Second Embodiment

The communication system of the second embodiment described above can also certainly ensure fairness among the examinees, although the question pages and the answer pages are displayed on different terminals. The examination server apparatus can efficiently evaluate the answers by receiving only the answer information as response information. The communication system of the second embodiment can have advantageous effects similar to the advantageous effects of the first embodiment.

In the case of the first embodiment, the answer fields are provided on the question pages, and it is preferable to make the display of one page as large as possible. In the second embodiment, the question pages and the answer pages are displayed on the display screens of different terminals, and there is an advantageous effect that there is no such a requirement.

Modifications of Second Embodiment

Although the operation buttons, such as the next page button, the previous page button, and the submission button, are provided on the answer terminal in the second embodiment described above, the operation buttons may be provided on the relay control terminal 5 side. In that case, the relay control terminal 5 changes the question page displayed on the display screen 5D to the next page or the previous page when the next page button or the previous page button is operated, and at the same time may send, to the answer terminal 4, the next page request for shifting the answer page to the next page or the previous page request for shifting the answer page to the previous page for display. When the submission button is operated, the relay control terminal 5 acquires the answer information from the answer terminal 4 and transmits the answer information to the examination server apparatus 1A.

In the second embodiment described above, the question page information is stored in the relay control terminal 5, and the answer page information is stored in the answer terminal 4. The two terminals manage the question pages and the answer pages, respectively. However, all of the question page information, the answer page information, and the setting table information may be stored in the relay control terminal 5, and the relay control terminal 5 may control and manage the answer terminal 4. In that case, the relay control terminal 5 includes the operation button group.

When the answer terminal 4 is configured in this way, the answer terminal 4 only includes a buffer memory for just displaying one answer page on the electronic paper, and the relay control terminal 5 sends, to the answer terminal 4, the answer page corresponding to the question page displayed on the display screen 5D. The answer terminal 4 may always transmit the writing information input by writing with the electronic pen 3 to the relay control terminal 5. The relay control terminal 5 may use the setting table information to execute the process of determining whether the writing input is valid or invalid, and the relay control terminal 5 may manage the answer information.

According to the configuration, the answer terminal 4 just needs to have the function of displaying the information on the electronic paper and the function in which the position detection circuit detects the writing input according to the position indication input of the electronic pen 3 through the position detection sensor and supplies the writing input to the relay control terminal 5. Therefore, the configuration is very simple, and the answer terminal 4 can be manufactured more inexpensively.

Although the relay control terminal 5 includes the smartphone in the example of the second embodiment described above, the configuration is not limited to this. Any apparatus or terminal may be used as long as the apparatus or the terminal is an electronic apparatus including: a communication unit for connection to the examination server apparatus 1A through the communication network NW; a communication unit for connection to the answer terminal 4; and a display unit that displays the question sentences. For example, a pad mobile terminal or a laptop computer may be used.

In the second embodiment described above, the question page information of the examination question information may be handed out in a paper medium to each test-taker, instead of providing the question page information as electronic information on the terminal apparatus. In that case, the relay control terminal 5 just plays a role of relaying the information exchanged between the examination server apparatus 1A and the terminal apparatus 20. The examination server apparatus 1A only has to provide the answer page information and the setting table information to the terminal apparatus 20, and the page in the question page information on the display screen 5D of the relay control terminal 5 does not have to be changed. Therefore, the information of the page change does not have to be transmitted from the terminal apparatus 20 side to the relay control terminal 5.

Although a near field communication unit of Bluetooth (registered trademark) standard is used to connect the answer terminal 4 and the relay control terminal 5 in the second embodiment described above, it is obvious that the method of wirelessly connecting the answer terminal 4 and the relay control terminal 5 is not limited to this. In addition, the answer terminal 4 and the relay control terminal 5 may be connected with a wire through a connection cable such as a USB cable.

In addition to the modifications, the modifications for the terminal apparatus 2 in the first communication system can also be applied to the answer terminal 4 in the communication system of the second embodiment.

Third Embodiment

In a communication system of a third embodiment, the configuration of the communication system in the first embodiment and the configuration of the communication system in the second embodiment can selectively be constructed. FIG. 25 illustrates a configuration example of the communication system in the third embodiment. An examination server apparatus 1B and a terminal apparatus 20B are connected through the communication network NW in the third embodiment as illustrated in FIG. 25.

The hardware configuration of the examination server apparatus 1B is similar to the hardware configuration illustrated in the block diagram of FIG. 2. However, first examination question information including the question page information including the answer fields as in the first embodiment and second examination question information including the question page information and the answer page information as in the second embodiment are stored in the provided information storage unit 102 of FIG. 2. In addition, first setting table information indicating the relation between the page number of the question page information and the position range of the answer field for the question on each page as illustrated in FIG. 4 as in the first embodiment and second setting table information indicating the relation between the page number of the answer page information and the position range of the answer field for the question on each page as in the second embodiment are stored in the setting table information storage unit 103.

The examination server apparatus 1B includes functional units to provide the examination question information to the terminal apparatus, such as a first examination information providing process function unit 110 for processing the examination question information including the question page information including the answer fields as in the first embodiment, and a second examination information providing process function unit 120 for processing the examination question information including the question page information and the answer page information as in the second embodiment.

In the third embodiment, the examination server apparatus 1B is configured to automatically select and activate any one of the first examination information providing process function unit 110 and the second examination information providing process function unit 120 according to the mode of access from the terminal apparatus 20B, that is, according to whether the terminal apparatus 20B has accessed through the relay control terminal 5, as described later.

In the third embodiment, the user can select one of a configuration in which the terminal apparatus 20B includes a single answer terminal 6 (the configuration of the communication system in the first embodiment) and a configuration in which the terminal apparatus 20B includes the answer terminal 6 and the relay control terminal 5 (the configuration of the communication system in the second embodiment). The communication system selected by the user depends on whether the user connects the relay control terminal 5 to the answer terminal 6 in the example. The answer terminal 6 is configured to automatically select one of the configuration of the communication system in the first embodiment and the configuration of the communication system in the second embodiment according to whether the relay control terminal 5 is connected.

The answer terminal 6 included in the terminal apparatus 20B of the third embodiment has the function of the answer terminal 4 of the second embodiment added to the terminal apparatus 2 of the first embodiment, and the answer terminal 6 corresponds to both the communication system of the first embodiment and the communication system of the second embodiment.

More specifically, the hardware configuration of the answer terminal 6 is similar to the hardware configuration of the terminal apparatus 2 illustrated in the block diagram of FIG. 7. However, as illustrated in FIG. 25, the answer terminal 6 includes a first wireless communication unit 61 for direct connection to the examination server apparatus 1B through the communication network NW and a second wireless communication unit 62 for connection to the relay control terminal 5, in place of the wireless communication unit 202 of FIG. 7.

The answer terminal 6 includes a power button as one of the operation buttons, and when the power button is turned on to input power, the answer terminal 6 sends a connection request to the examination server apparatus 1B. Before transmitting the connection request to the examination server apparatus 1B, the answer terminal 6 determines whether the answer terminal 6 is connected to the relay control terminal 5.

If the answer terminal 6 determines that the answer terminal 6 is connected to the relay control terminal 5, the answer terminal 6 transmits the connection request to the examination server apparatus 1B through the relay control terminal 5. If the answer terminal 6 determines that the answer terminal 6 is not connected to the relay control terminal 5, the answer terminal 6 directly transmits the connection request to the examination server apparatus 1B.

In the example, the first wireless communication unit 61 of the answer terminal 6 includes, for example, a Wi-Fi (registered trademark) wireless communication unit, and the second wireless communication unit 62 includes, for example, a Bluetooth (registered trademark) near field communication unit for wireless connection to the relay control terminal 5. The second wireless communication unit 62 of the answer terminal 6 always monitors whether the relay control terminal 5 including a corresponding near field communication unit is present in a connectable range. If the second wireless communication unit 62 determines that the relay control terminal 5 is present in the connectable range, the second wireless communication unit 62 automatically connects to the relay control terminal 5.

Obviously, the configurations of the first wireless communication unit 61 and the second wireless communication unit 62 are not limited to the example. The answer terminal and the relay control terminal 5 may be connected with a wire through a connection cable, such as a USB cable, instead of the second wireless communication unit 62.

The terminal apparatus 2 further includes functional units to generate the answer information for the examination question information provided from the examination server apparatus 1B, such as a first examination information processing function unit 63 for processing the examination question information including the answer fields as in the first embodiment, and a second examination information processing function unit 64 for processing the examination question information including the question page information and the answer page information as in the second embodiment. The functions of the first examination information processing function unit 63 and the second examination information processing function unit 64 are installed in advance as application software of the control unit of the answer terminal 6.

The process of the first examination information processing function unit 63 is the process of the flow illustrated in FIGS. 10 to 14 executed by the terminal apparatus 2 described in the first embodiment. The process of the second examination information processing function unit 64 is the process of the flow illustrated in FIGS. 20 to 24 executed by the answer terminal 4 described in the second embodiment.

Example of Flow of Action of Communication System in Third Embodiment

Example of Flow of Action of Answer Terminal 6

FIG. 26 is a flow chart for describing an example of a flow of the action of the answer terminal 6 in the communication system of the third embodiment.

The answer terminal 6 monitors whether the power button is turned on to input power and waits for the input of power (step S601). If the answer terminal 6 determines that the power is input in step S601, the answer terminal 6 determines whether the second wireless communication unit 62 is connected to the relay control terminal 5 (step S602).

If the answer terminal 6 determines that the second wireless communication unit 62 is not connected to the relay control terminal 5 in step S602, the answer terminal 6 directly transmits the connection request to the examination server apparatus 1B through the first wireless communication unit 61 (step S603). The answer terminal 6 determines whether the answer terminal 6 can confirm the connection to the examination server apparatus 1B as a result of the connection request of step S603 by, for example, determining whether connection confirmation information from the examination server apparatus 1B is received (step S604).

If the answer terminal 6 determines that the connection to the examination server apparatus 1B is confirmed in step S604, the answer terminal 6 executes the process of the first examination information processing function unit 63 (step S605). After the end of the process in step S605, the answer terminal 6 determines whether the power is turned off by the operation of the power button (step S609). If the answer terminal 6 determines that the power is turned off, the answer terminal 6 ends the processing routine.

If the answer terminal 6 determines that the second wireless communication unit 62 is connected to the relay control terminal 5 in step S602, the answer terminal 6 transmits the connection request to the examination server apparatus 1B through the second wireless communication unit 61 via the relay control terminal 5 (step S606). The answer terminal 6 determines whether the answer terminal 6 can confirm the connection to the examination server apparatus 1B as a result of the connection request of step S606 by, for example, determining whether the connection confirmation information from the examination server apparatus 1B is received (step S607).

If the answer terminal 6 determines that the connection to the examination server apparatus 1B is confirmed in step S607, the answer terminal 6 executes the process of the second examination information processing function unit 64 (step S608). After the end of the process in step S608, the answer terminal 6 determines whether the power is turned off by the operation of the power button (step S609). If the answer terminal 6 determines that the power is turned off, the answer terminal 6 ends the processing routine.

Example of Flow of Action of Examination Server Apparatus 1B

FIG. 27 is a flow chart for describing an example of a flow of the action of the examination server apparatus 1B in the communication system of the third embodiment.

As illustrated in FIG. 27, the examination server apparatus 1B determines whether the connection request from the terminal apparatus 20B is received (step S111). If the examination server apparatus 1B determines that the connection request is not received, the examination server apparatus 1B waits for the reception of the connection request. If the examination server apparatus 1B determines that the connection request from the terminal apparatus 20B is received in step S111, the examination server apparatus 1B executes a process of connecting to the terminal apparatus 20B and transmits the connection confirmation information to the terminal apparatus 20B when the examination server apparatus 1B is connected to the terminal apparatus 20B (step S112).

The examination server apparatus 1B determines whether the examination server apparatus 1B is connected to the terminal apparatus 20B through the relay control terminal 5 (step S113). The process of step S113 is executed by preliminarily registering, in the examination server apparatus 1B, identification information for identifying each of the answer terminal 6 and the relay control terminal 5 as potential counterpart apparatus to be connected through the communication network NW in the communication protocol, and determining which terminal is connected based on the identification information of the connected terminal.

If the examination server apparatus 1B determines that the examination server apparatus 1B is not connected to the terminal apparatus 20B through the relay control terminal 5, but is directly connected to the answer terminal 6 of the terminal apparatus 20B in step S113, the examination server apparatus 1B executes the process of the first examination information providing process function unit 110 (step S114). After the end of the execution of step S114, the examination server apparatus 1B ends the processing routine.

If the examination server apparatus 1B determines that the terminal apparatus 20B is connected through the relay control terminal 5 in step S113, the examination server apparatus 1B executes the process of the second examination information providing process function unit 120 (step S115). After the end of the execution of step S115, the examination server apparatus 1B ends the processing routine.

Advantageous Effects of Third Embodiment

The configuration of the communication system in the third embodiment has the advantageous effects of the first and second embodiments described above, and the user can select one of the mode of the first embodiment and the mode of the second embodiment according to whether the user has connected the relay control terminal 5 to the answer terminal 6, which is very convenient.

Modifications of Third Embodiment

In the example of the third embodiment described above, whether the relay control terminal 5 is connected is determined when the power button of the answer terminal 6 is operated to input power, and the terminal apparatus 20B sends the connection request to the examination server apparatus 1B according to the determination result. However, a connection request button may be provided on the answer terminal 6, and whether the relay control terminal 5 is connected may be determined when the connection request button is pressed after the power is input. The terminal apparatus 20B may send the connection request to the examination server apparatus 1B according to the determination result.

The examination server apparatus 1B side may send an instruction indicating whether to make a connection through the relay control terminal 5. More specifically, the examination server apparatus 1B side sends, for example, a power input command to the answer terminal 6 to turn on the power of the answer terminal 6. To perform the action in the mode of the first embodiment, the examination server apparatus 1B sends the examination schedule information, the examination question information, and the setting table information to the answer terminal 6. To perform the action in the mode of the second embodiment, the examination server apparatus 1B notifies the answer terminal 6 that the answer terminal 6 should connect to the relay control terminal 5 and causes the answer terminal 6 to connect to the relay control terminal 5. The examination server apparatus 1B sends the examination schedule information, the examination question information, and the setting table information to the answer terminal 6 through the relay control terminal 5.

When the relay control terminal 5 is connected to the answer terminal 6 in the third embodiment described above, the answer terminal 6 acquires the answer page information from the examination server apparatus 1B through the relay control terminal 5 and transmits the answer information to the examination server apparatus 1B through the relay. However, the examination server apparatus 1B may send the question page information to the relay control terminal 5 and send the answer page information to the answer terminal 6. The answer terminal 6 may transmit the answer information to the examination server apparatus 1B without the involvement of the relay control terminal 5.

In addition to the modifications described above, the modifications for the terminal apparatus 2 and the answer terminal 4 in the communication systems of the first and second embodiments described above can be applied as modifications to the answer terminal in the third communication system described above.

OTHER EMBODIMENTS OR MODIFICATIONS

Although the display unit includes the electronic paper in the terminal apparatus 2, the answer terminal 4, and the answer terminal 6 of the communication systems of the embodiments described above, the display unit is not limited to the electronic paper. The display unit may include an LCD or an organic electroluminescence (EL) as long as the display unit can be placed over the position detection sensor. However, when the electronic paper is used as in the embodiments, there is an advantage that an inexpensive ultra-thin terminal apparatus can be realized.

Although the examination schedule information is provided from the examination server apparatus in the embodiments described above, the examination schedule information, such as examination start time and examination end time, may be stored in advance in the terminal apparatus 2, the answer terminals 4 and 6, and the relay control terminal 5. The examination question information and the setting table information may also be stored in advance in the terminal apparatus 2, the answer terminals 4 and 6, and the relay control terminal 5.

It is not essential to provide the question page information of the examination question information as electronic information in the first to third embodiments described above, and the question page information may be provided to the examinee in a form of examination questions printed on paper.

In that case, in the first embodiment, the page information indicating the answer fields on each page and the setting table information can be provided to the terminal apparatus 2, and the examinee may write and input answers to the answer fields on each page. In addition to the examination question information as electronic information as described above, the examination question set printed on paper may also be provided in the case of the first embodiment such that the examinee can easily read the question sentences.

In the cases of the second and third embodiments, the examination server apparatus do not have to provide the question page information of the examination question information to the relay control terminal 5 and may provide, to the relay control terminal 5, just the answer page information and the setting table information to be transferred to the answer terminals 4 and 6.

Japanese Patent Laid-Open No. 2018-37033 describes a handwriting input apparatus including: a board apparatus using a clip to hold paper, arranged on a plate-shaped board incorporating a position detection apparatus unit including a position detection sensor, such that the paper overlaps with the position detection sensor. An electronic pen having a writing tool function, such as a ballpoint pen function, is used to transmit and receive signals to and from the position detection sensor.

When the writing tool function of the electronic pen is used to input handwriting to the paper in the handwriting input apparatus, the position detection apparatus unit underneath the paper detects the coordinate information of the handwritten writing path (trace) through the position detection sensor, and the detected coordinate information is output and used in, for example, a personal computer.

According to the handwriting input apparatus, the writing tool function of the electronic pen is used, and the handwritten writing path is depicted on the paper. Therefore, an electronic the display panel for confirming the handwriting information is not necessary, and the cost can be reduced.

The handwriting input apparatus may be applied to the terminal apparatus 2 and the answer terminals 4 and 6 according to the present disclosure. In that case, not only the question page information of the examination question information, but also the answer page information does not have to be provided as electronic information to the terminal apparatus side, and the information can be provided as paper information.

When the handwriting input apparatus is used in the terminal apparatus 2 and the answer terminals 4 and 6, the position of the paper of the question page or the position of the paper of the answer page can be adjusted to the position detection area of the position detection sensor when using the clip to hold the paper. The schedule information and the setting table information are stored in the terminal apparatus 2 and the answer terminals 4 and 6. The restriction process regarding the writing input is executed as described above, and the generated information of answers is transmitted to and processed by the examination server apparatus as described above.

Although deletion (eraser) of an error or the like in the writing input of the name of the examinee, the examinee number, or the answer fields written by the electronic pen 3 is not described in the examples of the embodiments above, it is obvious that the handwriting entered by the electronic pen 3 may be deleted.

In that case, an eraser is usually used to delete the writing on paper. For electronic handwriting, there is a method of erasing (deleting) the electronic data of the written data or a method of painting over the electronic data using the background color. In this case, the writing input and the deletion input need to be distinguished, and there are various methods for distinguishing between them.

A first example of the methods includes providing deletion buttons on the terminal apparatus 2, the answer terminal 4, and the answer terminal 6. FIG. 28 illustrates an example of a terminal apparatus 2A including the deletion buttons 23L and 23R. More specifically, the terminal apparatus 2A in the example illustrated in FIG. 28 is an example in which the deletion buttons are provided on the terminal apparatus 2 of the first embodiment above, and the same reference signs are provided to the same parts as the parts of the terminal apparatus 2.

The terminal apparatus 2A of the example includes the next page button 23*a*, the previous page button 23*b*, and the submission button 23*c* and further includes deletion buttons 23L and 23R. The deletion button 23L is for a right-handed user who holds the electronic pen 3 with the right hand, and the deletion button 23R is for a left-handed user who holds the electronic pen 3 with the left hand.

In this case, the terminal apparatus 2A handles, as writing input, the position indication input detected by the position detection circuit unit through the position detection sensor 22A when both the deletion buttons 23L and 23R are turned off. The terminal apparatus 2A handles the position indication input as deletion input when either one of the deletion buttons 23L and 23R is turned on. The user can press and turn on either one of the deletion buttons 23L and 23R and indicate and input the position by tracing the handwritten data (path) to thereby delete the electronic data of the handwritten data.

In a second example of the methods, a writing input position indication unit for writing input is provided on the pen tip side, which is one side in the axial direction of the pen housing of the electronic pen, and a deletion position indication unit for deletion input (e.g., electronic eraser) is provided on the tail end side, which is the other side in the axial direction of the pen housing. The position indication signal transmitted from the writing input position indication unit to the position detection sensor and the position indication signal transmitted from the deletion position indication unit to the position detection sensor have different frequencies.

In this case, the position detection circuit unit determines the frequency of the position indication signal received through the position detection sensor to make a distinction between the writing input and the deletion input. The user brings the pen tip side of the electronic pen close to the position detection sensor to input writing. The user flips over the electronic pen, brings the tail end side close to the position detection sensor, and indicates and inputs the position by tracing the handwritten data (path) in order to delete the writing input. As a result, the handwritten electronic data is deleted.

FIG. 29 illustrates a configuration example of an electronic pen 3A of electromagnetic induction type. As illustrated in FIG. 29, a writing input position indication unit 310 for writing input is provided on the pen tip side that is one side in the axial direction of the pen housing of the electronic pen 3A, and a deletion position indication unit 320 for deletion input is provided on the tail end side that is the other side in the axial direction of the pen housing.

The writing input position indication unit 310 includes a resonant circuit including a coil 312 wound around a ferrite core 311 and a capacitor 313. Note that a core body 314 for writing input is inserted into a through hole of the ferrite core 311, and the front end of the core body 314 is arranged to protrude outside as a pen tip portion.

The deletion position indication unit 320 includes a resonant circuit including a coil 322 wound around a ferrite core 321 and a capacitor 323. Note that a core body 324 for deletion input is inserted into a through hole of the ferrite core 321, and the front end of the core body 324 is arranged to protrude outside as a deletion indication front end portion.

In this case, the resonant circuit of the writing input position indication unit 310 and the resonant circuit of the deletion position indication unit 320 have different frequencies.

Note that when the electronic pen is, for example, an electronic pen of active capacitance type, the position detection signal output from a conductive core body for writing input and the position detection signal output from a conductive core body for deletion have different frequencies.

A third example is a method of using a deletion unit (electronic eraser) separate from the electronic pen. FIGS. 30A and 30B illustrate an example of the deletion unit. FIG. 30A is an external view of a deletion unit 7 of the example, and FIG. 30B is a cross-sectional view of the deletion unit 7.

The deletion unit 7 uses a method of providing, on a deletion unit separate from the electronic pen, the deletion position indication unit for deletion input, which is provided on the tail end side of the electronic pen in the second example above. More specifically, one end side in the axial direction of a housing 71 of the deletion unit is a deletion end portion 72, and a coil 74 wound around a ferrite core 73 is provided near the deletion end portion 72 in the hollow portion of the housing 71 as illustrated in FIGS. 30A and 30B. A deletion position indication unit 75 including a resonant circuit including the coil 74 and a capacitor (not illustrated) is provided. In this case, the frequency of the resonant circuit of the deletion position indication unit 75 and the resonant frequency of the resonant circuit of the electronic pen for writing input are different.

In the case of the third example, the position detection circuit unit also determines the frequency of the position indication signal for deletion from the deletion unit 7 received through the position detection sensor to distinguish the writing input and the deletion input. The user can use the deletion unit 7 to trace the written path to thereby delete the electronic data of the written path, as in the case of using an eraser to delete the written part on paper.

It is obvious that the active capacitance system may also be adopted in the example of the deletion unit.

Although the communication system of the embodiments is used to administer a simultaneous examination at a test center in the cases described above, it is obvious that use of the communication system is not limited to these cases. For example, the communication system can be similarly applied to a mock examination each examinee can take at home. The communication system can also be applied to a case in which an examination schedule is set for students to take tests at school or tutoring school.

The communication system can also be applied to a mock examination in remote learning through a communication network such as the Internet. In that case, there may be one terminal apparatus 2, or 2A, or 20, or 20B, for the examination server apparatus, instead of a plurality of terminal apparatuses 2, 2A, 20, or 20B. In other words, the number of students in the remote learning may be only one.

In the case of a mock examination for practice, the test-taker of the mock examination may write, in a blank space of the question text or any blank space other than the answer field, a note or calculation formula used in the process of arriving at the answer for the examination question. The note and the calculation formula are not necessary when only the final answers are graded as in an entrance examination. However, a teacher in a school or a tutoring school may wish to refer to the note and the calculation formula to assess the learned skills of the examinee to assess the ability or proficiency of the examinee.

In addition, the examinee may wish to write a question intended for the school teacher or the tutoring school teacher to see in the blank space of the question text or in any blank space other than the answer field.

A fourth embodiment of the communication system in view of such consideration will be described. In the communication system of the fourth embodiment in this example, the terminal apparatus 2A includes an all-information transmission instruction button 23*d* to transmit not only the information of the answer field, but also the writing input in the blank space to the examination server apparatus, as illustrated in FIG. 28. Other components of the terminal apparatus 2A are similar to the components of the terminal apparatus 2 of the first embodiment.

The examination server apparatus in the communication system of the fourth embodiment is configured to transmit, to the terminal apparatus 2A, control information indicating whether to prohibit or permit the user to operate the all-information transmission instruction button 23*d* in the terminal apparatus 2A. This is for prohibiting the operation of the all-information transmission instruction button 23*d* in, for example, an entrance (simultaneous) examination to thereby prohibit the terminal apparatus 2A from transmitting information other than the answer information.

The terminal apparatus 2A of the fourth embodiment also executes a process similar to the process of the terminal apparatus 2 of the first embodiment. The process will be described with reference to a flow chart of FIG. 31, with the focus on the process regarding the writing input in the terminal apparatus 2A and the process related to the operation of the submission button 23*c* and the all-information transmission instruction button 23*d*.

The terminal apparatus 2A determines whether the writing input is detected (step S701). If the terminal apparatus 2A determines that the writing input is not detected, the terminal apparatus 2A executes another process such a process regarding the operation of the operation buttons (step S702). After the end of step S702, the terminal apparatus 2A returns the process to step S701.

If the terminal apparatus 2A determines that the writing input is detected in step S701, the terminal apparatus 2A determines whether either of the deletion buttons 23L or 23R is turned on (step S703). If the terminal apparatus 2A determines that either of the deletion buttons 23L or 23R is not turned on in step S703, the terminal apparatus 2A executes the process regarding the writing input as in the embodiments described above (step S704). If the terminal apparatus 2A determines that either of the deletion buttons 23L or 23R is turned on in step S703, the terminal apparatus 2A deletes the already written and saved electronic data corresponding to the path traced by the electronic pen 3 (step S705).

After step S704 or step S705, the terminal apparatus 2A determines whether the submission button 23*c* is operated (step S706). If the terminal apparatus 2A determines that the submission button 23*c* is not operated, the terminal apparatus 2A returns the process to step S701 and repeats the process from step S701.

If the terminal apparatus 2A determines that the submission button 23*c* is operated in step S706, the terminal apparatus 2A determines whether the all-information transmission instruction button 23*d* is turned on (step S707). If the terminal apparatus 2A determines that the all-information transmission instruction button 23*d* is turned on, the terminal apparatus 2A determines whether button operation prohibition information which prohibits the button operation of the all-information transmission instruction button 23*d* is received from the examination server apparatus (step S708).

If the terminal apparatus 2A determines that the all-information transmission instruction button 23*d* is not turned on in step S707 or if the terminal apparatus 2A determines that the button operation prohibition information which prohibits the button operation of the all-information transmission instruction button 23*d* is received in step S708, the terminal apparatus 2A transmits only the writing input information of the answer field to the examination server apparatus and does not transmit the writing input information in the blank space to the examination server apparatus (step S709).

If the terminal apparatus 2A determines that the button operation prohibition information is not received in step S708, the terminal apparatus 2A transmits the writing input information of the answer field and all of the writing input information in the area outside the answer field to the examination server apparatus (step S710). In this case, the writing input information of the answer field and the writing input information in the area outside the answer field are provided with different identification information and transmitted to the examination server apparatus. The examination server apparatus can easily separate and manage the information.

Note that the setting table information specifies the entry fields for the response information, such as the name field of the test-taker, the examinee number field, and the answer fields. Therefore, the position detection area other than the entry fields for the response information, such as the name field of the test-taker, the examinee number field, and the answer fields, is the blank space area. The terminal apparatus 2A distinguishingly determines, based on the information of the setting table information, the entry fields for the response information, such as the name field of the test-taker, the examinee number field, and the answer fields, and the other blank space area.

The processing routine is now completed.

Note that if the test-taker turns on the all-information transmission instruction button 23*d* when the button operation prohibition information is received from the examination server apparatus, the terminal apparatus 2A uses the indicator 25 or the beep sound to notify the test-taker that the operation is prohibited.

For example, as illustrated in FIG. 32A, when the input field NA for the name of the examinee, the input field NB for the examinee number, the question numbers LA of the examination questions, the question sentences LB, and the answer fields LC are displayed on the electronic paper 21 of the terminal apparatus 2A, and the examinee has entered writing input in the answer fields LC and in the blank space, if the submission button 23c is operated, the following two modes are executed.

Specifically, the terminal apparatus 2A transmits, to the examination server apparatus, only the writing information "In" of the entry fields for the response information, such as the name field of the test-taker, the examinee number field, and the answer fields, defined in the setting table information as illustrated in FIG. 32B when the all-information transmission instruction button 23d is not turned on or when the button operation prohibition information which prohibits the button operation of the all-information transmission instruction button 23d is received from the examination server apparatus.

On the other hand, the terminal apparatus 2A transmits, to the examination server apparatus, writing information "lad" in the blank space in addition to the writing information "In" of the entry fields for the response information, such as the name field of the test-taker, the examinee number field, and the answer fields, as illustrated in FIG. 32C, when the all-information transmission instruction button 23d is turned on while the button operation prohibition information which prohibits the button operation of the all-information transmission instruction button 23d is not received from the examination sever apparatus.

According to the fourth embodiment, whether to transmit the writing information of the blank space in addition to the writing information of the entry fields for the response information, such as the name field of the test-taker, the examinee number field, and the answer fields, can be readily selected or controlled.

It is obvious that not only the modifications of the first embodiment, but also the modifications of the second and third embodiments can be applied to the fourth embodiment.

Although the examination server apparatus transmits the button operation prohibition information which prohibits the button operation of the all-information transmission instruction button 23d to the terminal apparatus 2A in the fourth embodiment, the examination server apparatus may control the terminal apparatus 2A by transmitting, to the terminal apparatus 2A, control information for causing the terminal apparatus 2A to return only the writing information of the entry fields for the response information, such as the name field of the test-taker, the examinee number field, and the answer fields, or for causing the terminal apparatus 2A to also return the writing information of the blank space, in addition to or in place of the button operation prohibition information.

Although the setting table information in the above-described embodiments includes the information of the position ranges regarding the name field of the test-taker, the examinee number field, and the answer fields, the setting table information may also include information of the position range of a specific entry field in addition to the answer fields. For example, in addition to an answer field for writing an answer to a math question, a formula field for writing calculation formula for obtaining the answer may be provided, and the writing information in the formula field may also be set as response information. In this case, the setting table information may include the information of the position range of the answer field and the information of the position range of the formula field.

The communication system of the disclosure is not limited to the examination system, and the communication system can be used in various other applications. The communication system can be applied in any case in which response information, which is responsive to provided information and which is generated according to the position indicated and input by the user of the terminal apparatus, is transmitted to the server apparatus. For example, the communication system can also be applied to a questionnaire, in which the predetermined provided information is the questionnaire, the response information is the answers to the questionnaire, and a time limit (deadline) may be set for the answers and the questionnaire may include answer fields.

Although the electronic pen 3 and the position detection sensors included in the terminal apparatuses 2 and 2A and the answer terminals 4 and 6 are electromagnetic induction type in the description of the embodiments, it is obvious that an electronic pen and sensors of other position detection methods, such as an electronic pen and sensors of active capacitance coupling type, can be used.

It is to be noted that the embodiments of the present disclosure are not limited to the foregoing, and that various changes, modifications and combinations can be made according to the principles disclosed herein.

The invention claimed is:

1. An examination system, comprising:
   a server apparatus; and
   a terminal apparatus connected to the server apparatus and capable of communicating with the server apparatus, wherein the terminal apparatus is configured to transmit, to the server apparatus, response information which is responsive to provided information and which is generated according to a position indication input performed by a user of the terminal apparatus, wherein the terminal apparatus includes:
   a position detection sensor configured to detect the position indication input in a position detection area, the position detection area including: (a) a response information area corresponding to one or more input fields for the response information, and (b) an area outside the one or more input fields;
   a determination unit configured to distinguishingly determine the position indication input in the response information area and the position indication input in the area outside the one or more input fields, in the position detection area of the position detection sensor; and
   a transmission control unit configured to transmit, to the server apparatus, the position indication input in the response information area, and to refrain from transmitting the position indication input in the area outside the one or more input fields unless a transmission instruction is provided.

2. The examination system according to claim 1, wherein the terminal apparatus includes a display unit that displays, on a display screen, a display image including the one or more input fields for the response information,
   the position detection sensor is arranged wherein a display area of the display screen of the display unit and the position detection area for detecting the position indication input overlap with each other, and

the position indication input is performed through the display screen.

3. The examination system according to claim 2, wherein the terminal apparatus includes a display control unit that displays, on the display screen of the display unit, display image information based on the position indication input detected through the position detection sensor regardless of whether the position indication input is performed inside or outside the one or more input fields.

4. The examination system according to claim 1, wherein the terminal apparatus includes a button operation unit that instructs the terminal apparatus to transmit, to the server apparatus, the position indication input in the area outside the one or more input fields, and the transmission control unit transmits, to the server apparatus, the position indication input in the area outside the one or more input fields in addition to the position indication input in the response information area, when the button operation unit instructs the terminal apparatus to transmit, to the server apparatus, the position indication input in the area outside the one or more input fields.

5. The examination system according to claim 4, wherein the server apparatus has a function of transmitting, to the terminal apparatus, information for restricting operation of the button operation unit.

6. The examination system according to claim 1, wherein the position indication input in the response information area and the position indication input in the area outside the one or more input fields are transmitted to the server apparatus in a manner that the server apparatus is able to distinguish between the position indication input in the response information area and the position indication input in the area outside the one or more input fields.

7. The examination system according to claim 1, wherein the server apparatus includes a communication unit that transmits the provided information to the terminal apparatus and that receives the response information from the terminal apparatus, and the terminal apparatus includes a reception unit that receives the provided information and a display unit that displays the provided information on a display screen.

8. The examination system according to claim 1, wherein the terminal apparatus includes a display screen, the provided information is displayed on the display screen, and the one or more input fields for the response information is displayed on the display screen.

9. The examination system according to claim 1, wherein the terminal apparatus includes a first apparatus and a second apparatus, the first apparatus includes a first display unit that displays the provided information, the second apparatus includes a second display unit that displays the one or more input fields for the response information, and the position detection sensor is arranged wherein the position detection area of the position detection sensor overlaps with a display area of a display screen of the second display unit.

10. The examination system according to claim 9, wherein the server apparatus is configured to transmit, to the terminal apparatus, the provided information including display information regarding the one or more input fields for the response information,

the first apparatus is connected to the server apparatus through a first communication path and connected to the second apparatus through a second communication path, and the first apparatus displays the provided information received from the server apparatus on the first display unit and transmits, to the second apparatus, the display information regarding the one or more input fields for the response information received from the server apparatus, and the second apparatus displays the display information regarding the one or more input fields for the response information received from the first apparatus on the second display unit and transmits the response information based on the position indication input to the one or more input fields for the response information to the server apparatus through the first apparatus.

11. An examination terminal apparatus connected to a server apparatus and capable of communicating with the server apparatus, the examination terminal apparatus being configured to transmit, to the server apparatus, response information which is responsive to provided information and which is generated according to a position indication input performed by a user of the examination terminal apparatus, the examination terminal apparatus comprising:

a position detection sensor configured to detect the position indication input in a position detection area, the position detection area including: (a) a response information area corresponding to one or more input fields for the response information, and (b) an area outside the one or more input fields;

a determination unit configured to distinguishingly determine the position indication input in the response information area and the position indication input in the area outside the one or more input fields, in the position detection area of the position detection sensor; and a transmission control unit configured to transmit, to the server apparatus, the position indication input in the response information area, and to refrain from transmitting the position indication input in the area outside the one or more input fields unless a transmission instruction is provided.

12. The examination terminal apparatus according to claim 11, further comprising:

a display unit that displays, on a display screen, a display image including the one or more input fields for the response information, wherein the position detection sensor is arranged so that a display area of the display screen of the display unit and the position detection area for detecting the position indication input overlap with each other, and the position indication input is performed through the display screen.

13. The examination terminal apparatus according to claim 12, further comprising:

a display control unit that displays, on the display screen of the display unit, display image information based on the position indication input detected through the position detection sensor regardless of whether the position indication input is performed inside or outside the one or more input fields.

14. The examination terminal apparatus according to claim 11, further comprising:

a button operation unit that instructs the examination terminal apparatus to transmit, to the server apparatus, the position indication input in the area outside the one or more input fields, wherein the transmission control unit transmits, to the server apparatus, the position indication input in the area outside the one or more input fields in addition to the position indication input in the response information area, when the button operation unit instructs the examination terminal apparatus to transmit, to the server apparatus, the position indication input in the area outside the one or more input fields.

15. The examination terminal apparatus according to claim 11, comprising:

a first apparatus; and a second apparatus, wherein the first apparatus includes a first display unit that displays the provided information, and the second apparatus includes a second display unit that displays the one or more input fields for the response information, the position detection sensor is arranged wherein the position detection area of the position detection sensor overlaps with a display area of a display screen of the second display unit.

16. The examination terminal apparatus according to claim 15, wherein the server apparatus is configured to transmit, to the examination terminal apparatus, the provided information including display information regarding the one or more input fields for the response information, the first apparatus is connected to the server apparatus through a first communication path and connected to the second apparatus through a second communication path, the first apparatus displays the provided information received from the server apparatus on the first display unit and transmits, to the second apparatus, the display information regarding the one or more input fields for the response information received from the server apparatus, and the second apparatus displays the display information regarding the one or more input fields for the response information received from the first apparatus on the second display unit and transmits the response information based on the position indication input to the one or more input fields for the response information to the server apparatus through the first apparatus.

17. The examination terminal apparatus according to claim 15, wherein the first display unit and the second display unit are display units of different display types, and a drawing speed of the first display unit is faster than a drawing speed of the second display unit.

18. The examination terminal apparatus according to claim 15, wherein the second display unit of the second apparatus includes electronic paper.

19. The examination terminal apparatus according to claim 11, wherein the position detection sensor is a sensor of electromagnetic induction type, and the user operates an electronic pen of the electromagnetic induction type to perform the position indication input.

20. The examination terminal apparatus according to claim 11, wherein the position detection sensor is a sensor of active capacitance type, and the user operates an electronic pen of the active capacitance type to perform the position indication input.

* * * * *